(12) United States Patent
Volin

(10) Patent No.: US 9,968,167 B2
(45) Date of Patent: May 15, 2018

(54) UNIQUE TWELVE-DIFFERENT-APPLICATION UMBRELLA SYSTEM, HAVING PIVOTABLE POLE RECEIVER SYSTEMS, ROTATABLE POLE-RECEIVER-LOCKING ADJUSTOR SYSTEM, CURVED-SURFACE ADAPTOR SYSTEMS, TRAILER-HITCH ADAPTOR SYSTEM, AND SPIRAL-SHOVEL SPIKE SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 0 days. days.

(21) Appl. No.: 15/486,294

(22) Filed: Apr. 12, 2017

(65) Prior Publication Data

US 2017/0295895 A1      Oct. 19, 2017

Related U.S. Application Data

(60) Provisional application No. 62/324,031, filed on Apr. 18, 2016.

(51) Int. Cl.
*A45B 17/00* (2006.01)
*A45B 11/00* (2006.01)
(Continued)

(52) U.S. Cl.
CPC .............. *A45B 17/00* (2013.01); *A45B 11/00* (2013.01); *A45B 19/00* (2013.01); *A45B 19/04* (2013.01); *A47C 7/66* (2013.01); *B60R 11/00* (2013.01); *F16B 7/0433* (2013.01); *F16B 7/14* (2013.01); *A45B 2023/0025* (2013.01); *A45B 2023/0043* (2013.01); *A45B 2200/1009* (2013.01);
(Continued)

(58) Field of Classification Search
CPC .......... A45B 11/00; A45B 17/00; F16C 11/10
See application file for complete search history.

(56) References Cited

U.S. PATENT DOCUMENTS

| 376,593 | A | * | 1/1888 | Greenawalt et al. | ... A47B 19/04 |
| | | | | | 248/447 |
| 3,602,466 | A | * | 8/1971 | Drowns | ................. A45B 11/00 |
| | | | | | 248/230.2 |

(Continued)

*Primary Examiner* — Noah Chandler Hawk

(57) ABSTRACT

At least one twelve-different-application rotatable and pivotable umbrella each comprises: at least one pivotable pole receiver each having: a pole-centering sleeve and receiver gears; a rotatable adjustor having: adjustor gears for engaging to the receiver gears and bottom gears; a trailer-hitch-adapting tube for engaging to a trailer hitch; at least one curved-surface-adapting plate each releasably attached to the trailer-hitch-adapting tube; a spiral-shovel spike having: a spiral blade and digging shovels for securely burying the spiral blade in soil and sand; a base attached to the trailer-hitch-adapting tube or the spiral-shovel spike, and having: base gears for engaging to the bottom gears, two wrenching-and-strapping handles for wrenching and strapping the base, and a surface-conforming-and-protecting adaptor attached thereto; at least one base-securing strap and ratchet for attaching the base to bumper, bench, table, hand rail, post, column, tree, tail gate, e.i.; and at least one adjustable umbrella each having: a canopy and a pole for being inserted through the pole-centering sleeve and into one of the at least one pivotable pole receiver.

17 Claims, 25 Drawing Sheets

(51) Int. Cl.

| | |
|---|---|
| *A45B 19/00* | (2006.01) |
| *A45B 19/04* | (2006.01) |
| *F16B 7/14* | (2006.01) |
| *F16B 7/04* | (2006.01) |
| *A47C 7/66* | (2006.01) |
| *B60R 11/00* | (2006.01) |
| *A45B 23/00* | (2006.01) |

(52) U.S. Cl.
CPC ............ *A45B 2200/1063* (2013.01); *A45B 2200/1072* (2013.01); *B60R 2011/004* (2013.01); *B60R 2011/0085* (2013.01)

(56) References Cited

U.S. PATENT DOCUMENTS

| | | | | |
|---|---|---|---|---|
| 3,765,434 | A | * | 10/1973 | Riggs .................. A45B 7/005 135/16 |
| 3,889,908 | A | * | 6/1975 | Larson ................. A01K 97/10 248/278.1 |
| 3,926,202 | A | | 12/1975 | Uthemann |
| 4,917,343 | A | * | 4/1990 | Wainscott ............ A47B 23/06 248/284.1 |
| 5,396,915 | A | | 3/1995 | Bomar |
| 5,588,630 | A | * | 12/1996 | Chen-Chao ............ F16C 11/10 248/514 |
| 5,685,517 | A | | 11/1997 | Salibra |
| 5,727,583 | A | | 3/1998 | Kennedy |
| 5,836,327 | A | | 11/1998 | Davis |
| 5,878,762 | A | * | 3/1999 | Huang .................. A45B 17/00 135/16 |
| 6,079,682 | A | * | 6/2000 | Olkkola ............. B60R 11/0241 248/278.1 |
| 6,089,246 | A | | 7/2000 | Barnes |
| 6,105,594 | A | | 8/2000 | Diaz |
| 6,286,530 | B1 | | 9/2001 | Hussey |
| 6,401,736 | B1 | | 6/2002 | Jerry |
| 6,405,742 | B1 | * | 6/2002 | Driscoll ................. A45B 11/00 135/20.1 |
| 6,446,649 | B1 | | 9/2002 | Bigford |
| 6,511,088 | B2 | | 1/2003 | Kahlstorf |
| 6,604,844 | B2 | | 8/2003 | Hussey |
| 6,722,380 | B1 | | 4/2004 | Hafer |
| 7,040,593 | B1 | | 5/2006 | Weatherall |
| 7,363,930 | B2 | | 4/2008 | Vanderminden, Sr. |
| 7,740,220 | B2 | | 6/2010 | Jeanveau |
| 7,784,761 | B2 | | 8/2010 | Ma |
| 8,123,190 | B2 | | 2/2012 | Kost |
| 8,146,879 | B2 | * | 4/2012 | Liao .................... A45B 11/00 135/135 |
| 8,291,923 | B2 | | 10/2012 | Young |
| D693,563 | S | | 11/2013 | Akin |
| 9,127,475 | B2 | | 9/2015 | LeAnna |
| D769,707 | S | | 10/2016 | Roentz |
| D770,758 | S | | 11/2016 | Chaloux |
| 2002/0053631 | A1 | | 5/2002 | Li |
| 2004/0056169 | A1 | | 3/2004 | Harbaugh |
| 2016/0198818 | A1 | | 7/2016 | Akin |

* cited by examiner

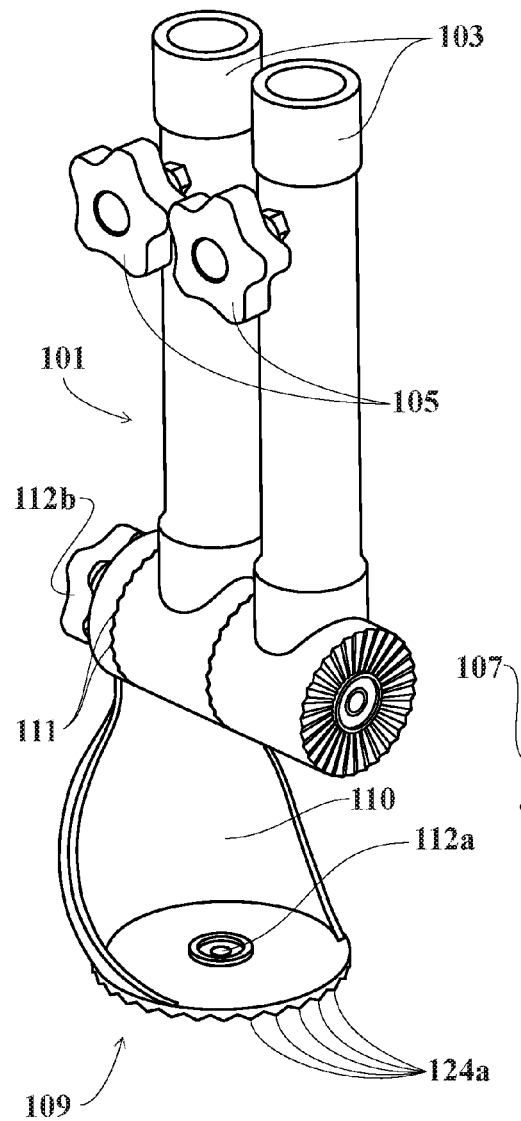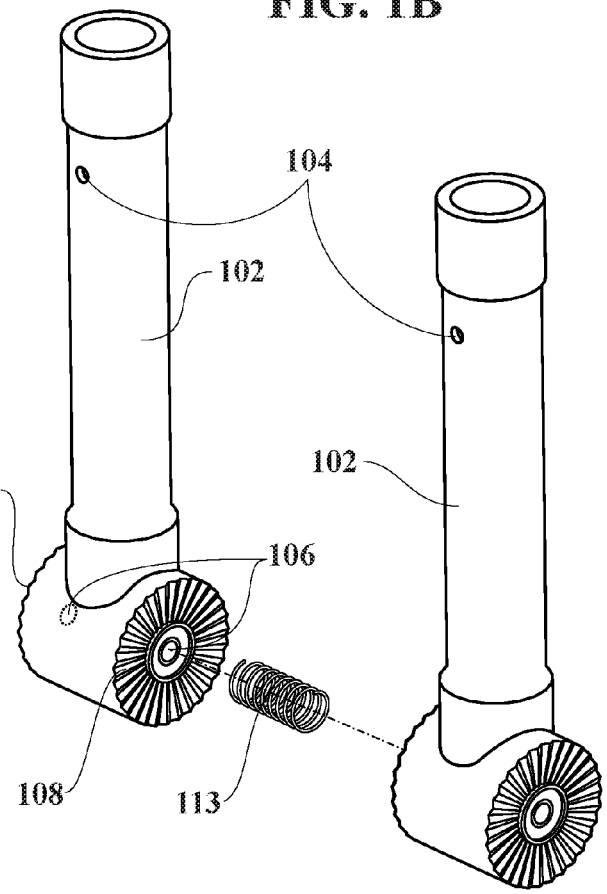

US 9,968,167 B2

UNIQUE TWELVE-DIFFERENT-APPLICATION UMBRELLA SYSTEM, HAVING PIVOTABLE POLE RECEIVER SYSTEMS, ROTATABLE POLE-RECEIVER-LOCKING ADJUSTOR SYSTEM, CURVED-SURFACE ADAPTOR SYSTEMS, TRAILER-HITCH ADAPTOR SYSTEM, AND SPIRAL-SHOVEL SPIKE SYSTEM

REFERENCE TO PREVIOUSLY FILED PROVISIONAL PATENT APPLICATION

Provisional Patent Application No. 62,324,031 was filed on Apr. 18, 2016.

1. FIELD OF THE INVENTION

The present invention relates to a rotatable and pivotable umbrella, which is cheap to produce, is easy to ship as one unit, can quickly and easily be assembled and disassembled, and can quickly and be easily rotated and pivoted. Particularly, the present invention relates to a twelve-different-application umbrella system, comprising:
1) Two pivotable umbrella-pole-receiver systems,
2) A rotatable bulb-shaped pole-receiver-locking adjustor system,
3) Two curved-surface adaptor systems,
4) A trailer-hitch adaptor system,
5) A multi-umbrella-pole base system,
6) Two base-securing strap systems,
7) A spiral-shovel umbrella spike system, and
8) Two telescopically and tiltably adjustable umbrella systems.

2. DESCRIPTION OF THE PRIOR ART

A number of umbrella have been introduced.

U.S. Pat. No. 3,926,202, issued 1975 Dec. 16, to Wolfgang Uthemann, relates to an umbrella which includes a plurality of cover ribs having struts hinged thereto with the cover ribs and struts additionally being hingedly connected to a crown carried by a crown shaft and a rim carried by a rim shaft, respectively, and means for imparting sliding movement to the crown shaft whereby the crown and rim are moved away from and toward each other respectively during respective opening and closing operations of the umbrella.

U.S. Pat. No. 5,396,915, issued 1995 Mar. 14, to John P. Bomar, relates to a shading apparatus (10) for use with a riding lawnmower mounts to the seat or other suitably stable part. A shader (12) is of sufficient diameter to shade the rider of a riding lawnmower under most conditions.

U.S. Pat. No. 5,685,517, issued 1997 Nov. 11, to Joseph Salibra, details the present invention is essentially comprised of a deck furniture mounting stand which is removably attachable to a deck's boards. By loosening or tightening nuts threadingly engaging a pair of mounting rods, the stand may be removed from, or affixed to, respectively, a deck. The stand of the present invention includes a base portion having an upper surface, a lower, deck contacting surface, and a predetermined periphery defined by a continuous edge.

U.S. Pat. No. 5,727,583, issued 1998 Mar. 17, to Phillip Donald Kennedy, describes a base used to support an overhead pole and canopy or umbrella. The base has a strong lower magnet and two spaced vertical members each of which has a plurality of pin positioning and retaining holes. A pivotally connected support arm is positioned between the vertical members and pivotally attached to the base at its lower end.

U.S. Pat. No. 5,836,327, issued 1998 Nov. 17, to Gary A. Davis, pertains to an umbrella holder comprising a clamp mechanism; a right/left angular adjustment mechanism, a forward/rearward angular adjustment mechanism; a length adjustment mechanism; and an umbrella shaft and handle securing mechanism. The clamp mechanism includes an upper and lower jaw member, an upper and lower resilient clamp pad, and a clamp screw mechanism.

U.S. Pat. No. 6,089,246, issued 2000 Jul. 18, to John W. Barnes, describes an apparatus for supporting an umbrella. The apparatus of the invention includes a base plate which is placed on the surface of the area in which the umbrella is desired, a hollow cylinder connected at its lower end to the base plate and extending upwardly therefrom for receipt and support of an umbrella shaft, and a jack for contacting the underside of a vehicle to place a downward force on the base plate.

U.S. Pat. No. 6,105,594, issued 2000 Aug. 22, to Miguel Diaz, details an umbrella support device can be used with motorized wheel chairs, golf carts, and lawn mowers, or other such small wheeled vehicles. The apparatus includes a frame that fits the chassis or seat or receiver hitch of the vehicle, the frame preferably having a telescoping vertical portion.

U.S. Pat. No. 6,286,530, issued 2001 Sep. 11, to Richard Hussey, refers to a reconfigurable sun shade and shelter apparatus that includes a flexible shade cover that is substantially square attached to a plurality of support ribs and a central locking control hub, the support ribs each having an inside end that is pivotally connected to the central locking control hub and an outside end that is removably connected to the flexible shade cover, the central locking control hub further including locking pivot means for independently pivoting each of the plurality of support ribs such that each support pole can independently be positioned in any one of a plurality of pivot positions and be locked into that pivot position.

U.S. Pat. No. 6,401,736, issued 2002 Jun. 11, to Alex Jerry, reveals an umbrella device incorporating an engaging mechanism for securing the umbrella to fixed location. The device includes an elongated shaft having a top end and a bottom end and which is capable of being extended across an overall axial length. A fabric covering portion is supported by an outwardly actuable frame secured to the shaft, the frame including a plurality of elongate and arcuate ribs to which is secured the fabric covering portion.

U.S. Pat. No. 6,446,649, issued 2002 Sep. 10, to Barbara Bigford, outlines an apparatus and method for anchoring an umbrella that has a shaft are disclosed. The apparatus includes a plurality of containers that can contain a material or object that provides weight to the containers, preferably equal to the combined weight of the umbrella and the shaft.

U.S. Pat. No. 6,511,088, issued 2003 Jan. 28, to William Kahlstorf, reveals the present invention concerns that of a new and improved apparatus which enables mounting of heavy duty equipment to existing trailer hitch hardware currently found on my pickups, vans, SUV's, recreational vehicles, and automobiles. The type of heavy duty equipment that could be attached to the apparatus of the present invention would include a heavy duty table, a work station, a vise, a spool and/or a winch, and a level working surface.

U.S. Pat. No. 6,604,844, issued 2003 Aug. 12, to Richard Hussey, demonstrates a reconfigurable reflective apparatus that includes a flexible reflector supported by a plurality of support ribs that are pivotally connected to a central locking control hub, wherein at least one support rib can be independently set in any one of a plurality of pivot positions.

U.S. Pat. No. 6,722,380, issued 2004 Apr. 20, to John C. Hafer, reveals a hitch-mounted umbrella support is provided for use with a vehicle having a hitch receiver at the rearward end thereof. A hitch bar is selectively receivably mounted in the receiver and has a clevis secured to its rearward end. A support bar is selectively adjustably pivotally secured to the clevis and extends therefrom.

U.S. Pat. No. 7,363,930, issued 2008 Apr. 29, to Robert D. Vanderminden Sr., details the tilt mechanism has a pair of tubular members and a catch which is fixedly mounted in the upper member and pivotally mounted in the lower member to permit tilting of the two members relative to each other. A pin is mounted in the lower member and is biased into one of several recesses in the lower end of the catch in order to hold the sections in either an upright or a tilted position relative to each other.

U.S. Pat. No. 7,740,220, issued 2010 Jun. 22, to Florent Jeanveau, outlines there is disclosed a two-part bracket for holding a pole. The two-part pole bracket has a first part, for holding the pole, and a second part, including a cylindrical hollow sleeve, for attaching to a support surface. The first part has an elongate body with a tubular upper section and a tubular lower section.

U.S. Pat. No. 7,784,761, issued 2010 Aug. 31, to Oliver Joen-an Ma, describes a base assembly is provided that includes a base and a coupler. The coupler includes a sleeve for receiving an umbrella pole, a lower portion comprising a side surface, and a locking member coupled with the side surface. The locking member is configured to move toward or away from a longitudinal axis of the sleeve such that the locking member engages the base to prevent rotation of the coupler relative to the base.

U.S. Pat. No. 8,123,190, issued 2012 Feb. 28, to Thomas L. Kost, demonstrates an adjustable mount for an umbrella may include one or more adjustments to allow the umbrella to be secured at different positions both horizontally and vertically. The mount may include a beam that fits into a standard receiver hitch on a vehicle. The mount may be used without the beam to secure an umbrella to a horizontal or vertical surface. The mount may be used to hold other objects besides an umbrella, such as a flag.

U.S. Pat. No. 8,291,923, issued 2012 Oct. 23, to David Young, pertains to an apparatus and methods are provided for holding and tilting an umbrella. The apparatus comprises at least one spring connected to an umbrella pole so that the spring(s) is extended or retracted when the pole angle of the umbrella is adjusted. The apparatus also comprises a pivot between an umbrella holder and a bracket that allows angular motion of the umbrella pole.

U.S. Pat. No. 9,127,475, issued 2015 Sep. 8, to David L. LeAnna, relates to an umbrella mount, and optional adaptor, a receiver for an umbrella pole and at least two pressure points that at least one strap and fastener can urge against a base support to securely position the mount.

U.S. Pat. No. D693,563, issued 2013 Nov. 19, to Sarah Akin, depicts the ornamental design for an umbrella with solar panels, as shown and described.

U.S. Pat. No. D769,707, issued 2016 Oct. 25, to Thomas John Roentz, depicts the ornamental design for a deck umbrella mount, as shown and described.

U.S. Pat. No. D770,758, issued 2016 Nov. 8, to Michael Chaloux, depicts the ornamental design for a detachable umbrella mount, as shown and described.

U.S. Patent No 20020053631, issued 2002 May 9, to Wanda Ying Li, describes a multi-functional adjustable umbrella base includes a base support, and a stem rotary arrangement supported by the base support for selectively rotating the supporting stem of an outdoor umbrella and for securely locking up any of its movement. The stem rotary arrangement includes an engaging member rotatably supported by the base support and coaxially connected to the supporting stem of the outdoor umbrella so as to selectively rotate the stem of the outdoor umbrella.

U.S. Patent No 20040056169, issued 2004 Mar. 25, to Kenneth A Harbaugh, outlines an umbrella stand includes means defining a cavity, a mast receiving means operatively associated with the cavity-defining means, a bladder received within the cavity and comprised of a material which will retain ballast, and ballast contained within the bladder. When an umbrella mast is inserted into the mast receiving means and the umbrella is raised, the ballast weighs down the cavity-defining means so as to maintain the umbrella in a generally upright condition.

U.S. Patent No 20160198818, issued 2016 Jul. 14, to Sarah Akin, refers to a solar charging umbrella uses solar power to charge electronic devices wirelessly, such as by a wireless or inductive charging port. The umbrella is self-sustained, capable of charging electronic devices in locations away from electrical outlets. The umbrella has a rechargeable battery that is recharged by sunlight. When charged, the umbrella's battery can charge devices when sunlight is not available. The umbrella supports simultaneous charging of higher power devices such as tablet computers.

DISADVANTAGES OF THE PRIOR ART

The prior art have failed to solve many problems associated with such umbrella, as follows:
1) No prior art mention or disclose any umbrella,
  having two pivotable umbrella-pole receiver systems.
  Therefore, the prior art of umbrella:
    a) Can not couple, rotate, tilt and pivot which enables
      two pivotable umbrella-pole receiver systems,
        to provide unlimited positioning for sunshade, rain and weather relief, and privacy;
    b) Can not couple, rotate, tilt and pivot, which enables
      two pivotable umbrella-pole receiver systems,
        to provide sunshade, rain and weather relief, and privacy for activities such as picnics
        (FIGS. 5C, 9A, 9B, 10A, 10B, 14A, 14B, 16A and 16B);
    c) Can not couple, rotate, tilt and pivot, which enables
      two pivotable umbrella-pole receiver systems,
        to provide sunshade, rain and weather relief, and privacy for activities such as camping
        (FIGS. 5C, 10A, 10B, 11A, 11B, 14A and 14B);
    d) Can not couple, rotate, tilt and pivot, which enables
      two pivotable umbrella-pole receiver systems,
        to provide sunshade, rain and weather relief, and privacy for spectators at sports games
        (FIGS. 18A and 19A);
    e) Can not couple, rotate, tilt and pivot, which enables
      two pivotable umbrella-pole receiver systems,
        to provide sunshade, rain and weather relief, and privacy for recreation on the beach, in parks, and in back yards
        (FIGS. 9A, 9B, 10A, 10B, 11A, and 11B);
    f) Can not couple, rotate, tilt and pivot, which enables
      two pivotable umbrella-pole receiver systems, to provide sunshade, rain and weather relief, and privacy for commercial use in restaurants and golf resorts
(FIGS. 13A, 13B, 18A, and 18B);
g) Can not couple, rotate, tilt and pivot, which enables two pivotable umbrella-pole receiver systems,
to provide sunshade, rain and weather relief, and privacy for commercial use on restaurant sidewalks
(FIGS. 13A, 13B, 18A, and 18B);
h) Can not couple, rotate, tilt and pivot, which enables two pivotable umbrella-pole receiver systems,
to provide sunshade, rain and weather relief, and privacy for activities such as tailgate parties
(FIGS. 15A and 15B);
i) Can not couple, rotate, tilt and pivot, which enables two pivotable umbrella-pole receiver systems,
to provide sunshade, rain and weather relief, and privacy for recreational vehicle activities and relaxing
(FIGS. 9A and 9B);
j) Can not enable two telescopically and tiltably adjustable umbrella systems to tilt and rotate on a pivotable pole receiver axis 360 degrees,
to tilt and angle foldable umbrella canopies in any relative desired position
(FIGS. 8A, 9A, 10A, 11A, 12A, 14A, 15A, 16A, 17A, 18A, and 19A);
k) Can not enable two telescopically and tiltably adjustable umbrella systems to tilt and rotate on a pivotable pole receiver axis 360 degrees,
to tilt and angle foldable umbrella canopies and block the sun's heat and rays from multiple angles
(FIGS. 8A, 9A, 10A, 11A, 12A, 14A, 15A, 16A, 17A, 18A, and 19A);
l) Can not enable two telescopically and tiltably adjustable umbrella systems to tilt and rotate on a pivotable pole receiver axis 360 degrees,
to tilt and angle foldable umbrella canopies and block rain from multiple angles
(FIGS. 8A, 9A, 10A, 11A, 12A, 14A, 15A, 16A, 17A, 18A, and 19A);
m) Can not enable two telescopically and tiltably adjustable umbrella systems to tilt and rotate on a pivotable pole receiver axis 360 degrees,
to tilt and angle foldable umbrella canopies and block a neighbor's view from multiple desired angles, resulting in a privacy wall
(FIGS. 24A, 24B, 24C, and 24D); and
n) Can not couple which enables multiple combined two telescopically and tiltably adjustable umbrella systems;
to tilt and angle multiple foldable umbrella canopies and configure unlimited privacy wall, surround, and overhead weather-sheltering configurations
(FIGS. 8A, 9A, 10A, 11A, 12A, 14A, 15A, 16A, 17A, 18A, and 19A).
2) No prior art mention or disclose any umbrella,
having two pivotable umbrella-pole receiver systems.
Therefore, the prior art of umbrella:
a) Can not pivot in opposing orientations creating a portable enclosed privacy shield on two sides,
to create a visually private space and block the sun's heat
(FIGS. 8A, 9A, 10A, 11A, 12A, 14A, 15A, 16A, 17A, 18A, and 19A);

b) Can not create a portable enclosed privacy shield on two sides, with a fully-adjustable shade umbrella overhead at any angle,
to create a visually private space and block the sun's heat
(FIGS. 8A, 9A, 10A, 11A, 12A, 14A, 15A, 16A, 17A, 18A, and 19A);
c) Can not pivot in an opposing orientation, and the other in a 90-degree vertical orientation with one umbrella collapsed,
to create a visually private space and block the sun's heat
(FIGS. 8A, 9A, 10A, 11A, 12A, 14A, 15A, 16A, 17A, 18A, and 19A);
d) Can not pivot in 90-degree horizontal orientations creating a portable enclosed privacy shield on 4 sides,
to create a visually private space and block the sun's heat
(FIGS. 8A, 9A, 10A, 11A, 12A, 14A, 15A, 16A, 17A, 18A, and 19A);
e) Can not pivot in a 90-degree vertical orientation creating a portable privacy wall, with a fully-adjustable shade umbrella overhead at any angle,
to create a visually private space and block the sun's heat
(FIGS. 8A, 9A, 10A, 11A, 12A, 14A, 15A, 16A, 17A, 18A, and 19A);
f) Can not pivot in horizontally 90-degrees in 3 different directions, creating a portable enclosed privacy shield on 4 sides,
to create a visually private space and block the sun's heat
(FIGS. 8A, 9A, 10A, 11A, 12A, 14A, 15A, 16A, 17A, 18A, and 19A);
g) Can not pivot in a 90-degree horizontal orientation, creating a portable partially-surrounding privacy shield,
to create a visually private space and block the sun's heat
(FIGS. 8A, 9A, 10A, 11A, 12A, 14A, 15A, 16A, 17A, 18A, and 19A); and
h) Can not pivot, one in a 90-degree horizontal orientation, the other in a 90-degree vertical orientation with one umbrella collapsed,
to create a visually private space and block the sun's heat
(FIGS. 8A, 9A, 10A, 11A, 12A, 14A, 15A, 16A, 17A, 18A, and 19A).
3) No prior art mention or disclose any umbrella,
having a rotatable bulb-shaped pole-receiver-locking adjustor system.
Therefore, the prior art of umbrella:
a) Can not adapt and become indexable, rotatable, and lockable-in-any-angle,
to form an unlimited series of pivotable umbrella-pole receiver systems, which can be tilted and angled in any respective orientation;
b) Can not couple to a second rotatable bulb-shaped pole-receiver-locking adjustor system,
to form an unlimited series of pivotable umbrella-pole receiver systems, which can be tilted and angled in any respective orientation;
c) Can not couple to a third rotatable bulb-shaped pole-receiver-locking adjustor system, to form an unlimited series of pivotable umbrella-pole receiver systems, which can be tilted and angled in any respective orientation; and
d) Can not couple to any number of rotatable bulb-shaped pole-receiver-locking adjustor systems, to form an unlimited series of pivotable umbrella-pole receiver systems, which can be tilted and angled in any respective orientation.
4) No prior art mention or disclose any umbrella, having a spiral-shovel umbrella spike system. Therefore, the prior art of umbrella:
   a) Can not enable two pivotable umbrella-pole receiver systems, to be secured into a sandy ground surface (FIGS. 19C and 19D);
   b) Can not enable two pivotable umbrella-pole receiver systems, to be secured into a soil surface (FIGS. 19A and 19B);
   c) Can not enable two pivotable umbrella-pole receiver systems, to be secured into a gravel surface; and
   d) Can not detach quickly and easily from two pivotable umbrella-pole receiver systems by use of a receiver-adjusting knob-screw, to allow two pivotable umbrella-pole receiver systems to remain on ground surface while it is not needed.
5) No prior art mention or disclose any umbrella, having a tube-shaped spiral spike. Therefore, the prior art of umbrella:
   a) Can not penetrate deep into the sand, to securely erect two pivotable umbrella-pole receiver systems and counteract the forces from wind and rain;
   b) Can not penetrate deep into the soil, to securely erect two pivotable umbrella-pole receiver systems and counteract the forces from wind and rain;
   c) Can not penetrate deep into the gravel, to securely erect two pivotable umbrella-pole receiver systems and counteract the forces from wind and rain; and
   d) Can not easily penetrate sand, soil or gravel surfaces, to efficiently allow a person to mount two pivotable umbrella-pole receiver systems with no tools required.
6) No prior art mention or disclose any umbrella, having multiple spiral digging shovels. Therefore, the prior art of umbrella:
   a) Can not provide multiple contoured wedged openings in a tube-shaped spiral spike, which spiral into sand, to quickly and easily penetrate when inserting while creating multi-directional resistance, and when attempting to un-spiral while extracting (FIGS. 4, 5A, 5B, and 5C);
   b) Can not provide multiple contoured wedged openings in a tube-shaped spiral spike, which spiral into soil, to quickly and easily penetrate when inserting while creating multi-directional resistance, and when attempting to un-spiral while extracting (FIGS. 4, 5A, 5B, and 5C);
   c) Can not provide multiple contoured wedged openings in a tube-shaped spiral spike, which spiral into gravel, to quickly and easily penetrate when inserting while creating multi-directional resistance, and when attempting to un-spiral while extracting (FIGS. 4, 5A, 5B, and 5C); and
   d) Can not provide multiple empty spaces in contoured wedged openings in a tube-shaped spiral spike, to compact and bind clumps of sand, soil, or gravel to stabilize two pivotable umbrella-pole receiver systems. (FIGS. 5B and 5C).
7) No prior art mention or disclose any umbrella, having two double-function wrenching-and-strapping handles. Therefore, the prior art of umbrella:
   a) Can not enable firm grip, to easily install a spiral umbrella spike system into soil or sand without the use of tools (FIGS. 2A, 2B, 19B and 19B);
   b) Can not attach to a dog leash or rope, as a method, to tether a dog, in a park, at home, or the beach;
   c) Can not enable firm grip, to easily uninstall a spiral umbrella spike system out of soil or sand without the use of tools (FIGS. 2A, 2B, 19B and 19B); and
   d) Can not allow easy installation of a spiral umbrella spike system, to simply secure it to a bench using ratchet strap, cam-strap, bungee, rope, or other securing strap. (FIGS. 16A and 16B).
8) No prior art mention or disclose any umbrella, having a trailer-hitch-adaptor system. Therefore, the prior art of umbrella:
   a) Can not provide adaptation for two pivotable umbrella-pole receiver systems, to easily, rotatably, and tiltably mount to the trailer hitch of a pick-up truck (FIGS. 8A and 8B);
   b) Can not provide adaptation for two pivotable umbrella-pole receiver systems, to easily, rotatably, and tiltably mount to the bumper of a pick-up truck (FIGS. 9A and 9B);
   c) Can not provide adaptation for two pivotable umbrella-pole receiver systems, to easily, rotatably, and tiltably mount to the tailgate of a pick-up truck (FIGS. 15A and 15B);
   d) Can not provide adaptation for two pivotable umbrella-pole receiver systems, to easily, rotatably, and tiltably mount to the bumper of a recreational vehicle (FIGS. 9A and 9B);
   e) Can not provide adaptation for two pivotable umbrella-pole receiver systems, to easily, rotatably, and tiltably mount to a picnic table (FIGS. 10A and 10B);
   f) Can not provide adaptation for two pivotable umbrella-pole receiver systems, to easily, rotatably, and tiltably mount to a deck surface;
   g) Can not provide adaptation for two pivotable umbrella-pole receiver systems, to easily, rotatably, and tiltably mount to a deck railing (FIGS. 11A and 11B);
h) Can not provide adaptation for two pivotable umbrella-pole receiver systems,
to easily, rotatably, and tiltably mount to a fence post (FIGS. 12A and 12B); and
i) Can not provide adaptation for two pivotable umbrella-pole receiver systems,
to easily, rotatably, and tiltably mount to a building column
(FIGS. 13A and 13B).

9) No prior art mention or disclose any umbrella,
having two curved-surface adaptor system.
Therefore, the prior art of umbrella:
a) Can not provide adaptation in conjunction with trailer-hitch-adaptor tube for two pivotable umbrella-pole receiver systems,
to mount to a curved surface of a tree
(FIGS. 14A and 14B);
b) Can not provide adaptation in conjunction with a trailer-hitch-adaptor tube for two pivotable umbrella-pole receiver systems,
to mount to a curved surface of a pole;
c) Can not provide adaptation in conjunction with a trailer-hitch-adaptor tube for two pivotable umbrella-pole receiver systems,
to mount to a curved surface of a post;
d) Can not provide adaptation in conjunction with a trailer-hitch-adaptor tube for two pivotable umbrella-pole receiver systems,
to mount to a curved surface of a column; and
e) Can not provide adaptation in conjunction with a trailer-hitch-adaptor tube for two pivotable umbrella-pole receiver systems,
to mount horizontally, vertically, or angledly to any curved surface.

10) No prior art mention or disclose any umbrella,
having a multi-umbrella-pole base system.
Therefore, the prior art of umbrella:
a) Can not enable the two pivotable umbrella-pole receiver systems,
to be screw-mounted to a wooden deck surface
(FIG. 18B);
b) Can not enable the two pivotable umbrella-pole receiver systems,
to be screw-mounted to a composite material deck surface
(FIG. 18B);
c) Can not enable the two pivotable umbrella-pole receiver systems,
to be concrete-anchor-mounted to a concrete patio surface
(FIG. 18A);
d) Can not enable the two pivotable umbrella-pole receiver systems,
to be concrete-anchor-mounted to a concrete restaurant floor surface
(FIG. 18A);
e) Can not enable the two pivotable umbrella-pole receiver systems,
to be concrete-anchor-mounted to a concrete sidewalk surface
(FIG. 18A);
f) Can not enable the two pivotable umbrella-pole receiver systems,
to be lag-bolted to an interior restaurant wood floor surface
(FIG. 18B); and
g) Can not enable the two pivotable umbrella-pole receiver systems,
to be lag-bolted to an asphalt parking lot surface
(FIG. 18A).

11) No prior art mention or disclose any umbrella,
having a surface-conforming-and-protecting adaptor.
Therefore, the prior art of umbrella:
a) Can not allow the two pivotable umbrella-pole receiver systems,
to be securely and adjustably attached to many uneven surfaces at the same time
(FIGS. 2A, 20A, and 20B);
b) Can not allow the two pivotable umbrella-pole receiver systems,
to be securely and adjustably attached to many rocky surfaces at the same time
(FIG. 20B);
c) Can not allow the two pivotable umbrella-pole receiver systems,
to be securely and adjustably attached to a pebbly surface;
d) Can not allow the two pivotable umbrella-pole receiver systems,
to be securely and adjustably attached to a flat surface;
e) Can not allow the two pivotable umbrella-pole receiver systems,
to be securely and adjustably attached to an angled surface
(FIGS. 2A, 20A, and 20B);
f) Can not allow the two pivotable umbrella-pole receiver systems,
to be securely and adjustably attached to a rounded surface;
g) Can not removably and interchangeably allow a spiral umbrella spike system or a trailer-hitch-adaptor tube,
to be substituted for needed conditions and uses
(FIGS. 17A, 17B, 18A, 18B, 19A, and 19B); and
h) Can not be made of soft, pliable, unabrasive material,
to protect material surfaces to which it may be mounted on, such as finished wood, paint, polished metal, or polished stone
(FIGS. 16B, 17B, and 18B).

OBJECTS AND ADVANTAGES OF THE INVENTION

The present invention substantially departs from the conventional concepts and designs of the prior art. In doing so, the present invention provides a twelve-different-application umbrella system having many unique and significant features, functions, and advantages, which overcome all the disadvantages of the prior art, as follows:

The twelve-different-application umbrella system comprises:
1) Two pivotable umbrella-pole-receiver systems,
2) A rotatable bulb-shaped pole-receiver-locking adjustor system,
3) Two curved-surface adaptor systems,
4) A trailer-hitch adaptor system,
5) A multi-umbrella-pole base system,
6) Two base-securing strap systems,
7) A spiral-shovel umbrella spike system, and 8) Two telescopically and tiltably adjustable umbrella systems.

1) It is an object of the new invention to provide a twelve-different-application umbrella system, having two pivotable umbrella-pole receiver systems.

Therefore, the twelve-different-application umbrella system:
- a) Can couple, rotate, tilt and pivot, which enables two pivotable umbrella-pole receiver systems,
  - to provide unlimited positioning for sunshade, rain and weather relief, and privacy;
- b) Can couple, rotate, tilt and pivot, which enables two pivotable umbrella-pole receiver systems,
  - to provide sunshade, rain and weather relief, and privacy for activities such as picnics
  - (FIGS. 5C, 9A, 9B, 10A, 10B, 14A, 14B, 16A and 16B);
- c) Can couple, rotate, tilt and pivot which enables two pivotable umbrella-pole receiver systems,
  - to provide sunshade, rain and weather relief, and privacy for activities such as camping
  - (FIGS. 5C, 10A, 10B, 11A, 11B, 14A and 14B);
- d) Can couple, rotate, tilt and pivot, which enables two pivotable umbrella-pole receiver systems,
  - to provide sunshade, rain and weather relief, and privacy for spectators at sports games
  - (FIGS. 18A and 19A);
- e) Can couple, rotate, tilt and pivot, which enables two pivotable umbrella-pole receiver systems,
  - to provide sunshade, rain and weather relief, and privacy for recreation on the beach, in parks, and in back yards
  - (FIGS. 9A, 9B, 10A, 10B, 11A, and 11B);
- f) Can couple, rotate, tilt and pivot, which enables two pivotable umbrella-pole receiver systems,
  - to provide sunshade, rain and weather relief, and privacy for commercial use in restaurants, and golf resorts;
  - (FIGS. 13A, 13B, 18A, and 18B);
- g) Can couple, rotate, tilt and pivot, which enables two pivotable umbrella-pole receiver systems,
  - to provide sunshade, rain and weather relief, and privacy for commercial use on restaurant sidewalks
  - (FIGS. 13A, 13B, 18A, and 18B);
- h) Can couple, rotate, tilt and pivot, which enables two pivotable umbrella-pole receiver systems,
  - to provide sunshade, rain and weather relief, and privacy for activities such as tailgate parties
  - (FIGS. 15A and 15B);
- i) Can couple, rotate, tilt and pivot, which enables two pivotable umbrella-pole receiver systems,
  - to provide sunshade, rain and weather relief, and privacy for recreational vehicle activities and relaxing
  - (FIGS. 9A and 9B);
- j) Can enable two telescopically and tiltably adjustable umbrella systems to tilt and rotate on a pivotable pole receiver axis 360 degrees,
  - to tilt and angle foldable umbrella canopies in any relative desired position
  - (FIGS. 8A, 9A, 10A, 11A, 12A, 14A, 15A, 16A, 17A, 18A, and 19A);
- k) Can enable two telescopically and tiltably adjustable umbrella systems to tilt and rotate on a pivotable pole receiver axis 360 degrees,
  - to tilt and angle foldable umbrella canopies and block the sun's heat and rays from multiple angles
  - (FIGS. 8A, 9A, 10A, 11A, 12A, 14A, 15A, 16A, 17A, 18A, and 19A);
- l) Can enable two telescopically and tiltably adjustable umbrella systems to tilt and rotate on a pivotable pole receiver axis 360 degrees,
  - to tilt and angle foldable umbrella canopies and block rain from multiple angles
  - (FIGS. 8A, 9A, 10A, 11A, 12A, 14A, 15A, 16A, 17A, 18A, and 19A);
- m) Can enable two telescopically and tiltably adjustable umbrella systems to tilt and rotate on a pivotable pole receiver axis 360 degrees,
  - to tilt and angle foldable umbrella canopies and block a neighbor's view from multiple desired angles, resulting in a privacy wall
  - (FIGS. 24A, 24B, 24C, and 24D); and
- n) Can couple which enables multiple combined two telescopically and tiltably adjustable umbrella systems;
  - to tilt and angle multiple foldable umbrella canopies and configure unlimited privacy wall, surround, and overhead weather-sheltering configurations
  - (FIGS. 8A, 9A, 10A, 11A, 12A, 14A, 15A, 16A, 17A, 18A, and 19A).

2) It is another object of the new invention to provide a twelve-different-application umbrella system, having two pivotable umbrella-pole receiver systems.

Therefore, the twelve-different-application umbrella system:
- a) Can pivot in opposing orientations creating a portable enclosed privacy shield on 2 sides,
  - to create a visually private space and block the sun's heat
  - (FIGS. 8A, 9A, 10A, 11A, 12A, 14A, 15A, 16A, 17A, 18A, and 19A);
- b) Can create a portable enclosed privacy shield on 2 sides, with a fully-adjustable shade umbrella overhead at any angle,
  - to create a visually private space and block the sun's heat
  - (FIGS. 8A, 9A, 10A, 11A, 12A, 14A, 15A, 16A, 17A, 18A, and 19A);
- c) Can pivot in an opposing orientation, and the other in a 90-degree vertical orientation with one umbrella collapsed,
  - to create a visually private space and block the sun's heat
  - (FIGS. 8A, 9A, 10A, 11A, 12A, 14A, 15A, 16A, 17A, 18A, and 19A);
- d) Can pivot in 90-degree horizontal orientations creating a portable enclosed privacy shield on 4 sides,
  - to create a visually private space and block the sun's heat
  - (FIGS. 8A, 9A, 10A, 11A, 12A, 14A, 15A, 16A, 17A, 18A, and 19A);
- e) Can pivot in a 90-degree vertical orientation creating a portable privacy wall, with a fully-adjustable shade umbrella overhead at any angle,
  - to create a visually private space and block the sun's heat
  - (FIGS. 8A, 9A, 10A, 11A, 12A, 14A, 15A, 16A, 17A, 18A, and 19A);
- f) Can pivot in horizontally 90-degrees in 3 different directions, creating a portable enclosed privacy shield on 4 sides, to create a visually private space and block the sun's heat
(FIGS. 8A, 9A, 10A, 11A, 12A, 14A, 15A, 16A, 17A, 18A, and 19A);
g) Can pivot in a 90-degree horizontal orientation, creating a portable partially-surrounding privacy shield,
to create a visually private space and block the sun's heat
(FIGS. 8A, 9A, 10A, 11A, 12A, 14A, 15A, 16A, 17A, 18A, and 19A); and
h) Can pivot, one in a 90-degree horizontal orientation, the other in a 90-degree vertical orientation with one umbrella collapsed,
to create a visually private space and block the sun's heat
(FIGS. 8A, 9A, 10A, 11A, 12A, 14A, 15A, 16A, 17A, 18A, and 19A).

3) It is still another object of the new invention to provide a twelve-different-application umbrella system, having a rotatable bulb-shaped pole-receiver-locking adjustor system.
Therefore, the twelve-different-application umbrella system:
a) Can adapt and become indexable, rotatable, and lockable-in-any-angle,
to form an unlimited series of pivotable umbrella-pole receiver systems, which can be tilted and angled in any respective orientation;
b) Can couple to a second rotatable bulb-shaped pole-receiver-locking adjustor system,
to form an unlimited series of pivotable umbrella-pole receiver systems, which can be tilted and angled in any respective orientation;
c) Can couple to a third rotatable bulb-shaped pole-receiver-locking adjustor system,
to form an unlimited series of pivotable umbrella-pole receiver systems, which can be tilted and angled in any respective orientation; and
d) Can couple to any number of rotatable bulb-shaped pole-receiver-locking adjustor systems,
to form an unlimited series of pivotable umbrella-pole receiver systems, which can be tilted and angled in any respective orientation.

4) It is a further object of the new invention to provide a twelve-different-application umbrella system, having a spiral-shovel umbrella spike system
Therefore, the twelve-different-application umbrella system:
a) Can enable two pivotable umbrella-pole receiver systems,
to be secured into a sandy ground surface
(FIGS. 19C and 19D);
b) Can enable two pivotable umbrella-pole receiver systems,
to be secured into a soil surface
(FIGS. 19A and 19B);
c) Can enable two pivotable umbrella-pole receiver systems,
to be secured into a gravel surface; and
d) Can detach quickly and easily from two pivotable umbrella-pole receiver systems by use of a receiver-adjusting knob-screw,
to allow two pivotable umbrella-pole receiver systems to remain on ground surface while it is not needed.

5) It is an even further object of the new invention to provide a twelve-different-application umbrella system, having a tube-shaped spiral spike.
Therefore, the twelve-different-application umbrella system:
a) Can penetrate deep into the sand,
to securely erect two pivotable umbrella-pole receiver systems and counteract the forces from wind and rain;
b) Can penetrate deep into the soil,
to securely erect two pivotable umbrella-pole receiver systems and counteract the forces from wind and rain;
c) Can penetrate deep into the gravel,
to securely erect two pivotable umbrella-pole receiver systems and counteract the forces from wind and rain; and
d) Can easily penetrate sand, soil or gravel surfaces,
to efficiently allow a person to mount two pivotable umbrella-pole receiver systems with no tools required.

6) It is still another object of the new invention to provide a twelve-different-application umbrella system, having multiple spiral digging shovels.
Therefore, the twelve-different-application umbrella system:
a) Can provide multiple contoured wedged openings in a tube-shaped spiral spike which spiral into sand,
to quickly and easily penetrate when inserting while creating multi-directional resistance, and when attempting to un-spiral while extracting
(FIGS. 4, 5A, 5B, and 5C);
b) Can provide multiple contoured wedged openings in a tube-shaped spiral spike which spiral into soil,
to quickly and easily penetrate when inserting while creating multi-directional resistance, and when attempting to un-spiral while extracting
(FIGS. 4, 5A, 5B, and 5C);
c) Can provide multiple contoured wedged openings in a tube-shaped spiral spike which spiral into gravel,
to quickly and easily penetrate when inserting while creating multi-directional resistance, and when attempting to un-spiral while extracting
(FIGS. 4, 5A, 5B, and 5C); and
d) Can provide multiple empty spaces in contoured wedged openings in a tube-shaped spiral spike,
to compact and bind clumps of sand, soil, or gravel to stabilize two pivotable umbrella-pole receiver systems
(FIGS. 5B and 5C).

7) It is yet another object of the new invention to provide a twelve-different-application umbrella system, having two double-function wrenching-and-strapping handles.
Therefore, the twelve-different-application umbrella system:
a) Can enable firm grip,
to easily install a spiral umbrella spike system into soil or sand without the use of tools
(FIGS. 2A, 2B, 19B and 19B);
b) Can attach to a dog leash or rope, as a method, to tether a dog, in a park, at home, or the beach;
c) Can enable firm grip,
to easily uninstall a spiral umbrella spike system out of soil or sand without the use of tools
(FIGS. 2A, 2B, 19B and 19B); and
d) Can allow easy installation of a spiral umbrella spike system, to simply secure it to a bench using ratchet strap, cam-strap, bungee, rope, or other securing strap.
(FIGS. 16A and 16B).

8) It is still yet another object of the new invention to provide a twelve-different-application umbrella system, having a trailer-hitch-adaptor system.

Therefore, the twelve-different-application umbrella system:
a) Can provide adaptation for two pivotable umbrella-pole receiver systems,
to easily, rotatably, and tiltably mount to the trailer hitch of a pick-up truck
(FIGS. 8A and 8B);
b) Can provide adaptation for two pivotable umbrella-pole receiver systems,
to easily, rotatably, and tiltably mount to the bumper of a pick-up truck
(FIGS. 9A and 9B);
c) Can provide adaptation for two pivotable umbrella-pole receiver systems,
to easily, rotatably, and tiltably mount to the tailgate of a pick-up truck
(FIGS. 15A and 15B);
d) Can provide adaptation for two pivotable umbrella-pole receiver systems,
to easily, rotatably, and tiltably mount to the bumper of a recreational vehicle
(FIGS. 9A and 9B);
e) Can provide adaptation for two pivotable umbrella-pole receiver systems,
to easily, rotatably, and tiltably mount to a picnic table
(FIGS. 10A and 10B);
f) Can provide adaptation for two pivotable umbrella-pole receiver systems,
to easily, rotatably, and tiltably mount to a deck surface;
g) Can provide adaptation for two pivotable umbrella-pole receiver systems,
to easily, rotatably, and tiltably mount to a deck railing
(FIGS. 11A and 11B);
h) Can provide adaptation for two pivotable umbrella-pole receiver systems,
to easily, rotatably, and tiltably mount to a fence post
(FIGS. 12A and 12B); and
i) Can provide adaptation for two pivotable umbrella-pole receiver systems,
to easily, rotatably, and tiltably mount to a building column
(FIGS. 13A and 13B).

9) It is still yet an even further object of the new invention to provide a twelve-different-application umbrella system, having two curved-surface adaptor system.

Therefore, the twelve-different-application umbrella system:
a) Can provide adaptation in conjunction with s trailer-hitch-adaptor tube for two pivotable umbrella-pole receiver systems,
to mount to a curved surface of a tree
(FIGS. 14A and 14B);
b) Can provide adaptation in conjunction with a trailer-hitch-adaptor tube for two pivotable umbrella-pole receiver systems,
to mount to a curved surface of a pole;
c) Can provide adaptation in conjunction with a trailer-hitch-adaptor tube for two pivotable umbrella-pole receiver systems,
to mount to a curved surface of a post;
d) Can provide adaptation in conjunction with a trailer-hitch-adaptor tube for two pivotable umbrella-pole receiver systems,
to mount to a curved surface of a column; and
e) Can provide adaptation in conjunction with a trailer-hitch-adaptor tube for two pivotable umbrella-pole receiver systems,
to mount horizontally, vertically, or angledly to any curved surface.

10) It is still yet an even further object of the new invention to provide a twelve-different-application umbrella system, having a multi-umbrella-pole base system.

Therefore, the twelve-different-application umbrella system:
a) Can enable the two pivotable umbrella-pole receiver systems,
to be screw-mounted to a wooden deck surface
(FIG. 18B);
b) Can enable the two pivotable umbrella-pole receiver systems,
to be screw-mounted to a composite material deck surface
(FIG. 18B);
c) Can enable the two pivotable umbrella-pole receiver systems,
to be concrete-anchor-mounted to a concrete patio surface
(FIG. 18A);
d) Can enable the two pivotable umbrella-pole receiver systems,
to be concrete-anchor-mounted to a concrete restaurant floor surface
(FIG. 18A);
e) Can enable the two pivotable umbrella-pole receiver systems,
to be concrete-anchor-mounted to a concrete sidewalk surface
(FIG. 18A);
f) Can enable the two pivotable umbrella-pole receiver systems,
to be lag-bolted to an interior restaurant wood floor surface
(FIG. 18B); and
g) Can enable the two pivotable umbrella-pole receiver systems,
to be lag-bolted to an asphalt parking lot surface
(FIG. 18A).

11) It is still yet an even further object of the new invention to provide a twelve-different-application umbrella system, having a surface-conforming-and-protecting adaptor.

Therefore, the twelve-different-application umbrella system:
a) Can allow the two pivotable umbrella-pole receiver systems,
to be securely and adjustably attached to many uneven surfaces at the same time
(FIGS. 2A, 20A, and 20B);
b) Can allow the two pivotable umbrella-pole receiver systems,
to be securely and adjustably attached to many rocky surfaces at the same time (FIG. 20B);
c) Can allow the two pivotable umbrella-pole receiver systems,
to be securely and adjustably attached to a pebbly surface;
d) Can allow the two pivotable umbrella-pole receiver systems,
to be securely and adjustably attached to a flat surface;
e) Can allow the two pivotable umbrella-pole receiver systems,
to be securely and adjustably attached to an angled surface
(FIGS. 2A, 20A, and 20B);
f) Can allow the two pivotable umbrella-pole receiver systems,
to be securely and adjustably attached to a rounded surface;
g) Can removably and interchangeably allow a spiral umbrella spike system, or a trailer-hitch-adaptor tube,
to be substituted for needed conditions and uses
(FIGS. 17A, 17B, 18A, 18B, 19A, and 19B); and
h) Can be made of soft, pliable, unabrasive material,
to protect material surfaces to which it may be mounted, such as finished wood, paint, polished metal, or polished stone
(FIGS. 16B, 17B, and 18B).

Other objects and advantages of the present invention will become apparent from a consideration of the accompanying drawings and ensuing description.

BRIEF DESCRIPTION OF THE DRAWINGS

FIGS. 1A and 1B illustrate perspective views of two pivotable umbrella-pole receiver systems and a rotatable bulb-shaped pole-receiver-locking adjustor system of the twelve-different-application umbrella system.

SUMMARY OF THE INVENTION

Figure 2A:
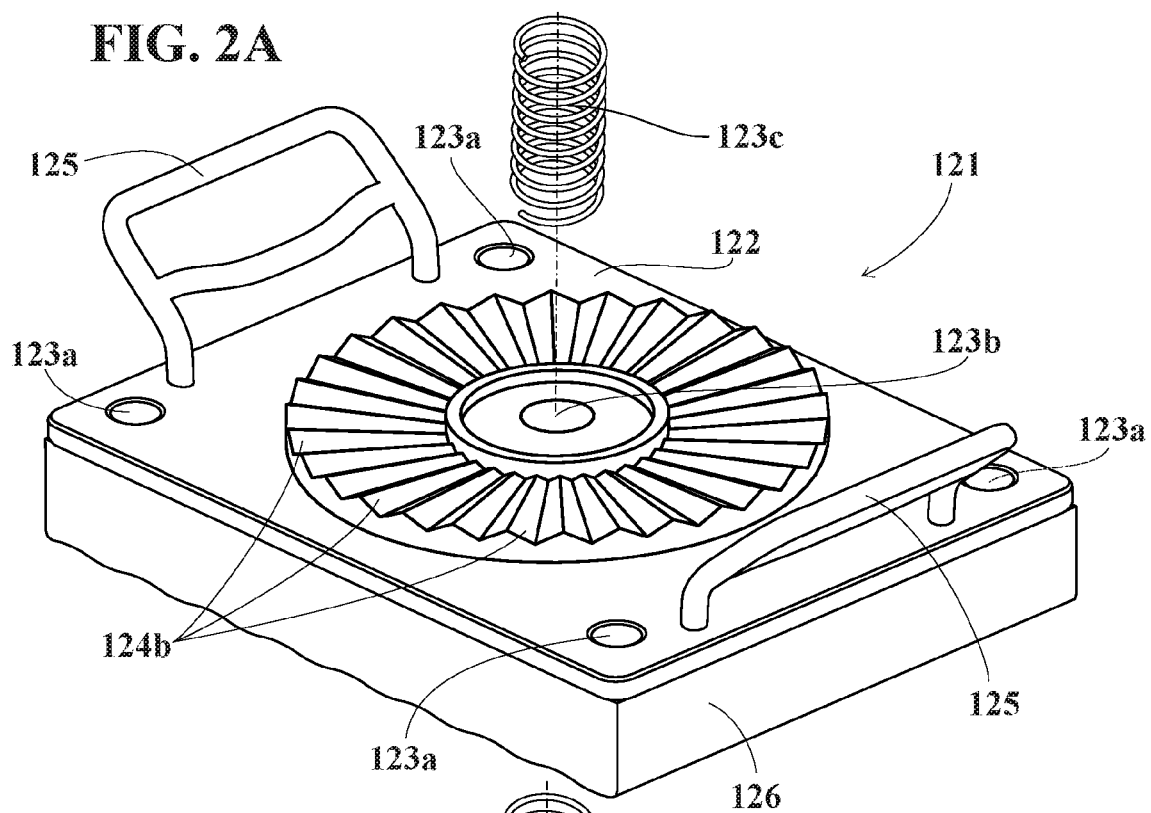
FIGS. 2A and 2B illustrate perspective views of a multi-umbrella-pole base system (with and without a surface-conforming-and-protecting adaptor) of the twelve-different-application umbrella system.

At least one twelve-different-application rotatable and pivotable umbrella each comprises: at least one pivotable pole receiver each having: a pole-centering sleeve and receiver gears; a rotatable adjustor having: adjustor gears for engaging to the receiver gears and bottom gears; a trailer-hitch-adapting tube for engaging to a trailer hitch; at least one curved-surface-adapting plate each releasably attached to the trailer-hitch-adapting tube; a spiral-shovel spike having: a spiral blade and digging shovels for securely burying the spiral blade in soil and sand; a base attached to the trailer-hitch-adapting tube or the spiral-shovel spike, and having: base gears for engaging to the bottom gears, two wrenching-and-strapping handles for wrenching and strapping the base, and a surface-conforming-and-protecting adaptor attached thereto; at least one base-securing strap and ratchet for attaching the base to bumper, bench, table, hand rail, post, column, tree, tail gate, e.i.; and at least one adjustable umbrella each having: a canopy and a pole for being inserted through the pole-centering sleeve and into one of the at least one pivotable pole receiver.

DETAILED DESCRIPTION OF THE INVENTION

Component

A twelve-different-application umbrella system comprises:
1) Two pivotable umbrella-pole-receiver systems,
2) A rotatable bulb-shaped pole-receiver-locking adjustor system,
3) Two curved-surface adaptor systems,
4) A trailer-hitch adaptor system,
5) A multi-umbrella-pole base system,
6) Two base-securing strap systems,
7) A spiral-shovel umbrella spike system, and
8) Two telescopically and tiltably adjustable umbrella systems.

Referring to FIGS. 1A, 1B, 2A, 2B, 3, 4, 5A, 5B, 5C, 6, and 7, the twelve-different-application umbrella system comprises:
1) Two pivotable umbrella-pole receiver systems 101, each comprising:
2) A pivotable pole receiver 102,
3) A pivotable pole-centering sleeve 103,
4) An upper hole 104,
5) A pole-locking knob-screw 105,
6) A lower hole 106,
7) Pivotable receiver-adjusting receiver gear 107, and
8) Pivotable receiver-adjusting receiver gear 108;
9) A rotatable bulb-shaped pole-receiver-locking adjustor system 109, comprising:
10) A rotatable bulb-shaped receiver-locking adjustor 110,
11) A pivotable receiver-adjusting adjustor gear 111,
12) A central adjustor-locking hole 112a,
   A receiver-adjusting knob-screw 112b,
   A central adjustor-locking knob-screw 112c, and
13) A separation-assisting adjustor spring 113;
14) Two curved-surface adaptor systems 114, each comprising:
15) A curved-surface adaptor plate 115, and
16) A curved-surface-adaptor-locking peg 116a, and
   Four curved-surface-adaptor-aligning pegs 116b;
17) A trailer-hitch adaptor system 117, comprising:
18) A trailer-hitch-adaptor tube 118,
19) Two trailer-hitch-adaptor bolt holes 119, and
20) Two trailer-hitch-adaptor peg holes 120;
21) A multi-umbrella-pole base system 121, comprising:
22) A base body 122,
23) Four base-perimeter holes 123a,
   A base center hole 123b,
   A separation-assisting base spring 123c,
24) A rotatable base-adjusting adjustor gear 124a,
   A rotatable base-adjusting base gear 124b,
25) Two double-function wrenching-and-strapping handles 125, and
26) A surface-conforming-and-protecting adaptor 126;
27) Two base-securing strap systems 127, each comprising:
28) Hook holes 128a,
   Double hooks 128b,
29) A strap 129, and
30) A ratchet 130;
31) A spiral-shovel umbrella spike system 131, comprising:
32) A tube-shaped spiral spike 132, and
33) Multiple spiral digging shovels 133; and
34) Two telescopically and tiltably adjustable umbrella systems 134, each comprising:
35) Foldable umbrella canopy 135, and
36) Telescopically and tiltably adjustable umbrella pole 136.

Material

Referring to FIGS. 1A, 1B, 2A, 2B, 3, 4, 5A, 5B, 5C, 6, and 7:
1) Pivotable umbrella-pole receiver systems 101 each are made of the combined materials of its components.
2) Pivotable pole receiver 102 is made of metallic material.
3) Pivotable pole-centering sleeve 103 is made of plastic material.
4) Upper hole 104 is made of empty space.
5) Pole-locking knob-screw 105 is made of metallic and/or plastic materials.
6) Lower hole 106 is made of empty space.
7) Pivotable receiver-adjusting receiver gear 107 is made of metallic material.
8) Pivotable receiver-adjusting receiver gear 108 is made of metallic material.
9) Rotatable bulb-shaped bulb-receiver-locking adjustor system 109 is made of the combined materials of its components.
10) Rotatable bulb-shaped receiver-locking adjustor 110 is made of metallic material.
11) Pivotable receiver-adjusting adjustor gear 111 is made of metallic material.
12) Central adjustor-locking hole 112a is made of empty space.
   Receiver-adjusting knob-screw 112b is made of metallic and/or plastic materials.
   Central adjustor-locking knob-screw 112c is made of metallic material.
13) Separation-assisting adjustor spring 113 is made of metallic material.
14) Curved-surface adaptor systems 114 each are made of the combined materials of its components.
15) Curved-surface adaptor plate 115 is made of metallic material.
16) Curved-surface-adaptor-locking peg 116a is made of metallic material, and
   Curved-surface-adaptor-aligning pegs 116b each are made of metallic material.
17) Trailer-hitch adaptor system 117 is made of the combined materials of its components.
18) Trailer-hitch-adaptor tube 118 is made of metallic material.
19) Trailer-hitch-adaptor bolt holes 119 each are made of empty space.
20) Trailer-hitch-adaptor peg holes 120 each are made of empty space.
21) Multi-umbrella-pole base system 121 is made of the combined materials of its components.
22) Base body 122 is made of metallic material.
23) Base-perimeter holes 123a each are made of empty space.
   Base-center hole 123b is made of empty space.
   Separation-assisting base spring 123c is made of metallic material.

24) Rotatable base-adjusting adjustor gear 124a is made of metallic material.
   Rotatable base-adjusting base gear 124b is made of metallic material.
25) Double-function wrenching-and-strapping handles 125 each are made of metallic material.
26) Surface-conforming-and-protecting adaptor 126 is made of rubber or flexible material.
27) Base-securing strap systems 127 each are made of the combined materials of its components.
28) Hook holes 128a each are made of empty space.
   Double hooks 128b each are made of metallic material.
29) Strap 129 is made of flexible material.
30) Ratchet 130 is made of metallic material.
31) Spiral-shovel umbrella spike system 131 is made of the combined materials of its components.
32) Tube-shaped spiral spike 132 is made of metallic material.
33) Multiple spiral digging shovels 133 each are made of metallic material.
34) Telescopically and tiltably adjustable umbrella systems 134 each are made of the combined materials of its components.
35) Foldable umbrella canopy 135 is made of fabric, flexible, and/or metallic materials.
36) Telescopically and tiltably adjustable umbrella pole 136 is made of metallic and/or plastic materials.

Shape
   Referring to FIGS. 1A, 1B, 2A, 2B, 3, 4, 5A, 5B, 5C, 6, and 7:
1) Pivotable umbrella-pole receiver systems 101 each have the combined shapes of its components.
2) Pivotable pole receiver 102a has a tubular shape,
3) Pivotable pole-centering sleeve 103 has a ring shape.
4) Upper hole 104 has a round shape.
5) Pole-locking knob-screw 105 has a screw-and-knob shape.
6) Lower hole 106 has a round shape.
7) Pivotable receiver-adjusting receiver gear 107 has a circular-gear shape.
8) Pivotable receiver-adjusting receiver gear 108 has a circular-gear shape.
9) Rotatable bulb-shaped bulb-receiver-locking adjustor system 109 has the combined shapes of its components.
10) Rotatable bulb-shaped receiver-locking adjustor 110 has a bulb shape.
11) Pivotable receiver-adjusting adjustor gear 111 has a circular-gear shape.
12) Central adjustor-locking hole 112a has a round shape.
   Receiver-adjusting knob-screw 112b has a step-pyramid-screw shape.
   Central adjustor-locking knob-screw 112c has a step-pyramid-screw shape.
13) Separation-assisting adjustor spring 113 has a spiral shape.
14) Curved-surface adaptor systems 114 each have the combined shapes of its components.
15) Curved-surface adaptor plate 115 has a curved and square shape. on one of its two opposite sides.
16) Curved-surface-adaptor-locking peg 116a has a round-post shape.
   Curved-surface-adaptor-aligning pegs 116b each have a rectangular shape.
17) Trailer-hitch adaptor system 117 has the combined shapes of its components.
18) Trailer-hitch-adaptor tube 118 has a square-tube shape.
19) Trailer-hitch-adaptor bolt holes 119 each have a round shape.
20) Trailer-hitch-adaptor peg holes 120 each have a round shape.
21) Multi-umbrella-pole base system 121 has the combined shapes of its components.
22) Base body 122 has a rectangular shape.
23) Base-perimeter holes 123a each have a round shape.
   Base-center hole 123b has a round shape.
   Separation-assisting base spring 123c has a spiral shape.
24) Rotatable base-adjusting adjustor gear 124a has a circular-gear shape.
   Rotatable base-adjusting base gear 124b has a circular-gear shape.
25) Double-function wrenching-and-strapping handles 125 each have a curved-square-letter-A shape.
26) Surface-conforming-and-protecting adaptor 126 has a rectangular-cube shape.
27) Base-securing strap systems 127 each have the combined shapes of its components.
28) Hook holes 128a each have a round shape.
   Double hooks 128b each have a hook shape.
29) Strap 129 has an elongated-strap shape.
30) Ratchet 130 has a conventional-hand-operated-ratchet shape.
31) Spiral-shovel umbrella spike system 131 has the combined shapes of its components.
32) Tube-shaped spiral spike 132 has a spiral-tube shape.
33) Multiple spiral digging shovels 133 each have a spiral-tooth shape.
34) Telescopically and tiltably adjustable umbrella systems 134 each have the combined shapes of its components.
35) Foldable umbrella canopy 135 has a conventional-umbrella-canopy shape.
36) Telescopically and tiltably adjustable umbrella pole 136 has a conventional-telescopically-and-tiltably-adjustable-umbrella-pole shape.

Connection
   Referring to FIGS. 1A, 1B, 2A, 2B, 3, 4, 5A, 5B, 5C, 6, and 7:
1) Pivotable umbrella-pole receiver systems 101 each have the combined connections of its components.
2) Pivotable pole receiver 102 is pivotably screwed to rotatable bulb-shaped receiver locking adjustor 110,
3) Pivotable pole-centering sleeve 103 is slid on one end of pivotable pole receiver 102.
4) Upper hole 104 is threadedly drilled through one wall of pivotable pole receiver 102.
5) Pole-locking knob-screw 105 is screwed through upper hole 104.
6) Lower hole 106 is drilled through two opposite walls of pivotable pole receiver 102.
7) Pivotable receiver-adjusting receiver gear 107 is molded to a wall of pivotable pole receiver 102.
8) Pivotable receiver-adjusting receiver gear 108 is molded to an opposite wall of pivotable pole receiver 102.
9) Rotatable bulb-shaped bulb-receiver-locking adjustor system 109 has the combined connections of its components.
10) Rotatable bulb-shaped receiver-locking adjustor 110 is rotatably screwed on base body 122.
11) Pivotable receiver-adjusting adjustor gear 111 is molded to the top of rotatable bulb-shaped receiver-locking adjustor 110.
12) Central adjustor-locking hole 112a is drilled through the bottom of rotatable bulb-shaped receiver-locking adjustor 110.

Receiver-adjusting knob-screw 112*b* is screwed through lower hole 106.

Central adjustor-locking knob-screw 112*c* is screwed through central adjustor-locking hole 112*a*.

13) Separation-assisting adjustor spring 113 is disposed around lower hole 106.
14) Curved-surface adaptor systems 114 each have the combined connections of its components.
15) Curved-surface adaptor plate 115 is welded to curved-surface-adaptor-locking peg 116*a* and curved-surface-adaptor-aligning pegs 116*b*.
16) Curved-surface-adaptor-locking peg 116*a* is molded to curved-surface adaptor plate 115 and is inserted into one of trailer-hitch-adaptor peg holes 120.

Curved-surface-adaptor-aligning pegs 116*b* each are molded to curved-surface adaptor plate 115 and hug the opposite sides of trailer-hitch-adaptor tube 118.
17) Trailer-hitch adaptor system 117 has the combined connections of its components.
18) Trailer-hitch-adaptor tube 118 is attached to double hooks 128.
19) Trailer-hitch-adaptor bolt holes 119 are drilled in the two opposite side walls of trailer-hitch-adaptor tube 118.
20) Trailer-hitch-adaptor peg holes 120 are drilled in the top wall of trailer-hitch-adaptor tube 118.
21) Multi-umbrella-pole base system 121 has the combined connections of its components.
22) Base body 122 is welded to trailer-hitch-adaptor tube 118 or tube-shaped threaded spike 132.
23) Base-perimeter holes 123*a* each are drilled through base body 122.

Base center hole 123*b* is attached to base body 122.

Separation-assisting base spring 123*c* is disposed around base center hole 123*b*.
24) Rotatable base-adjusting adjustor gear 124*a* is molded to the bottom of rotatable bulb-shaped receiver-locking adjustor 110.

Rotatable base-adjusting base gear 124*b* is molded to the top of base body 122.
25) Double-function wrenching-and-strapping handles 125 are welded to the two opposite ends of base body 122.
26) Surface-conforming-and-protecting adaptor 126 is attached to the bottom of base body 122.
27) Base-securing strap systems 127 each have the combined connections of its components.
28) Hook holes 128*a* are drilled in the top side of trailer-hitch-adaptor tube 118.

Double hooks 128*b* are hooked in hook holes 128*a*.
29) Strap 129 is attached to double hooks 128*a*.
30) Ratchet 130 is attached to strap 129.
31) Spiral-shovel umbrella spike system 131 has the combined connections of its components.
32) Tube-shaped spiral spike 132 is welded to base body 122.
33) Multiple spiral digging shovels 133 are punch-pressed in tube-shaped spiral spike 132.
34) Telescopically and tiltably adjustable umbrella systems 134 each have the combined connections of its components.
35) Foldable umbrella canopy 135 is foldably and lockably attached to telescopically and tiltably adjustable umbrella pole 136.
36) Telescopically and tiltably adjustable umbrella pole 136 is attached to foldable umbrella canopy 135.

Function

Referring to FIGS. 1A, 1B, 2A, 2B, 3, 4, 5A, 5B, 5C, 6, and 7:

1) Pivotable umbrella-pole receiver systems 101 each are for performing the combined functions of its components.
2) Pivotable pole receiver 102 is for:

Providing 180-degree-pivoting capability
to position foldable umbrella canopy 135.
3) Pivotable pole-centering sleeve 103 is for:

Centering telescopically adjustable and tiltable umbrella pole 136 therein,
to prevent pivotable pole receiver 102 from scraping telescopically adjustable and tiltable umbrella pole 136, and
to prevent pivotable pole receiver 102 from damaging telescopically adjustable and tiltable umbrella pole 136.
4) Upper hole 104 is for:

Screwing pole-locking knob-screw 105 therethrough.
5) Pole-locking knob-screw 105 is for:

Locking telescopically adjustable and tiltable umbrella pole 136.
6) Lower hole 106 is for:

Screwing receiver-adjusting knob-screw 112*b* therethrough.
7) Pivotable receiver-adjusting receiver gear 107 each are for:

Pivotably and adjustably locking pivotable pole receiver 102 to rotatable bulb-shaped receiver-locking adjustor 110
to allow foldable umbrella canopy 135 to pivot 180 degrees, and
to allow foldable umbrella canopy 135 to rotate 360 degrees.
8) Pivotable receiver-adjusting receiver gear 108 each are for:

Pivotably and adjustably locking pivotable pole receiver 102 to rotatable bulb-shaped receiver-locking adjustor 110
to allow foldable umbrella canopy 135 to pivot 180 degrees, and
to allow foldable umbrella canopy 135 to rotate 360 degrees.
9) Rotatable bulb-shaped bulb-receiver-locking adjustor system 109 is for performing the combined functions of its components.
10) Rotatable bulb-shaped receiver-locking adjustor 110 is for:

Providing 360-degree-rotating capability
to position foldable umbrella canopy 135,
Providing 360-degree-locking capability
to releasably lock foldable umbrella canopy 135.
11) Pivotable receiver-adjusting adjustor gear 111 is for:

Rotatably and adjustably locking rotatable bulb-shaped receiver-locking adjustor 110 to base body 122.
12) Central adjustor-locking hole 112*a* is for:

Inserting central adjustor-locking screw 112*c* therethrough.

Receiver-adjusting knob-screw 112*b* is for:

180 degrees adjustably locking foldable umbrella canopy 135
to position foldable umbrella canopy 135.

Central adjustor-locking knob-screw 112*c* is for:

Rotatably and adjustably attaching rotatable bulb-shaped receiver-locking adjustor 110 to base body 122.
13) Separation-assisting adjustor spring 113 is for:

Assisting in the separation of rotatable bulb-shaped bulb-receiver-locking adjustor system 109 from pivotable pole receiver 102 for adjustment.

14) Curved-surface adaptor systems 114 each are for performing the combined functions of its components.
15) Curved-surface adaptor plate 115 is for:
    Adapting trailer-hitch-adaptor tube 118
        to a curved surface.
16) Curved-surface-adaptor-locking peg 116a is for:
    Locking curved-surface adaptor plate 115
        to trailer-hitch-adaptor tube 118.
    Curved-surface-adaptor-aligning pegs 116b are for:
    Aligning trailer-hitch-adaptor tube 118
        to curved-surface adaptor plate 115.
17) Trailer-hitch adaptor system 117 is for performing the combined functions of its components.
18) Trailer-hitch-adaptor tube 118 is for:
    Leveringly locking telescopically and tiltably adjustable umbrella systems 134 to an automobile's trailer hitch,
    Leveringly locking telescopically and tiltably adjustable umbrella systems 134 to an automobile's tail gate,
    Leveringly locking telescopically and tiltably adjustable umbrella systems 134 to an automobile's bumper,
    Leveringly locking telescopically and tiltably adjustable umbrella systems
    Leveringly locking telescopically and tiltably adjustable umbrella systems 134 to a bench,
    Leveringly locking telescopically and tiltably adjustable umbrella systems 134 to a bleacher,
    Leveringly locking telescopically and tiltably adjustable umbrella systems 134 to a fence's narrow or broad post,
    Leveringly locking telescopically and tiltably adjustable umbrella systems 134 to a fence's narrow or broad top rail,
    Leveringly locking telescopically and tiltably adjustable umbrella systems 134 to a patio's narrow or broad hand rail,
    Leveringly locking telescopically and tiltably adjustable umbrella systems 134 to a building's column,
    Leveringly locking telescopically and tiltably adjustable umbrella systems 134 to a tree's trunk, and
    Leveringly locking telescopically and tiltably adjustable umbrella systems 134 to an even or uneven surface.
19) Trailer-hitch-adaptor bolt holes 119 each are for:
    Inserting a trailer-hitch pin therethrough.
20) Trailer-hitch-adaptor peg holes 120 each are for:
    Inserting curved-surface-adaptor-locking peg 116a therethrough.
21) Multi-umbrella-pole base system 121 is for performing the combined functions of its components.
22) Base body 122 is for:
    360 degrees adjustably locking telescopically and tiltably adjustable
    umbrella systems 134 to
    an automobile's trailer hitch,
    an automobile's tail gate,
    an automobile's bumper,
    a table,
    a bench,
    a bleacher,
    a fence's narrow or broad post,
    a fence's narrow or broad top rail,
    a patio's narrow or broad hand rail,
    a building's column,
    a tree's trunk, and
    an even or uneven surface.
23) Base-perimeter holes 123a each are for:
    Inserting screws therethrough.
Base center hole 123b is for:
    Inserting a screw therethrough.
Separation-assisting base spring 123c is for:
    Assisting in the separation of rotatable bulb-shaped bulb-receiver-locking adjustor system 109 from base body 122 for adjustment.
24) Rotatable base-adjusting adjustor gear 124a is for:
    Rotatably and adjustably locking rotatable bulb-shaped bulb-receiver-locking adjustor system 109 to base body 122.
    Rotatable base-adjusting base gear 124b is for:
    Rotatably and adjustably locking rotatable bulb-shaped bulb-receiver-locking adjustor system 109.to base body 122.
25) Double-function wrenching-and-strapping handles 125 each are for:
    Providing a wrenching handle
        to wrench multiple spiral digging shovels 133 out of the ground; and
        Providing a hooking ring to hook double hooks 128b thereon.
26) Surface-conforming-and-protecting adaptor 126 is for:
    Conforming to an even or uneven surface; and
    Protecting a surface, which base body 122 is screwed on or strapped on.
27) Base-securing strap systems 127 each are for performing the combined functions of its components.
28) Hook holes 128a each are for:
    Hooking double hooks 128b therein.
    Double hooks 128b each are for:
    Double-hooking into one of hook holes 128a.
29) Strap 129 is for:
    Strapping trailer-hitch-adaptor tube 118 to
        an automobile's trailer hitch,
        an automobile's tail gate,
        an automobile's bumper,
        a table,
        a bench,
        a bleacher,
        a fence's narrow or broad post,
        a fence's narrow or broad top rail,
        a patio's narrow or broad hand rail,
        a building's column,
        a tree's trunk, and
        an even or uneven surface; and
    Strapping base body 122 to
        an automobile's trailer hitch,
        an automobile's tail gate,
        an automobile's bumper,
        a table,
        a bench,
        a bleacher,
        a fence's narrow or broad post,
        a fence's narrow or broad top rail,
        a patio's narrow or broad hand rail,
        a building's column,
        a tree's trunk, and
        an even or uneven surface.
30) Ratchet 130 is for:
    Tensioning strap 129.
31) Spiral-shovel umbrella spike system 131 is for performing the combined functions of its components.
32) Tube-shaped spiral spike 132 is for:
    Spirally being wrenched into the ground to penetrate the ground to spirally and releasably lock telescopically and tiltably adjustable umbrella systems 134 to the ground; and Spirally being wrenched out of the ground to remove from the ground
to spirally release telescopically and tiltably adjustable umbrella systems 134 from the ground.

33) Multiple spiral digging shovels 133 each are for:
Spirally penetrating the ground
to spirally and releasably lock tube-shaped threaded spike 132 in the ground,
to spirally and releasably lock telescopically and tiltably adjustable umbrella systems 134 to the ground;
Spirally shoveling soil or sand into empty tunnels created in the soil or sand by multiple preceding multiple spiral digging shovels 133 to spirally and releasably lock tube-shaped threaded spike 132 in the ground; and
Spirally shoveling soil or sand into empty tunnels created in the soil or sand by multiple preceding multiple spiral digging shovels 133 to spirally and releasably lock lock telescopically and tiltably adjustable umbrella systems 134 to the ground.

34) Telescopically and tiltably adjustable umbrella systems 134 each are for performing the combined functions of its components.

35) Foldable umbrella canopy 135 is for:
Providing shading protection.

36) Telescopically and tiltably adjustable umbrella pole 136 is for:
Telescopically adjusting the height of foldable umbrella canopy 135, and
Tiltably adjusting the angle of foldable umbrella canopy 135.

Operation

A twelve-different-application umbrella system comprises:
1) Two pivotable umbrella-pole-receiver systems,
2) A rotatable bulb-shaped pole-receiver-locking adjustor system,
3) Two curved-surface adaptor systems,
4) A trailer-hitch adaptor system,
5) A multi-umbrella-pole base system,
6) Two base-securing strap systems,
7) A spiral-shovel umbrella spike system, and
8) Two telescopically and tiltably adjustable umbrella systems.

Figure 8A:
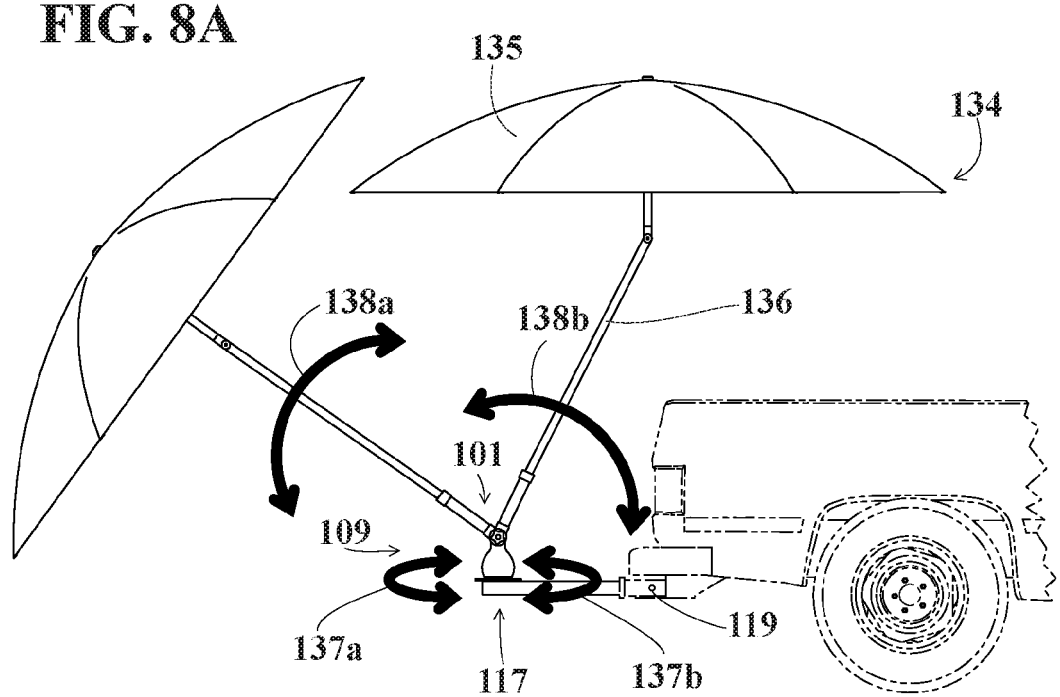
FIGS. 8A and 8B illustrate perspective views of how the trailer-hitch adaptor system and two telescopically and tiltably adjustable umbrella systems are attached to a trailer hitch.
Figure 8B:
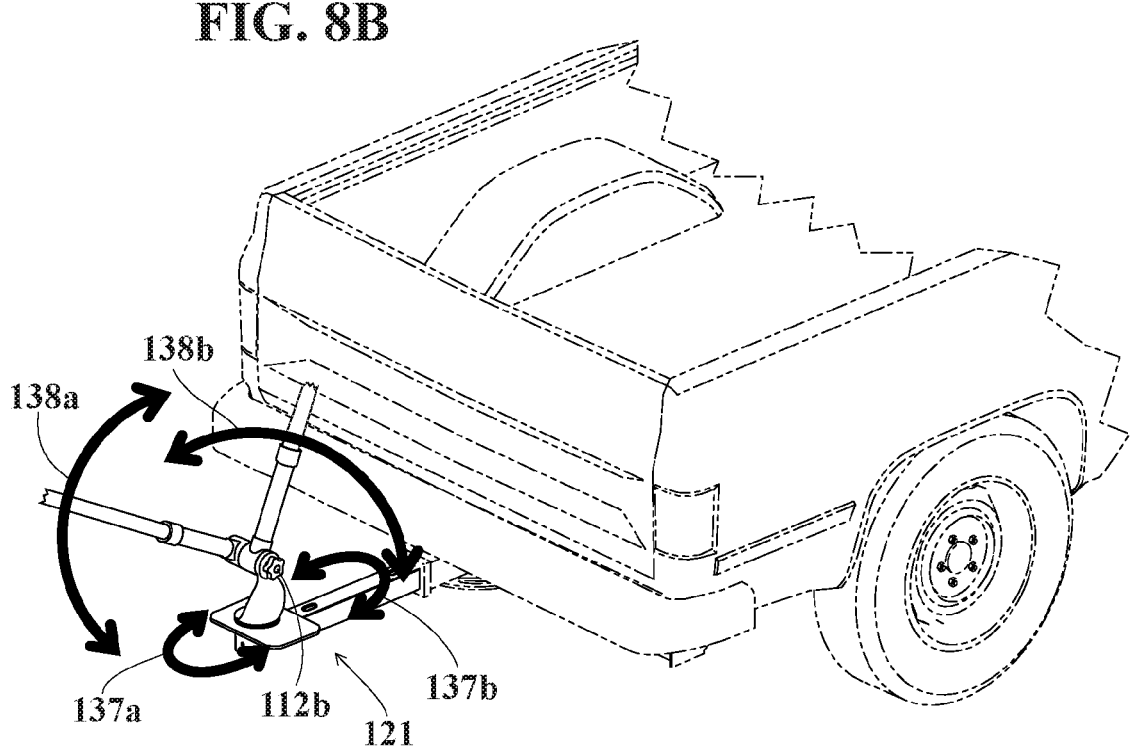
Figure 9A:
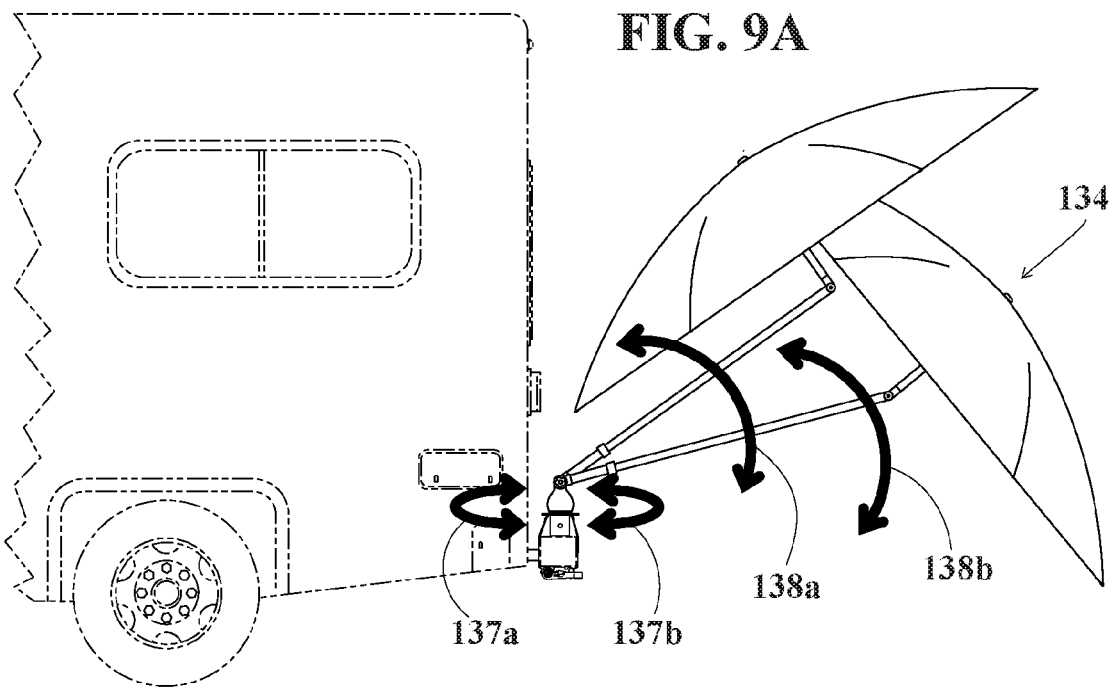
FIGS. 9A and 9B illustrate perspective views of how the trailer-hitch adaptor system and two telescopically and tiltably adjustable umbrella systems are attached to an RV bumper.
Figure 9B:
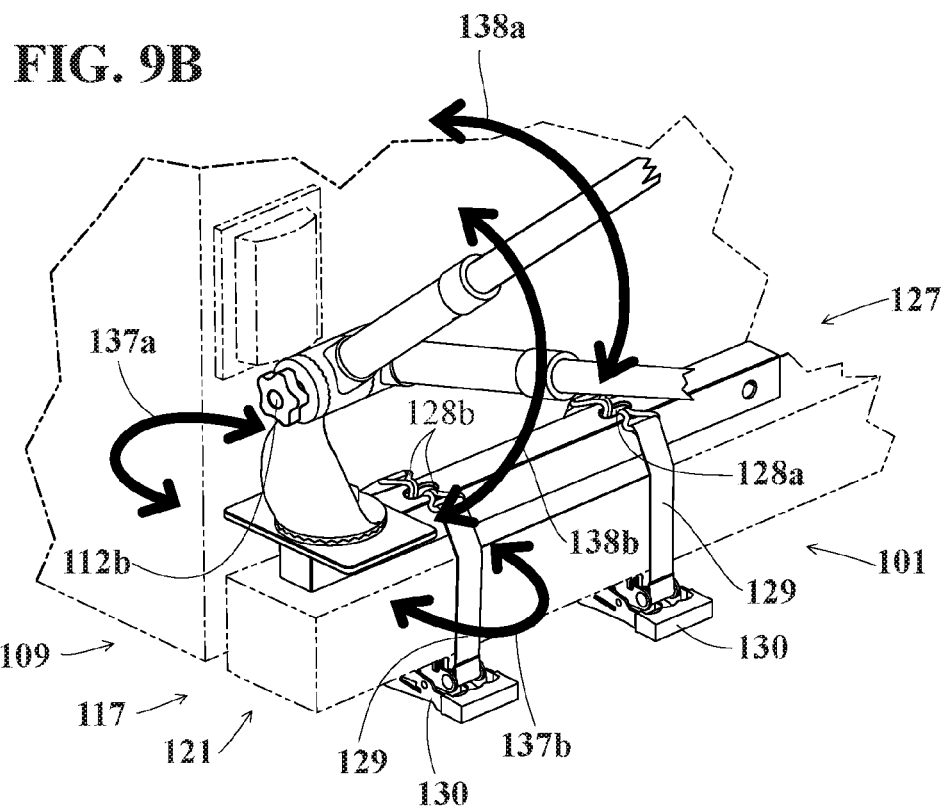
Figure 10A:
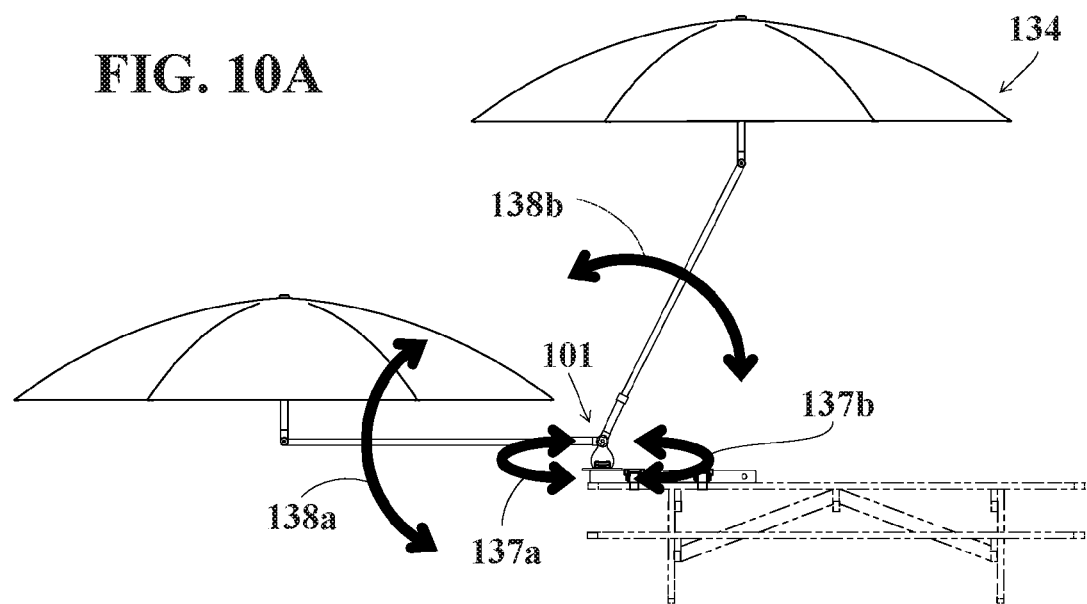
FIGS. 10A and 10B illustrate perspective views of how the trailer-hitch adaptor system and two telescopically and tiltably adjustable umbrella systems are attached to a table (e.g., a picnic table).
Figure 10B:
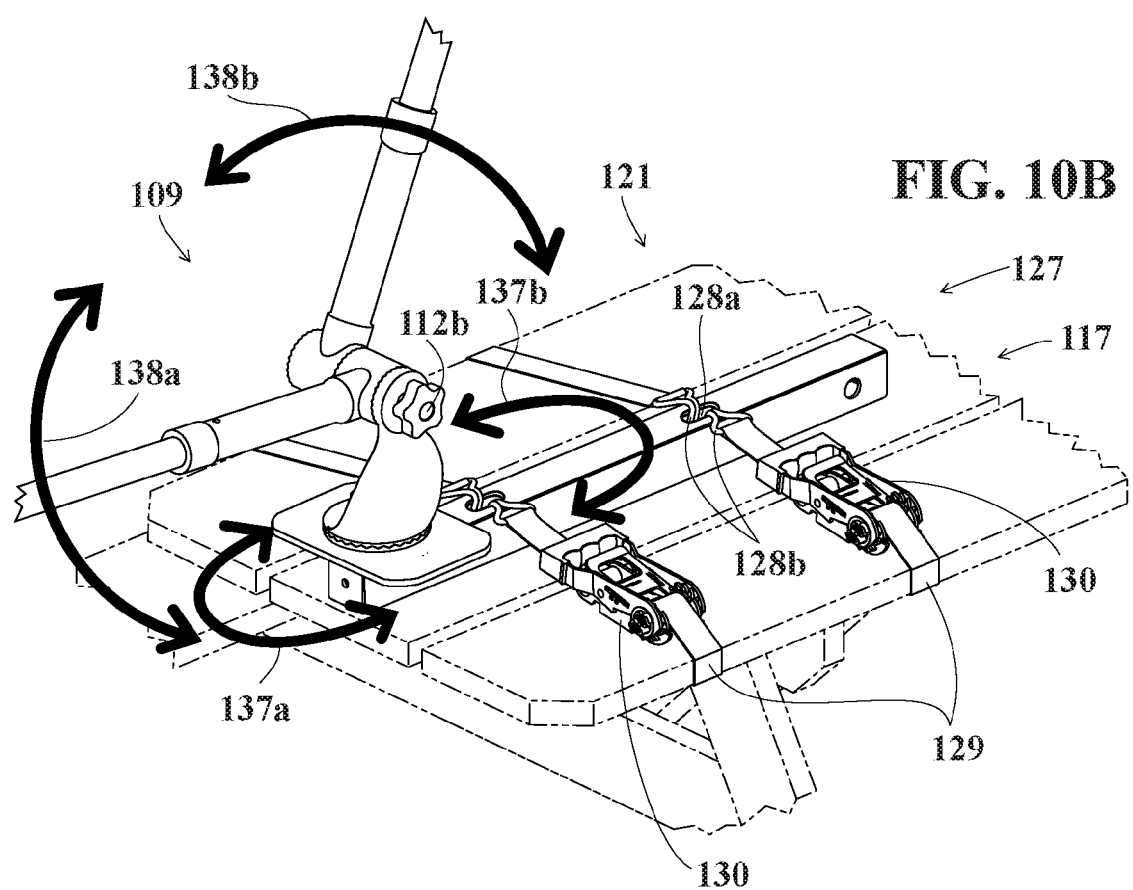
Figure 11A:
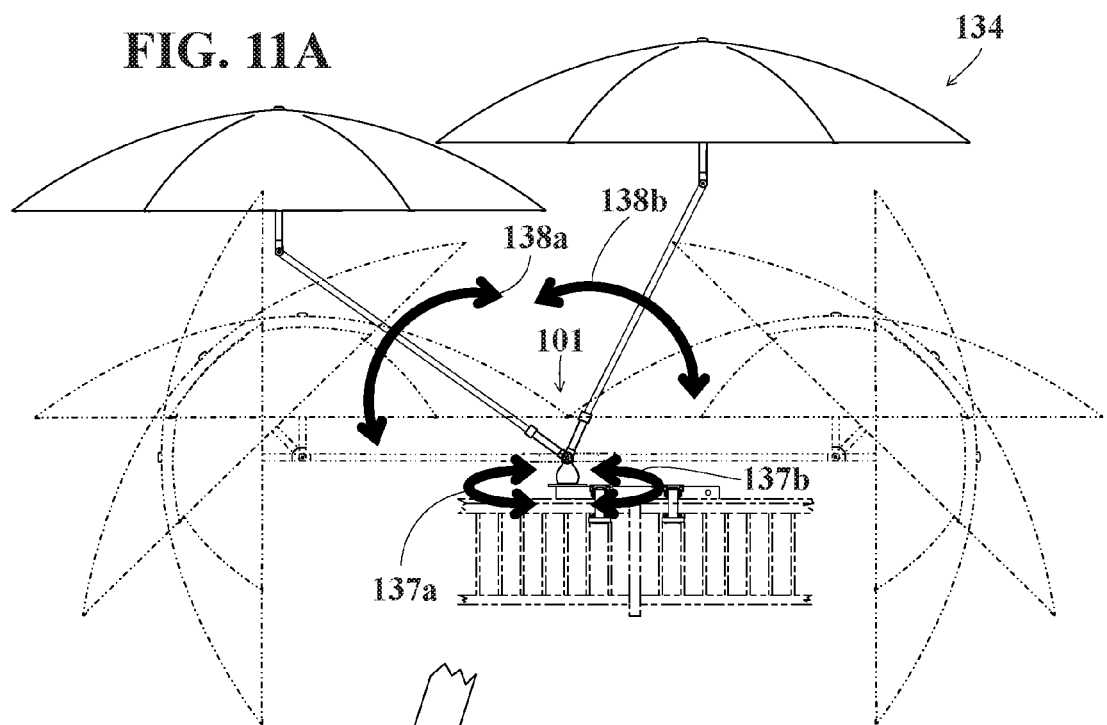
FIGS. 11A and 11B illustrate perspective views of how the trailer-hitch adaptor system and two telescopically and tiltably adjustable umbrella systems are attached to a hand rail (e.g., a hand rail of a patio).
Figure 11B:
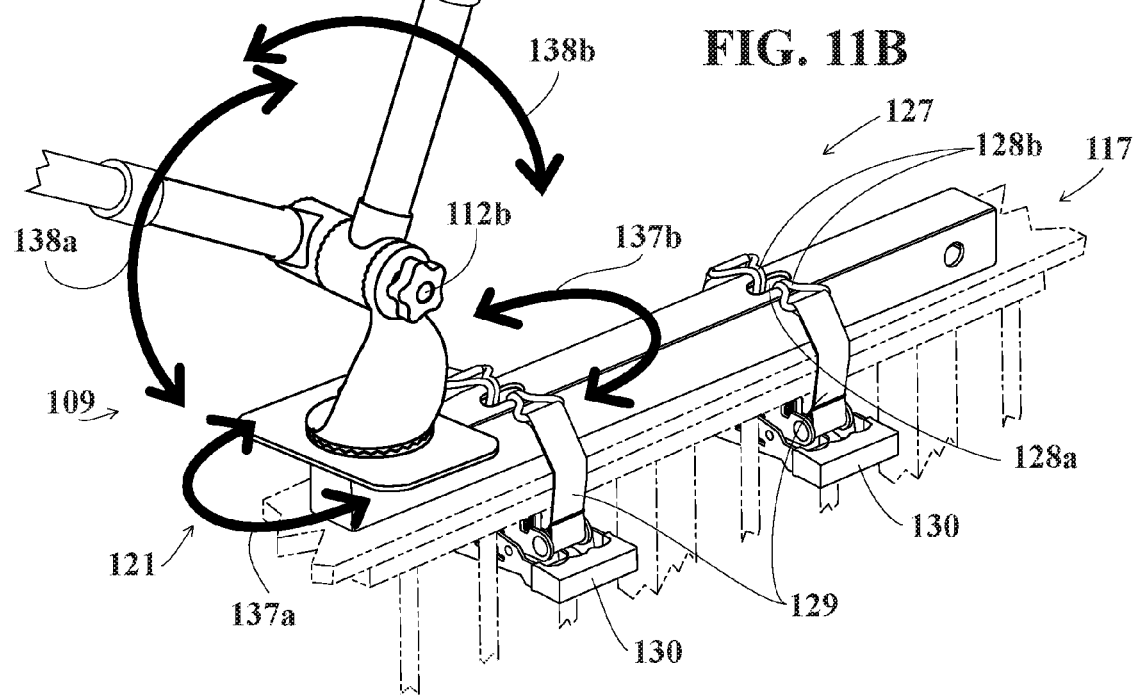
Figure 12A:
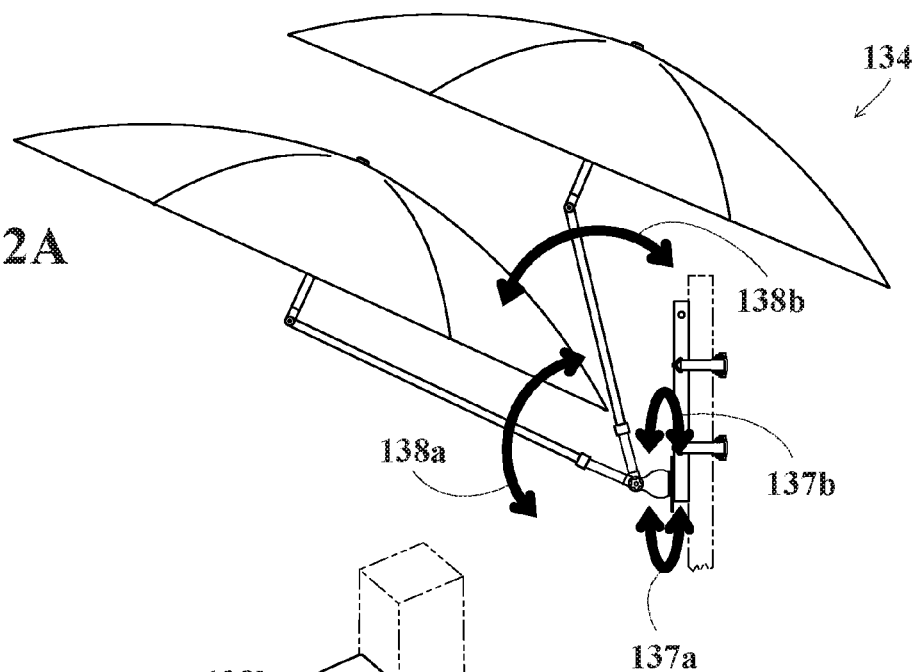
FIGS. 12A and 12B illustrate perspective views of how the trailer-hitch adaptor system and two telescopically and tiltably adjustable umbrella systems are attached to a post (e.g., a fence post).
Figure 12B:
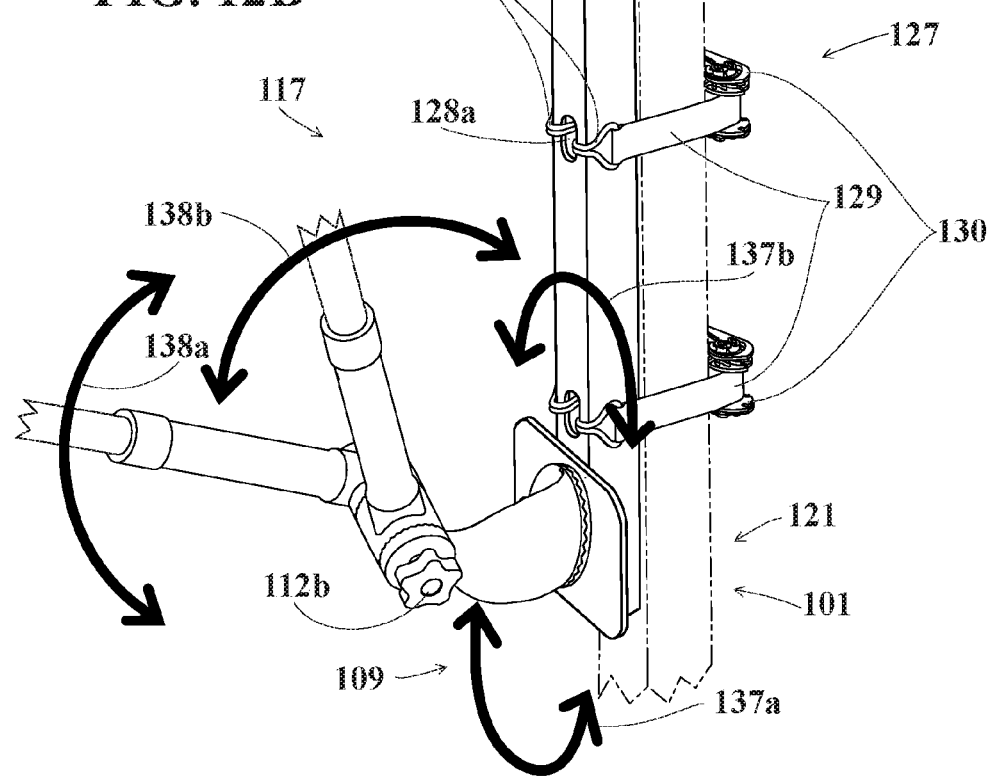

The operation of the twelve-different-application umbrella system comprises:
A) How to Install the Twelve-Different-Application Umbrella System to Trailer Hitch
(using trailer-hitch adaptor system 117)
Referring to FIGS. 8A and 8B:
1) Inserting trailer-hitch adaptor system 117 into an automobile's trailer hitch;
2) Locking trailer-hitch adaptor system 117 to the automobile's trailer hitch
(using a hitch bolt and nut, by screwing them through the automobile's trailer hitch and trailer-hitch-adaptor bolt holes 119);
3) Welding multi-umbrella-pole base system 121 to trailer-hitch adaptor system 117;
4) Rotatably and adjustably attaching
rotatable bulb-shaped pole-receiver-locking adjustor system 109 on multi-umbrella-pole base system 121
(using central adjustor-locking knob-screw 112*c*),
to allow rotatable bulb-shaped pole-receiver-locking adjustor system 109 to rotate 360 degrees,
in the opposite directions of arrows 137*a* and 137*b*;
5) Pivotably and adjustably attaching
pivotable umbrella-pole receiver systems 101 to rotatable bulb-shaped pole-receiver-locking adjustor system 109
(using receiver-adjusting knob-screw 112*b*),
to allow pivotable umbrella-pole receiver systems 101 to pivot 180 degrees,
in the opposite directions of arrows 138*a* and 138*b*;
6) Locking telescopically and tiltably adjustable umbrella systems 134 to
pivotable umbrella-pole receiver systems 101
(using pole-locking knob-screw 105);
7) (360 degrees) rotatably adjusting telescopically and tiltably adjustable umbrella systems 134
to desired locations;
8) Locking telescopically and tiltably adjustable umbrella systems 134 in place
(using central adjustor-locking knob-screw 112*c*);
9) (180 degrees) pivotably adjusting telescopically and tiltably adjustable umbrella systems 134
to desired locations; and
10) Locking telescopically and tiltably adjustable umbrella systems 134 in place
(using receiver-adjusting knob-screw 112*b*).

B) How to Install the Twelve-Different-Application Umbrella System to Tail Gate, Bumper, Table, Bench, Bleacher, Narrow or Broad Post, Narrow or Broad Top Rail, Narrow or Broad Hand Rail, or Building's Column
(using trailer-hitch adaptor system 117)
Referring to FIGS. 9A, 9B, 10A, 10B, 11A, 11B, 12A, 12B, 13A, and 13B:
1) Attaching trailer-hitch adaptor system 117 to straps 129
(using double hooks 128*b*, by hooking them in hook holes 128*a*);
2) Strapping trailer-hitch adaptor system 117 to tail gate, bumper, table, bench, bleacher, post, top rail, hand rail, or building's column
(using straps 129 and ratchets 130);
3) Welding multi-umbrella-pole base system 121 to trailer-hitch adaptor system 117;
4) Rotatably attaching rotatable bulb-shaped pole-receiver-locking adjustor system 109 on
multi-umbrella-pole base system 121
(using central adjustor-locking screw 112*c*),
to allow rotatable bulb-shaped pole-receiver-locking adjustor system 109 to rotate 360 degrees,
in the opposite directions of arrows 137*a* and 137*b*;
5) Pivotably attaching pivotable umbrella-pole receiver systems 101 to
rotatable bulb-shaped pole-receiver-locking adjustor system 109
(using receiver-adjusting knob-screw 112*b*),
to allow pivotable umbrella-pole receiver systems 101 to pivot 180 degrees,
in the opposite directions of arrows 138*a* and 138*b*;
6) Locking telescopically and tiltably adjustable umbrella systems 134 to
pivotable umbrella-pole receiver systems 101
(using pole-locking knob-screw 105);
7) (360 degrees) rotatably adjusting telescopically and tiltably adjustable umbrella systems 134
to desired locations;

8) Locking telescopically and tiltably adjustable umbrella systems 134 in place
    (using central adjustor-locking knob-screw 112*c*);
9) (180 degrees) pivotably adjusting telescopically and tiltably adjustable umbrella systems 134
    to desired locations; and
10) Locking telescopically and tiltably adjustable umbrella systems 134 in place
    (using receiver-adjusting knob-screw 112*b*).

Figure 14A:
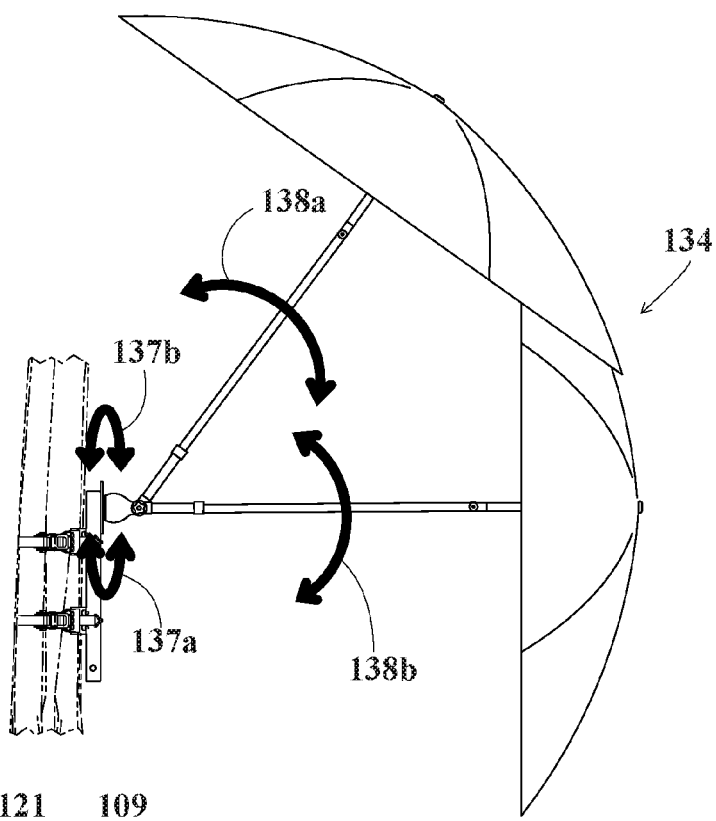
FIGS. 14A and 14B illustrate perspective views of how the trailer-hitch adaptor system and two telescopically and tiltably adjustable umbrella systems are attached to a tree (using two curved-surface adaptor systems).
Figure 14B:
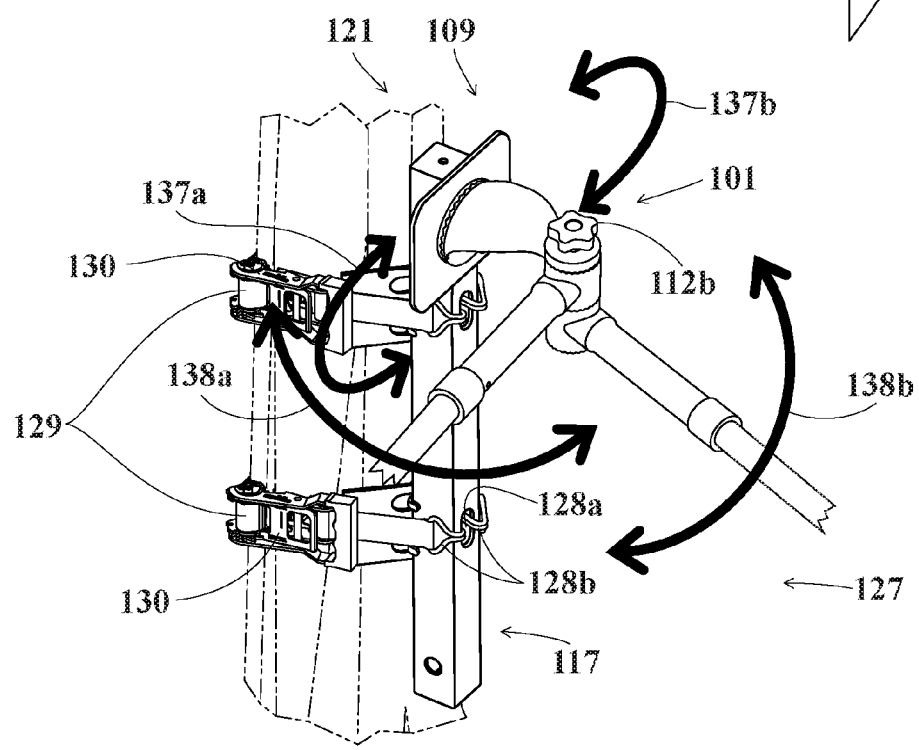
Figure 15A:
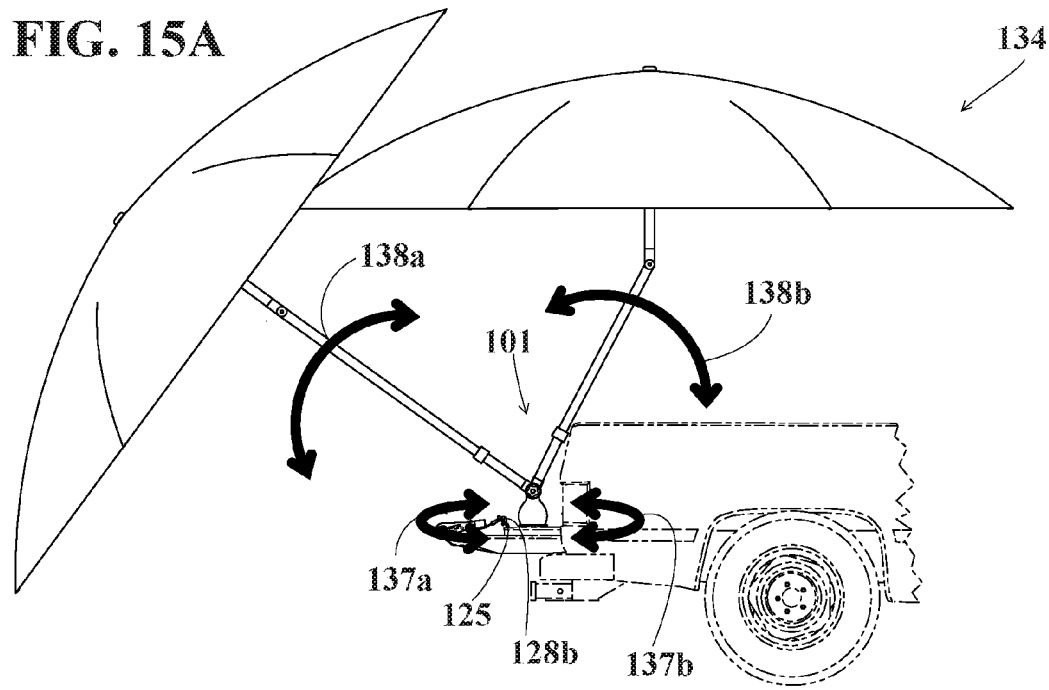
FIGS. 15A and 15B illustrate perspective views of how the multi-umbrella-pole base system and two telescopically and tiltably adjustable umbrella systems are attached to a tail gate (e.g., a tail gate of a truck, station wagon, or SUV).
Figure 15B:
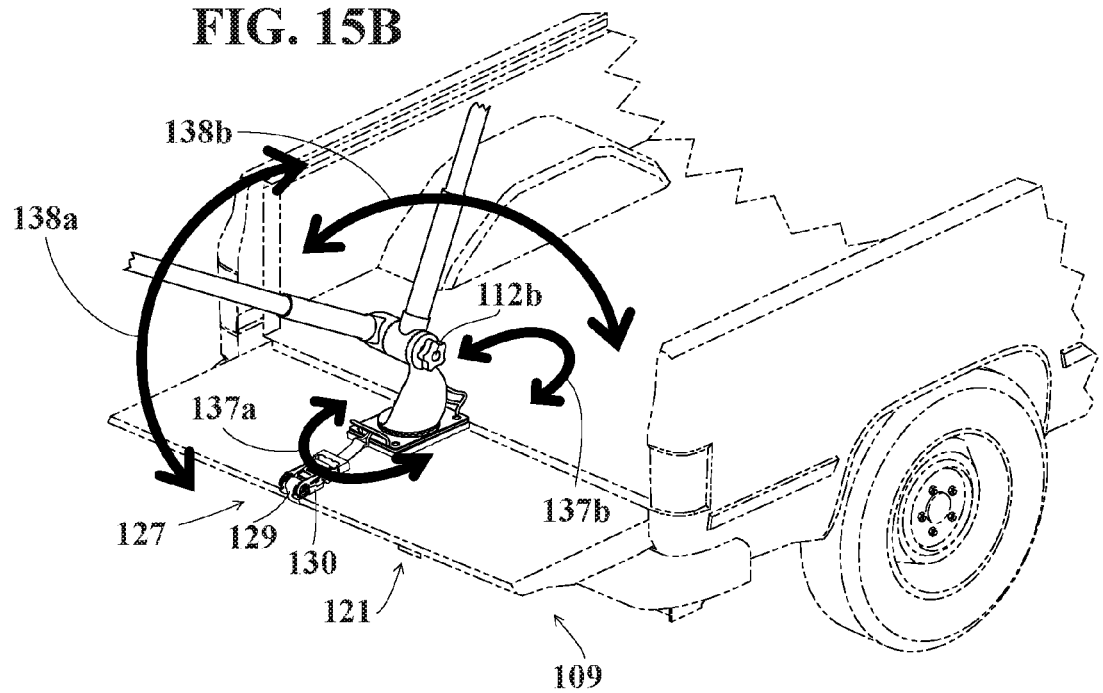

C) How to Install the Twelve-Different-Application Umbrella System to Building's Curved-Surface Column or Tree's Curved-Surface Trunk
    (using trailer-hitch adaptor system 117)
    Referring to FIGS. 14A and 14B:
1) Attaching trailer-hitch adaptor system 117 to straps 129
    (using double hooks 128*b*, by hooking them in hook holes 128*a*);
2) Attaching trailer-hitch adaptor system 117 to curved-surface adaptor systems 114
    (using curved-surface-adaptor-locking peg 116*a* and curved-surface-adaptor-aligning pegs 116*b*);
3) Strapping trailer-hitch adaptor system 117 to a building's curved-surface column or tree's curved-surface trunk
    (using straps 129 and ratchets 130);
4) Welding multi-umbrella-pole base system 121 to trailer-hitch adaptor system 117;
5) Rotatably attaching rotatable bulb-shaped pole-receiver-locking adjustor system 109 on multi-umbrella-pole base system 121
    (using central adjustor-locking screw 112*c*),
    to allow rotatable bulb-shaped pole-receiver-locking adjustor system 109 to rotate 360 degrees,
    in the opposite directions of arrows 137*a* and 137*b*;
6) Pivotably attaching pivotable umbrella-pole receiver systems 101 to
    rotatable bulb-shaped pole-receiver-locking adjustor system 109
    (using receiver-adjusting knob-screw 112*b*),
    to allow pivotable umbrella-pole receiver systems 101 to pivot 180 degrees,
    in the opposite directions of arrows 138*a* and 138*b*;
7) Locking telescopically and tiltably adjustable umbrella systems 134 to
    pivotable umbrella-pole receiver systems 101
    (using pole-locking knob-screw 105);
8) (360 degrees) rotatably adjusting telescopically and tiltably adjustable umbrella systems 134
    to desired locations;
9) Locking telescopically and tiltably adjustable umbrella systems 134 in place
    (using central adjustor-locking knob-screw 112*c*);
10) (180 degrees) pivotably adjusting telescopically and tiltably adjustable umbrella systems 134
    to desired locations; and
11) Locking telescopically and tiltably adjustable umbrella systems 134 in place
    (using receiver-adjusting knob-screw 112*b*).

D) How to Install the Twelve-Different-Application Umbrella System to Tail Gate, Bumper, Table, Bench, Bleacher, Narrow or Broad Post, Narrow or Broad Top Rail, Narrow or Broad Hand Rail, or Building's Column
    (using multi-umbrella-pole base system 121 with or without surface-conforming-and-protecting adaptor 126)
    Referring to FIGS. 15A, 15B, 16A, 16B, 17A, and 17B:
1) Attaching multi-umbrella-pole base system 121 to straps 129
    (using double hooks 128*b* hooking on double-function wrenching-and-strapping handles 125);
2) Strapping multi-umbrella-pole base system 121 to tail gate, bumper, table, bench, bleacher, post, top rail, or hand rail
    (using straps 129 and ratchets 130);
3) Rotatably attaching rotatable bulb-shaped pole-receiver-locking adjustor system 109 on multi-umbrella-pole base system 121
    (using central adjustor-locking screw 112*c*),
    to allow rotatable bulb-shaped pole-receiver-locking adjustor system 109 to rotate 360 degrees,
    in the opposite directions of arrows 137*a* and 137*b*;
4) Pivotably attaching pivotable umbrella-pole-receiver systems 101 to
    rotatable bulb-shaped pole-receiver-locking adjustor system 109
    (using receiver-adjusting knob-screw 112*b*),
    to allow pivotable umbrella-pole receiver systems 101 to pivot 180 degrees,
    in the opposite directions of arrows 138*a* and 138*b*;
5) Locking telescopically and tiltably adjustable umbrella systems 134 to
    pivotable umbrella-pole-receiver systems 101
    (using pole-locking knob-screw 105);
6) (360 degrees) rotatably adjusting telescopically and tiltably adjustable umbrella systems 134
    to desired locations;
7) Locking telescopically and tiltably adjustable umbrella systems 134 in place
    (using central adjustor-locking knob-screw 112*c*);
8) (180 degrees) pivotably adjusting telescopically and tiltably adjustable umbrella systems 134
    to desired locations; and
9) Locking telescopically and tiltably adjustable umbrella systems 134 in place
    (using receiver-adjusting knob-screw 112*b*).

E) How to Install the Twelve-Different-Application Umbrella System to Even or Uneven Surface (e.g., Wooden Patio, Cement Floor, etc.)
    (using multi-umbrella-pole base system 121 with or without surface-conforming-and-protecting adaptor 126)
    Referring to FIGS. 18A and 18B:
1) Screwing multi-umbrella-pole base system 121 to an even or uneven surface (e.g., wooden patio, cement floor, etc.)
    (using screws, by screwing them through base-perimeter holes 123*a* into the even or uneven surface (e.g., wooden patio, cement floor, etc.);
2) Rotatably attaching rotatable bulb-shaped pole-receiver-locking adjustor system 109 on multi-umbrella-pole base system 121
    (using central adjustor-locking screw 112*c*),
    to allow rotatable bulb-shaped pole-receiver-locking adjustor system 109 to rotate 360 degrees,
    in the opposite directions of arrows 137*a* and 137*b*;
3) Pivotably attaching pivotable umbrella-pole receiver systems 101 to
    rotatable bulb-shaped pole-receiver-locking adjustor system 109
    (using receiver-adjusting knob-screw 112*b*),
    to allow pivotable umbrella-pole receiver systems 101 to pivot 180 degrees,
    in the opposite directions of arrows 138*a* and 138*b*;
4) Locking telescopically and tiltably adjustable umbrella systems 134 to
    pivotable umbrella-pole receiver systems 101
    (using pole-locking knob-screw 105);

5) (360 degrees) rotatably adjusting telescopically and tiltably adjustable umbrella systems 134
   to desired locations;
6) Locking telescopically and tiltably adjustable umbrella systems 134 in place
   (using central adjustor-locking knob-screw 112c);
7) (180 degrees) pivotably adjusting telescopically and tiltably adjustable umbrella systems 134
   to desired locations; and
8) Locking telescopically and tiltably adjustable umbrella systems 134 in place
   (using receiver-adjusting knob-screw 112b).

Figure 19A:
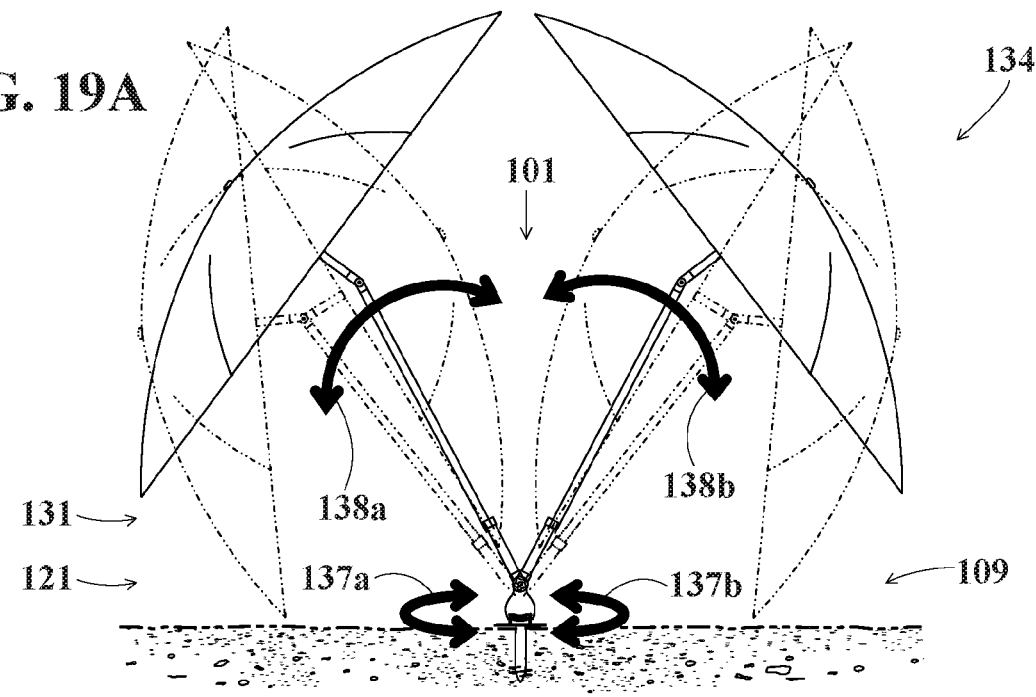
FIGS. 19A, 19B, 19C, and 19D illustrate perspective views of how the spiral-shovel umbrella spike system and two telescopically and tiltably adjustable umbrella systems are screwed into the ground, or are installed on a sandy beach, respectively.

F) How to Install the Twelve-Different-Application Umbrella System on a Beach or the Ground
   (using spiral-shovel umbrella spike system 131)
   Referring to FIG. 19A:
1) Welding multi-umbrella-pole base system 121 to spiral-shovel umbrella spike system 131;
2) Driving spiral-shovel umbrella spike system 131 into the beach or the ground;
3) Rotatably attaching rotatable bulb-shaped pole-receiver-locking adjustor system 109 on multi-umbrella-pole base system 121
   (using central adjustor-locking screw 112c),
   to allow rotatable bulb-shaped pole-receiver-locking adjustor system 109 to rotate 360 degrees,
   in the opposite directions of arrows 137a and 137b;
4) Pivotably attaching pivotable umbrella-pole receiver systems 101 to
   rotatable bulb-shaped pole-receiver-locking adjustor system 109
   (using receiver-adjusting knob-screw 112b),
   to allow pivotable umbrella-pole receiver systems 101 to pivot 180 degrees,
   in the opposite directions of arrows 138a and 138b;
5) Locking telescopically and tiltably adjustable umbrella systems 134 to
   pivotable umbrella-pole receiver systems 101
   (using pole-locking knob-screw 105);
6) (180 degrees) pivotably adjusting telescopically and tiltably adjustable umbrella systems 134
   to desired locations;
7) Locking telescopically and tiltably adjustable umbrella systems 134 in place
   (using receiver-adjusting knob-screw 112b);
8) (360 degrees) rotatably adjusting telescopically and tiltably adjustable umbrella systems 134
   to desired locations; and
9) Locking telescopically and tiltably adjustable umbrella systems 134 in place
   (using central adjustor-locking knob-screw 112c).

Figure 19B:
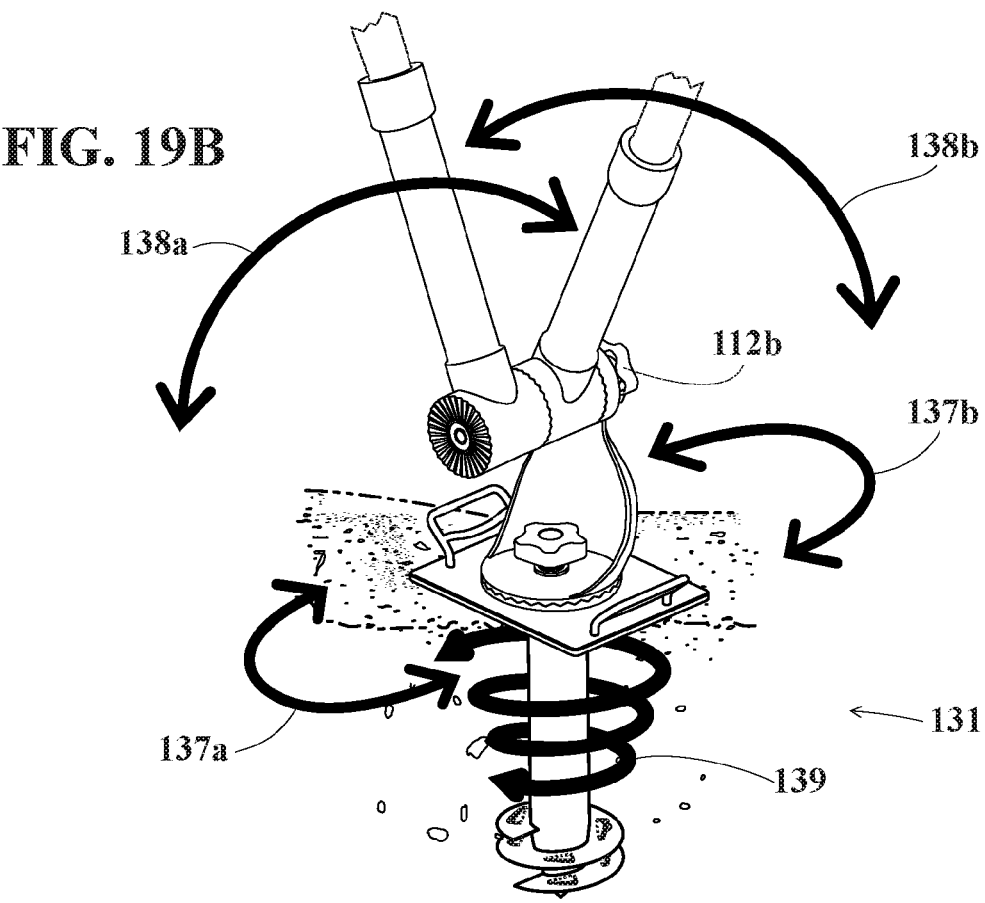
Figure 19C:
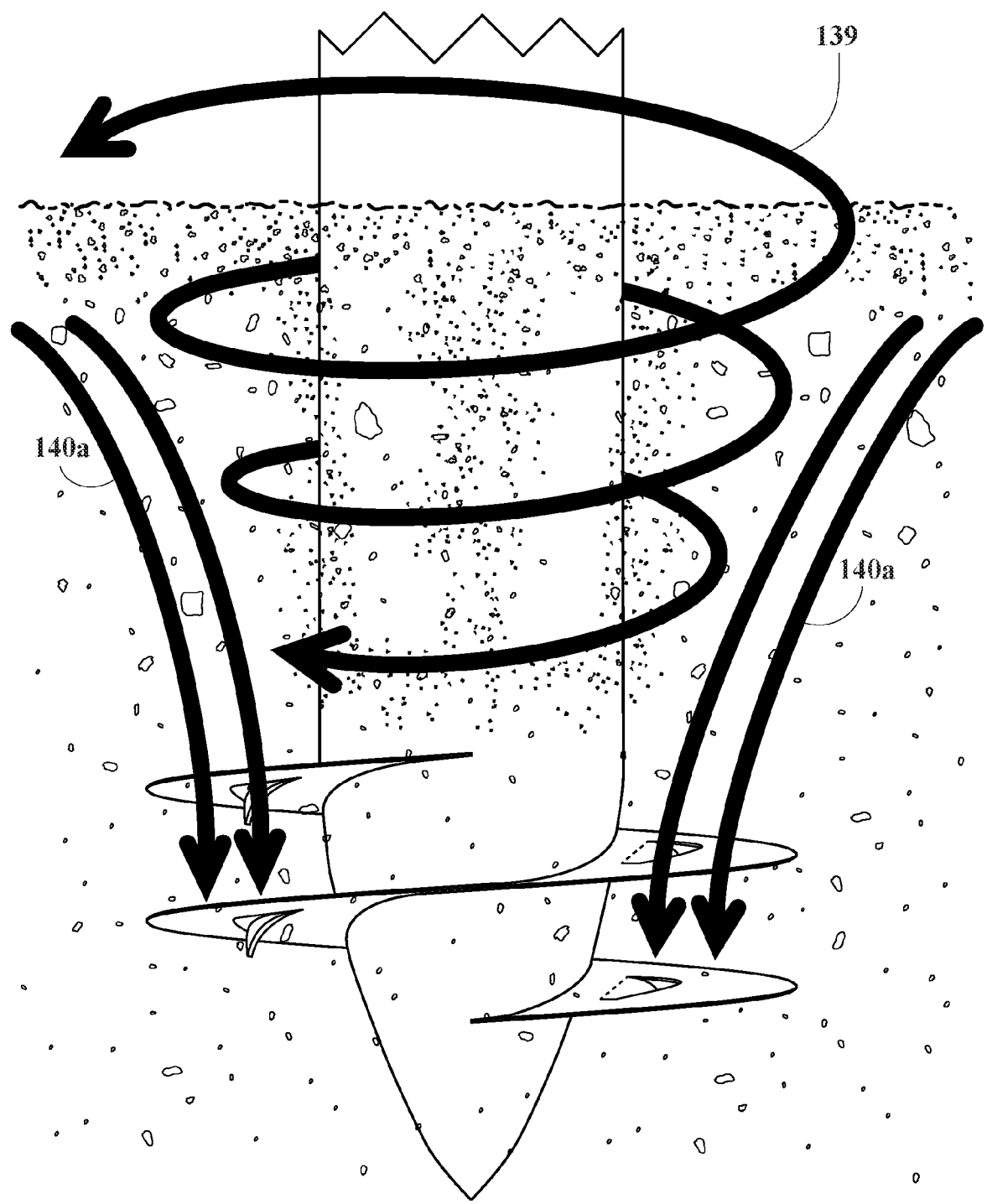
Figure 19D:
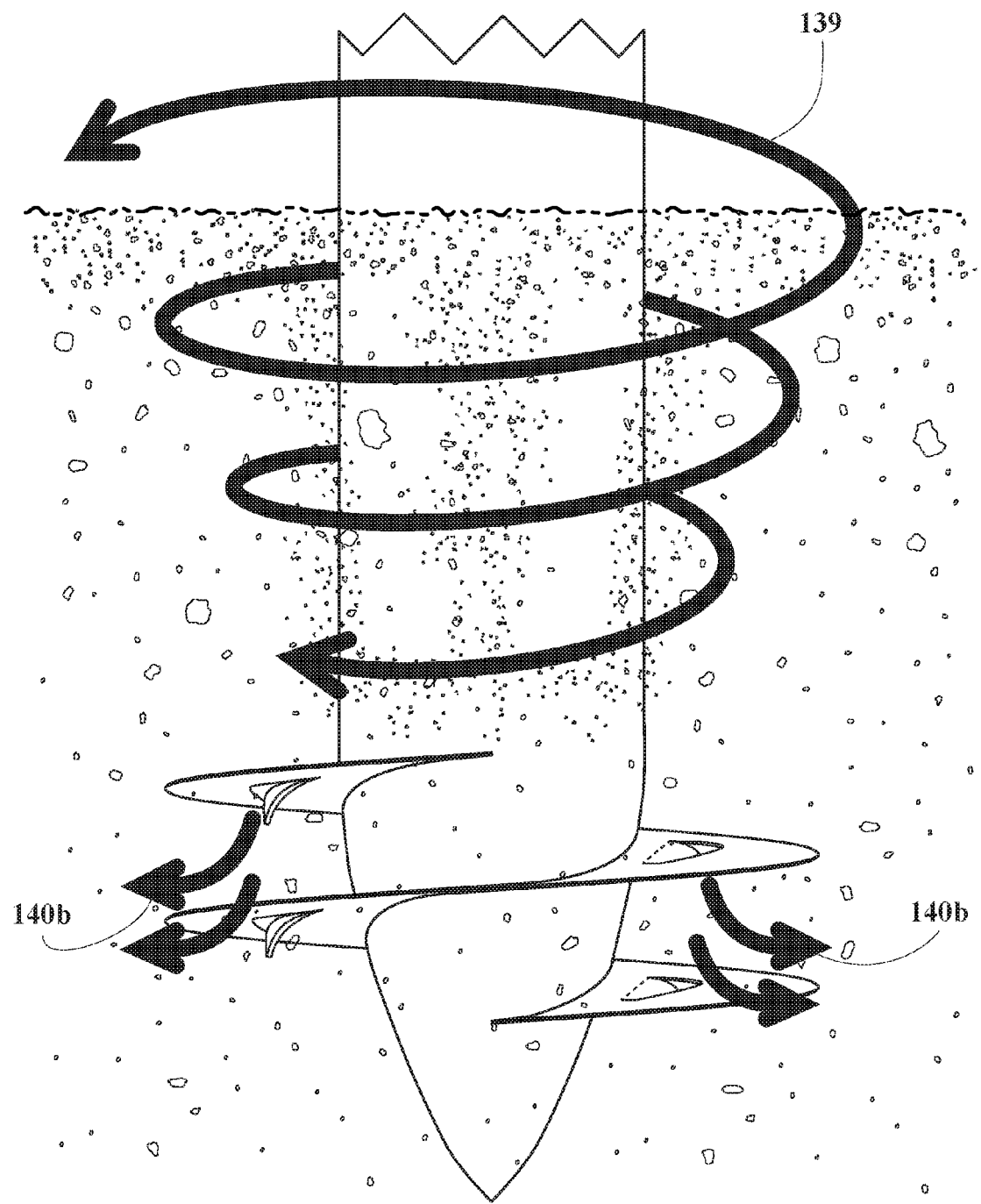

G) How to Screw the Twelve-Different-Application Umbrella System into a Beach or the Ground
   (using double-function wrenching-and-strapping handles 125)
   Referring to FIGS. 19B, 19C, and 19D:
1) Rotating double-function wrenching-and-strapping handles 125
   to drive spiral-shovel umbrella spike system 131 into the beach or the ground,
   in the direction of arrows 140a,
   such that lower multiple spiral digging shovels 133 shove the sand or soil out of the way to create multiple empty spiral shafts in the beach or the ground; and
2) Further, rotating double-function wrenching-and-strapping handles 125
   to further drive spiral-shovel umbrella spike system 131 into the beach or the ground,
   in the direction of arrows 140b,
   such that upper multiple spiral digging shovels 133 shove the sand or soil into the multiple empty spiral shafts in the beach or the ground to secure spiral-shovel umbrella spike system 131 and the twelve-different-application umbrella system.in the beach or the ground.

H) How to Unscrew the Twelve-Different-Application Umbrella System Out of a Beach or the Ground
   (using double-function wrenching-and-strapping handles 125)
1) Holding on double-function wrenching-and-strapping handles 125; and
2) Turning double-function wrenching-and-strapping handles 125
   to unscrew spiral-shovel umbrella spike system 131 off the beach or the ground.

Variation

Figure 20A:
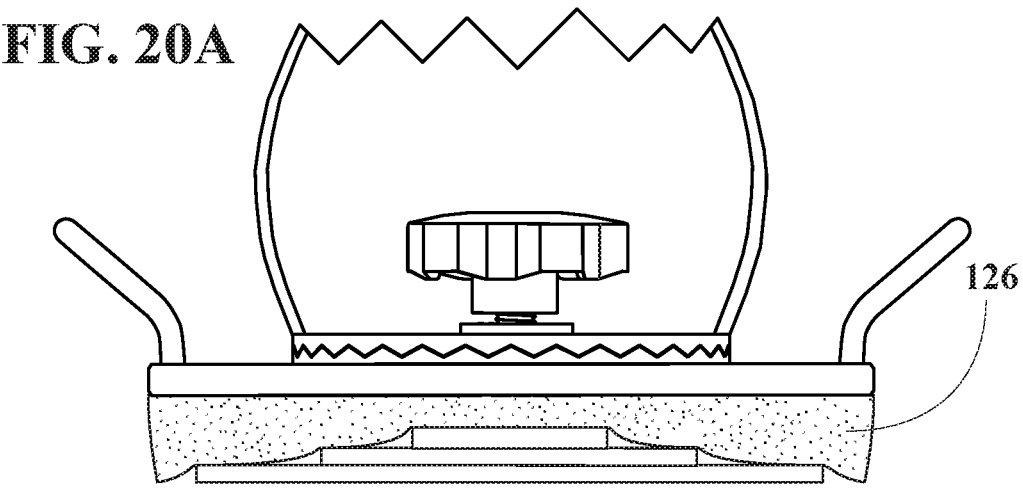
FIGS. 20A and 20B illustrate perspective views of how the surface-conforming-and-protecting adaptor under the multi-umbrella-pole base system conform to multiple different uneven surfaces when attached thereon (e.g., uneven post surfaces, uneven column surfaces, etc.).
Figure 20B:
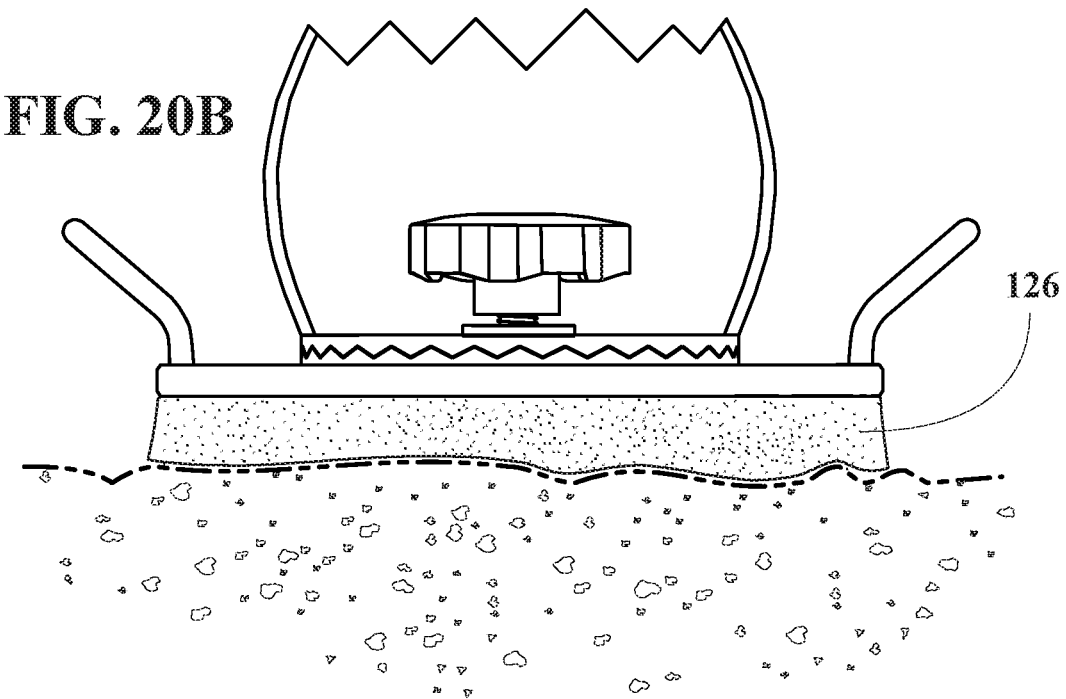
Figure 21:
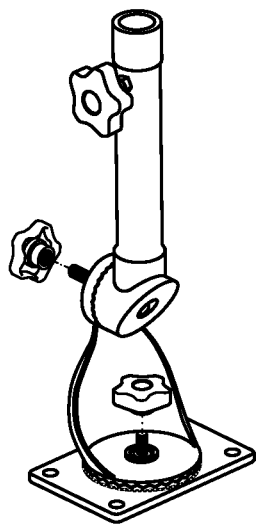
FIG. 21 illustrates a perspective view of an equivalent variation of the pivotable umbrella-pole receiver systems.
Figure 22:
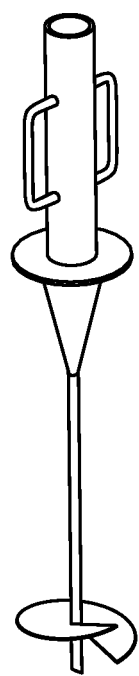
FIGS. 22 and 23 illustrate perspective views of equivalent variations of the spiral-shovel umbrella spike system, respectively.
Figure 23:
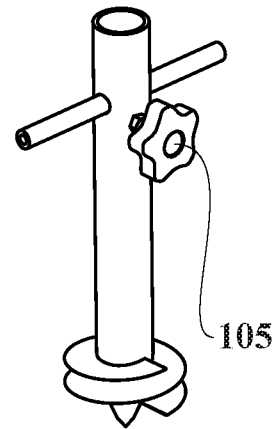

Any component of the twelve-different-application umbrella system can have any shape and size. Any component of the twelve-different-application umbrella system can be made of any material or any combination of any materials. Any component of the twelve-different-application umbrella system can be made of any flexible, semi-flexible, bendable, semi-bendable, rigid, or semi-rigid material(s). The twelve-different-application umbrella system can have at least one pivotable umbrella-pole receiver systems 101. FIGS. 20A and 20B illustrate how the surface-conforming-and-protecting adaptor 126 under multi-umbrella-pole base system 121 conform to multiple different uneven surfaces when attached thereon (e.g., uneven post surfaces, uneven column surfaces, etc.). FIG. 21 illustrates equivalent variations of pivotable umbrella-pole receiver systems 101, rotatable bulb-shaped pole-receiver-locking adjustor system 109, and multi-umbrella-pole base system 121, respectively. FIGS. 22 and 23 illustrate equivalent variation of spiral-shovel umbrella spike system 131, removable equivalent variation of double-function wrenching-and-strapping handles 125, and/or rotatable bulb-shaped pole-receiver-locking adjustor system 109.

MAJOR ADVANTAGES OF THE INVENTION

The present invention substantially departs from the conventional concepts and designs of the prior art. In doing so, the present invention provides a twelve-different-application umbrella system having many unique and significant features, functions, and advantages, which overcome all the disadvantages of the prior art, as follows:

The twelve-different-application umbrella system comprises:
1) Two pivotable umbrella-pole-receiver systems,
2) A rotatable bulb-shaped pole-receiver-locking adjustor system,
3) Two curved-surface adaptor systems,
4) A trailer-hitch adaptor system,
5) A multi-umbrella-pole base system,
6) Two base-securing strap systems,
7) A spiral-shovel umbrella spike system, and
8) Two telescopically and tiltably adjustable umbrella systems.

1) It is an object of the new invention to provide a twelve-different-application umbrella system, having two pivotable umbrella-pole receiver systems.
   Therefore, the twelve-different-application umbrella system:

a) Can couple, rotate, tilt and pivot, which enables two pivotable umbrella-pole receiver systems,
   to provide unlimited positioning for sunshade, rain and weather relief, and privacy;
b) Can couple, rotate, tilt and pivot, which enables two pivotable umbrella-pole receiver systems,
   to provide sunshade, rain and weather relief, and privacy for activities such as picnics
   (FIGS. 5C, 9A, 9B, 10A, 10B, 14A, 14B, 16A and 16B);
c) Can couple, rotate, tilt and pivot which enables two pivotable umbrella-pole receiver systems,
   to provide sunshade, rain and weather relief, and privacy for activities such as camping
   (FIGS. 5C, 10A, 10B, 11A, 11B, 14A and 14B);
d) Can couple, rotate, tilt and pivot, which enables two pivotable umbrella-pole receiver systems,
   to provide sunshade, rain and weather relief, and privacy for spectators at sports games
   (FIGS. 18A and 19A);
e) Can couple, rotate, tilt and pivot, which enables two pivotable umbrella-pole receiver systems,
   to provide sunshade, rain and weather relief, and privacy for recreation on the beach, in parks, and in back yards
   (FIGS. 9A, 9B, 10A, 10B, 11A, and 11B);
f) Can couple, rotate, tilt and pivot, which enables two pivotable umbrella-pole receiver systems,
   to provide sunshade, rain and weather relief, and privacy for commercial use in restaurants, and golf resorts;
   (FIGS. 13A, 13B, 18A, and 18B);
g) Can couple, rotate, tilt and pivot, which enables two pivotable umbrella-pole receiver systems,
   to provide sunshade, rain and weather relief, and privacy for commercial use on restaurant sidewalks
   (FIGS. 13A, 13B, 18A, and 18B);
h) Can couple, rotate, tilt and pivot, which enables two pivotable umbrella-pole receiver systems,
   to provide sunshade, rain and weather relief, and privacy for activities such as tailgate parties
   (FIGS. 15A and 15B);
i) Can couple, rotate, tilt and pivot, which enables two pivotable umbrella-pole receiver systems,
   to provide sunshade, rain and weather relief, and privacy for recreational vehicle activities and relaxing
   (FIGS. 9A and 9B);
j) Can enable two telescopically and tiltably adjustable umbrella systems to tilt and rotate on a pivotable pole receiver axis 360 degrees,
   to tilt and angle foldable umbrella canopies in any relative desired position
   (FIGS. 8A, 9A, 10A, 11A, 12A, 14A, 15A, 16A, 17A, 18A, and 19A);
k) Can enable two telescopically and tiltably adjustable umbrella systems to tilt and rotate on a pivotable pole receiver axis 360 degrees,
   to tilt and angle foldable umbrella canopies and block the sun's heat and rays from multiple angles
   (FIGS. 8A, 9A, 10A, 11A, 12A, 14A, 15A, 16A, 17A, 18A, and 19A);
l) Can enable two telescopically and tiltably adjustable umbrella systems to tilt and rotate on a pivotable pole receiver axis 360 degrees,
   to tilt and angle foldable umbrella canopies and block rain from multiple angles
   (FIGS. 8A, 9A, 10A, 11A, 12A, 14A, 15A, 16A, 17A, 18A, and 19A);
m) Can enable two telescopically and tiltably adjustable umbrella systems to tilt and rotate on a pivotable pole receiver axis 360 degrees,
   to tilt and angle foldable umbrella canopies and block a neighbor's view from multiple desired angles, resulting in a privacy wall
   (FIGS. 24A, 24B, 24C, and 24D); and
n) Can couple which enables multiple combined two telescopically and tiltably adjustable umbrella systems;
   to tilt and angle multiple foldable umbrella canopies and configure unlimited privacy wall, surround, and overhead weather-sheltering configurations
   (FIGS. 8A, 9A, 10A, 11A, 12A, 14A, 15A, 16A, 17A, 18A, and 19A).

2) It is another object of the new invention to provide a twelve-different-application umbrella system, having two pivotable umbrella-pole receiver systems.
   Therefore, the twelve-different-application umbrella system:
   a) Can pivot in opposing orientations creating a portable enclosed privacy shield on 2 sides,
      to create a visually private space and block the sun's heat
      (FIGS. 8A, 9A, 10A, 11A, 12A, 14A, 15A, 16A, 17A, 18A, and 19A);
   b) Can create a portable enclosed privacy shield on 2 sides, with a fully-adjustable shade umbrella overhead at any angle,
      to create a visually private space and block the sun's heat
      (FIGS. 8A, 9A, 10A, 11A, 12A, 14A, 15A, 16A, 17A, 18A, and 19A);
   c) Can pivot in an opposing orientation, and the other in a 90-degree vertical orientation with one umbrella collapsed,
      to create a visually private space and block the sun's heat
      (FIGS. 8A, 9A, 10A, 11A, 12A, 14A, 15A, 16A, 17A, 18A, and 19A);
   d) Can pivot in 90-degree horizontal orientations creating a portable enclosed privacy shield on 4 sides,
      to create a visually private space and block the sun's heat
      (FIGS. 8A, 9A, 10A, 11A, 12A, 14A, 15A, 16A, 17A, 18A, and 19A);
   e) Can pivot in a 90-degree vertical orientation creating a portable privacy wall, with a fully-adjustable shade umbrella overhead at any angle,
      to create a visually private space and block the sun's heat
      (FIGS. 8A, 9A, 10A, 11A, 12A, 14A, 15A, 16A, 17A, 18A, and 19A);
   i) Can pivot in horizontally 90-degrees in 3 different directions, creating a portable enclosed privacy shield on 4 sides,
      to create a visually private space and block the sun's heat
      (FIGS. 8A, 9A, 10A, 11A, 12A, 14A, 15A, 16A, 17A, 18A, and 19A);
   j) Can pivot in a 90-degree horizontal orientation, creating a portable partially-surrounding privacy shield, to create a visually private space and block the sun's heat
(FIGS. 8A, 9A, 10A, 11A, 12A, 14A, 15A, 16A, 17A, 18A, and 19A); and k) Can pivot, one in a 90-degree horizontal orientation, the other in a 90-degree vertical orientation with one umbrella collapsed,
to create a visually private space and block the sun's heat
(FIGS. 8A, 9A, 10A, 11A, 12A, 14A, 15A, 16A, 17A, 18A, and 19A).

3) It is still another object of the new invention to provide a twelve-different-application umbrella system, having a rotatable bulb-shaped pole-receiver-locking adjustor system.

Therefore, the twelve-different-application umbrella system:

a) Can adapt and become indexable, rotatable, and lockable-in-any-angle,
to form an unlimited series of pivotable umbrella-pole receiver systems, which can be tilted and angled in any respective orientation;

b) Can couple to a second rotatable bulb-shaped pole-receiver-locking adjustor system,
to form an unlimited series of pivotable umbrella-pole receiver systems, which can be tilted and angled in any respective orientation;

c) Can couple to a third rotatable bulb-shaped pole-receiver-locking adjustor system,
to form an unlimited series of pivotable umbrella-pole receiver systems, which can be tilted and angled in any respective orientation; and d) Can couple to any number of rotatable bulb-shaped pole-receiver-locking adjustor systems,
to form an unlimited series of pivotable umbrella-pole receiver systems, which can be tilted and angled in any respective orientation.

4) It is a further object of the new invention to provide a twelve-different-application umbrella system, having a spiral-shovel umbrella spike system Therefore, the twelve-different-application umbrella system:

a) Can enable two pivotable umbrella-pole receiver systems,
to be secured into a sandy ground surface
(FIGS. 19C and 19D);

b) Can enable two pivotable umbrella-pole receiver systems,
to be secured into a soil surface
(FIGS. 19A and 19B);

c) Can enable two pivotable umbrella-pole receiver systems,
to be secured into a gravel surface; and d) Can detach quickly and easily from two pivotable umbrella-pole receiver systems by use of a receiver-adjusting knob-screw,
to allow two pivotable umbrella-pole receiver systems to remain on ground surface while it is not needed.

5) It is an even further object of the new invention to provide a twelve-different-application umbrella system, having a tube-shaped spiral spike.

Therefore, the twelve-different-application umbrella system:

a) Can penetrate deep into the sand,
to securely erect two pivotable umbrella-pole receiver systems and counteract the forces from wind and rain;

b) Can penetrate deep into the soil,
to securely erect two pivotable umbrella-pole receiver systems and counteract the forces from wind and rain;

c) Can penetrate deep into the gravel,
to securely erect two pivotable umbrella-pole receiver systems and counteract the forces from wind and rain; and d) Can easily penetrate sand, soil or gravel surfaces,
to efficiently allow a person to mount two pivotable umbrella-pole receiver systems with no tools required.

6) It is still another object of the new invention to provide a twelve-different-application umbrella system, having multiple spiral digging shovels.

Figure 5A:
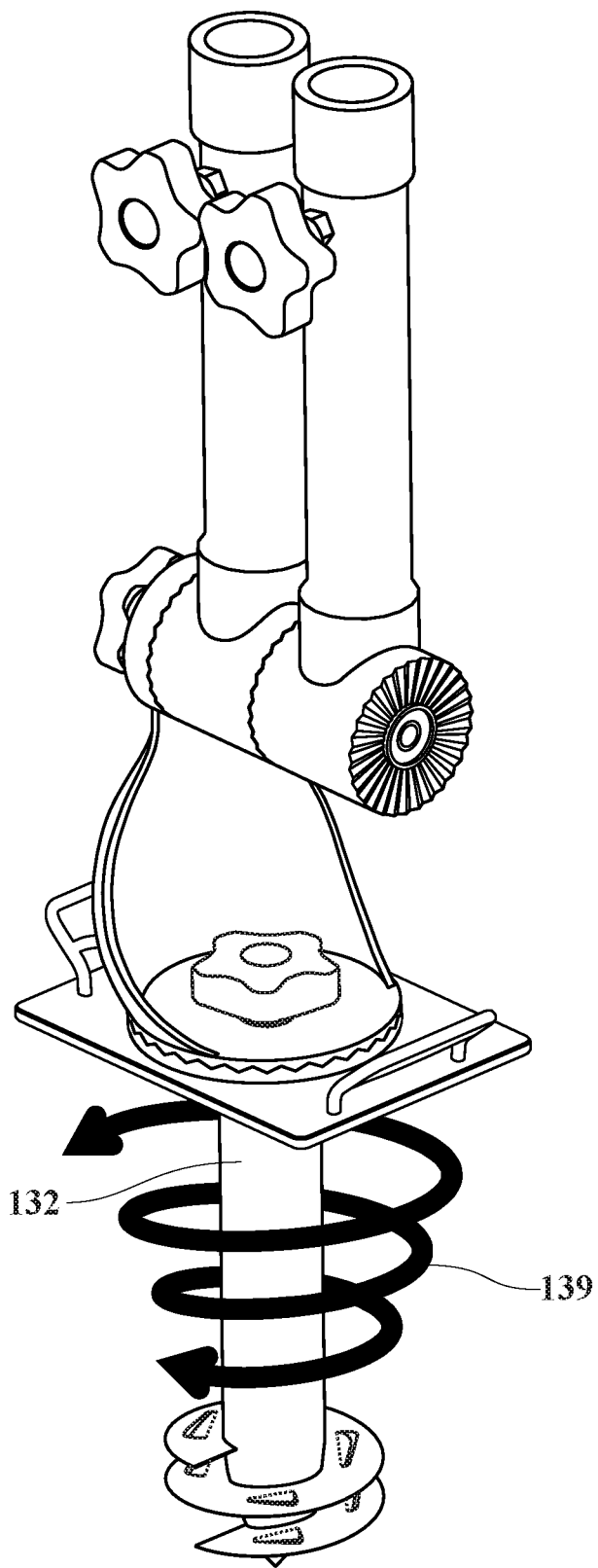
FIGS. 5A, 5B, and 5C illustrate perspective views of how a spiral-shovel umbrella spike system and its multiple spiral digging shovels spirally dig into the ground.
Figure 5B:
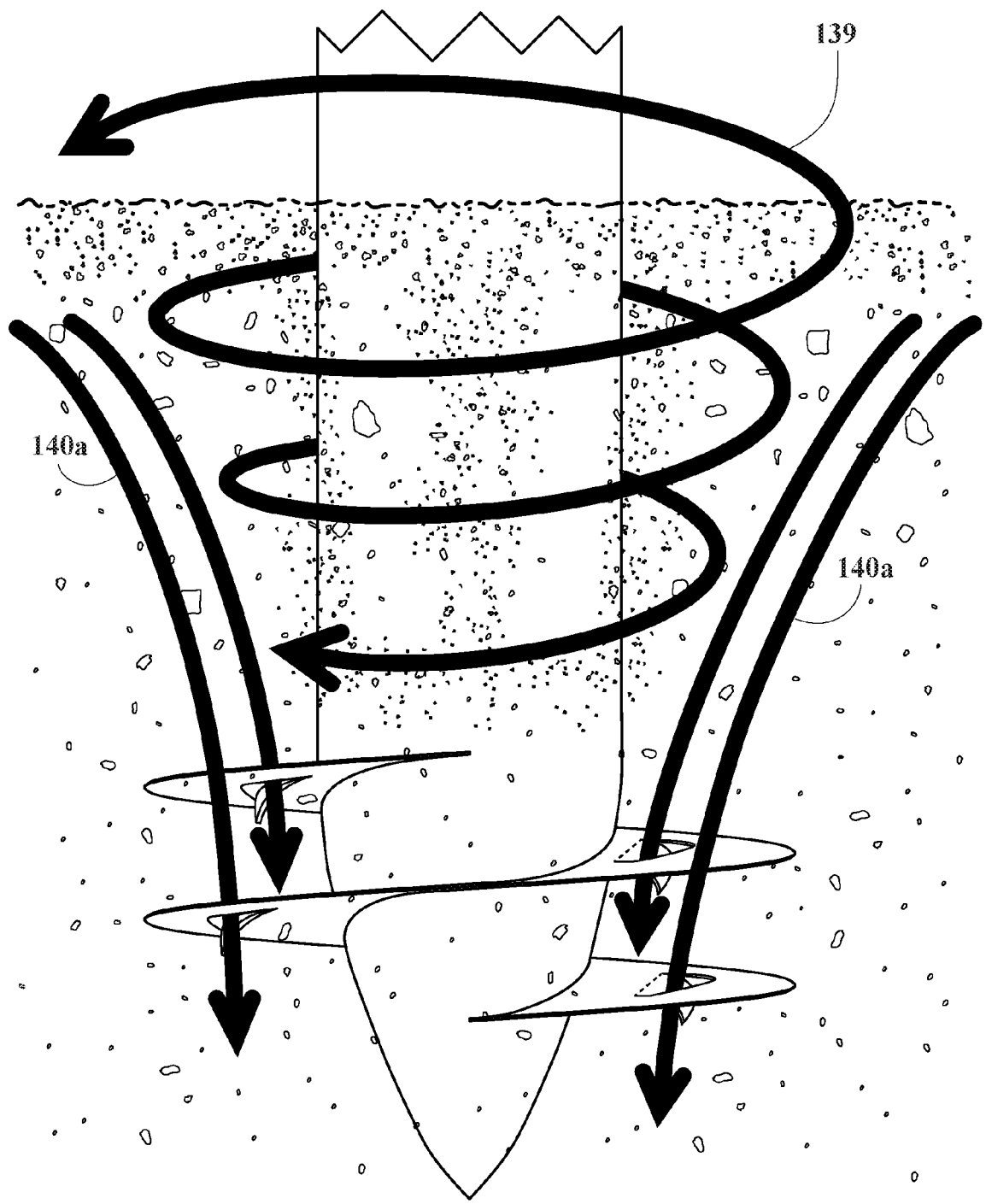
Figure 5C:
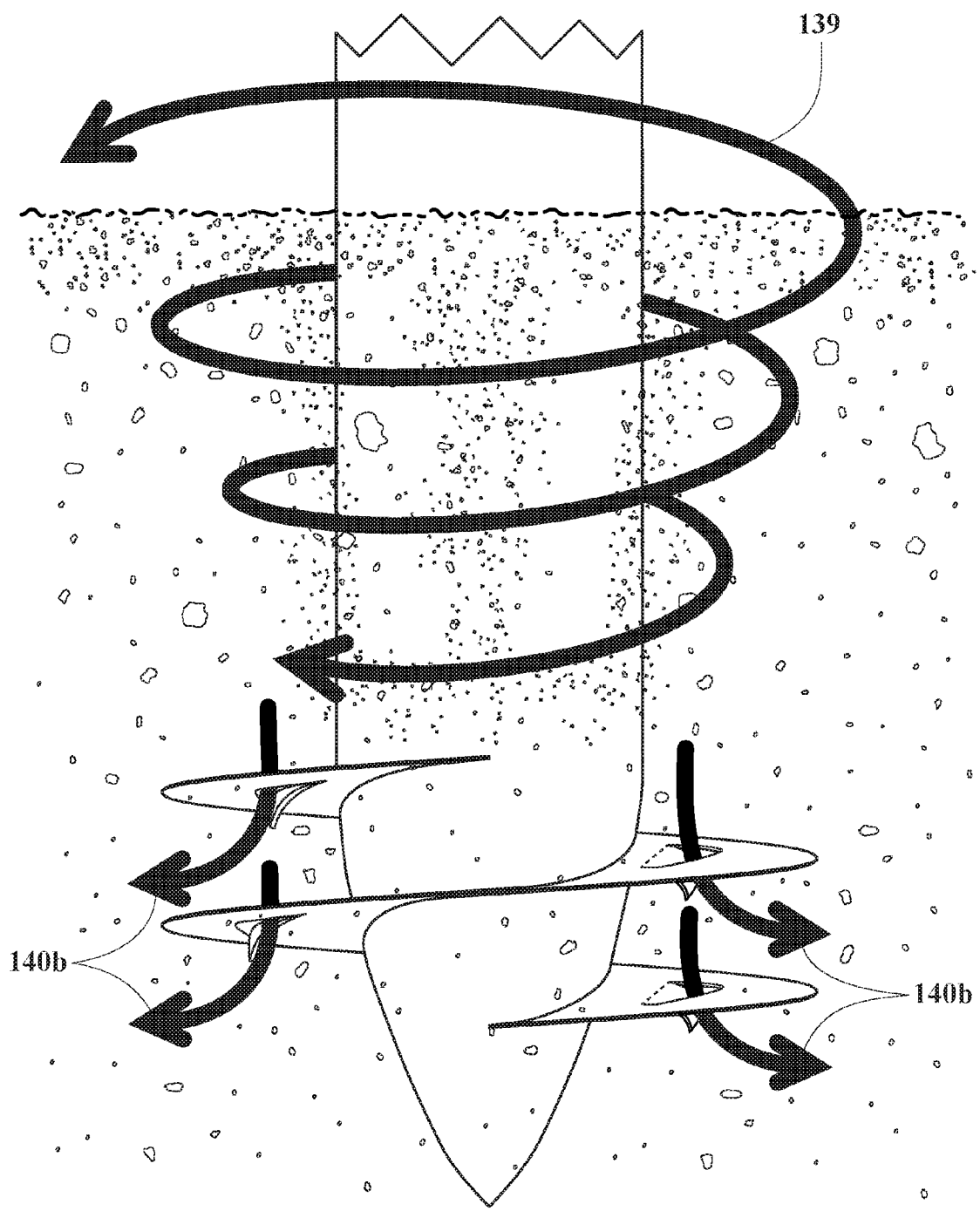
Figure 6:
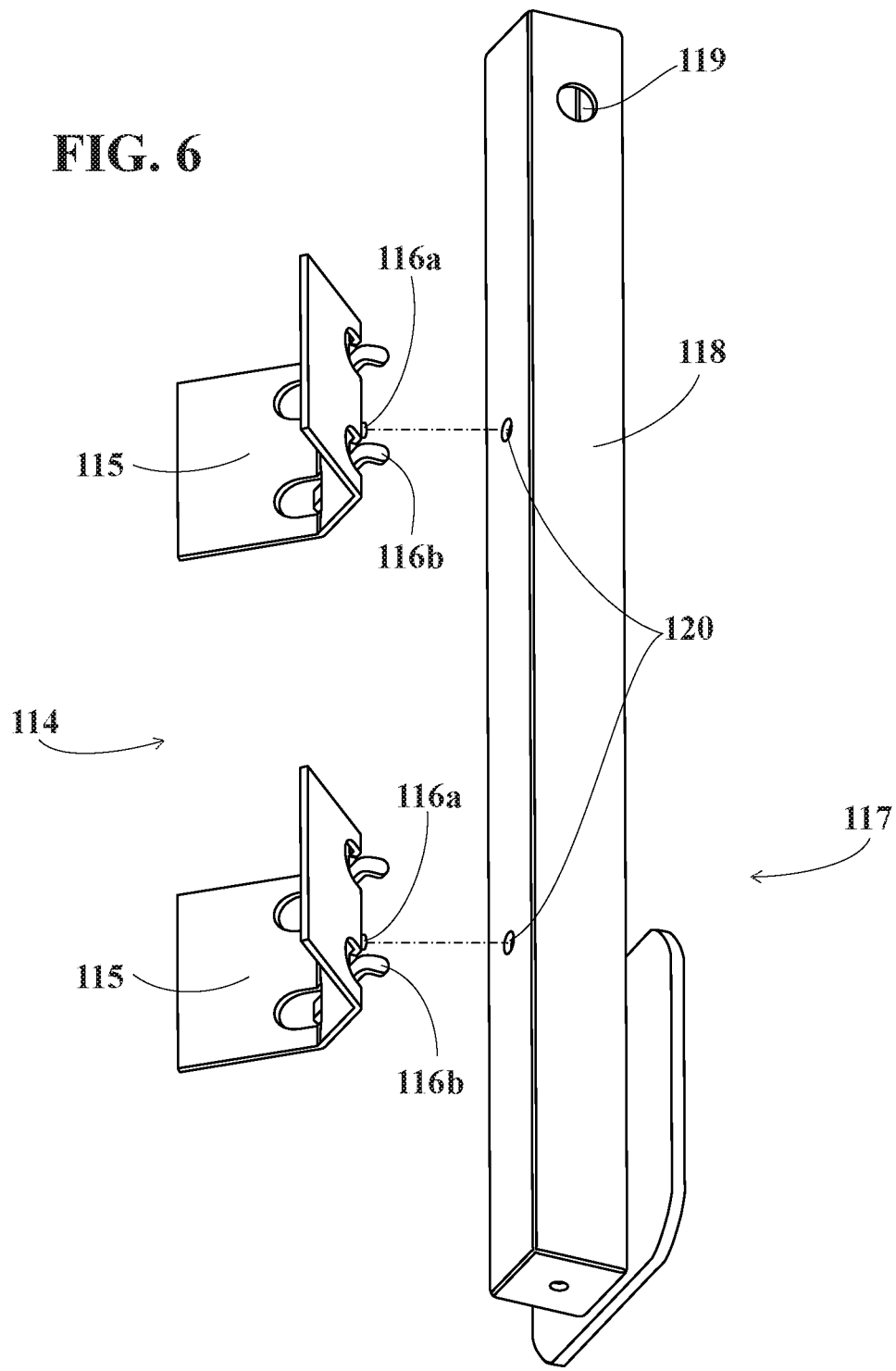
FIGS. 6 and 7 illustrate perspective views of how a trailer-hitch adaptor system is attached to the multi-umbrella-pole base system and two curved-surface adaptor systems.
Figure 7:
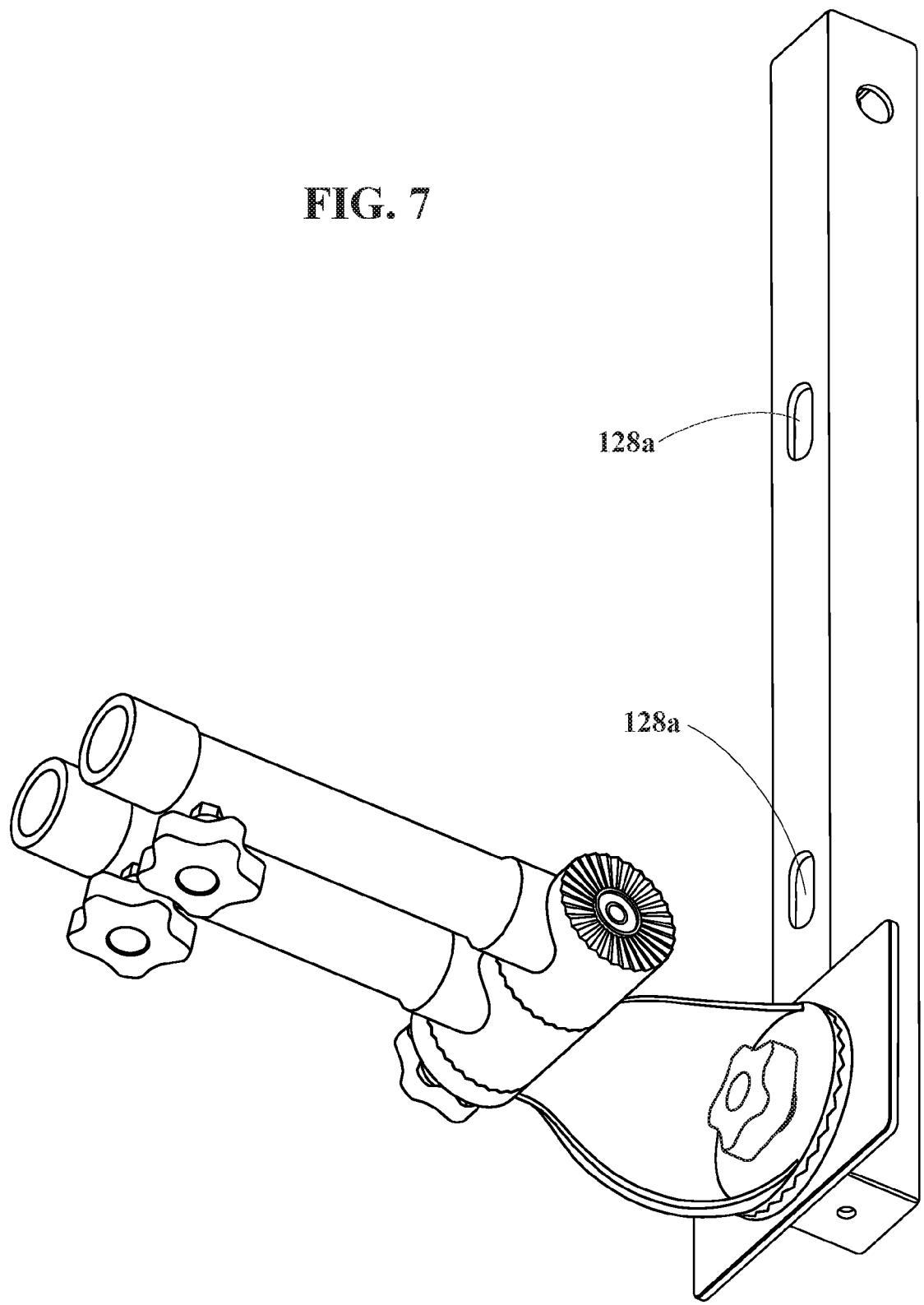

Therefore, the twelve-different-application umbrella system:

a) Can provide multiple contoured wedged openings in a tube-shaped spiral spike which spiral into sand,
to quickly and easily penetrate when inserting while creating multi-directional resistance, and when attempting to un-spiral while extracting
(FIGS. 4, 5A, 5B, and 5C);

b) Can provide multiple contoured wedged openings in a tube-shaped spiral spike which spiral into soil,
to quickly and easily penetrate when inserting while creating multi-directional resistance, and when attempting to un-spiral while extracting
(FIGS. 4, 5A, 5B, and 5C);

c) Can provide multiple contoured wedged openings in a tube-shaped spiral spike which spiral into gravel,
to quickly and easily penetrate when inserting while creating multi-directional resistance, and when attempting to un-spiral while extracting
(FIGS. 4, 5A, 5B, and 5C); and d) Can provide multiple empty spaces in contoured wedged openings in a tube-shaped spiral spike,
to compact and bind clumps of sand, soil, or gravel to stabilize two pivotable umbrella-pole receiver systems
(FIGS. 5B and 5C).

7) It is yet another object of the new invention to provide a twelve-different-application umbrella system, having two double-function wrenching-and-strapping handles.

Figure 2B:
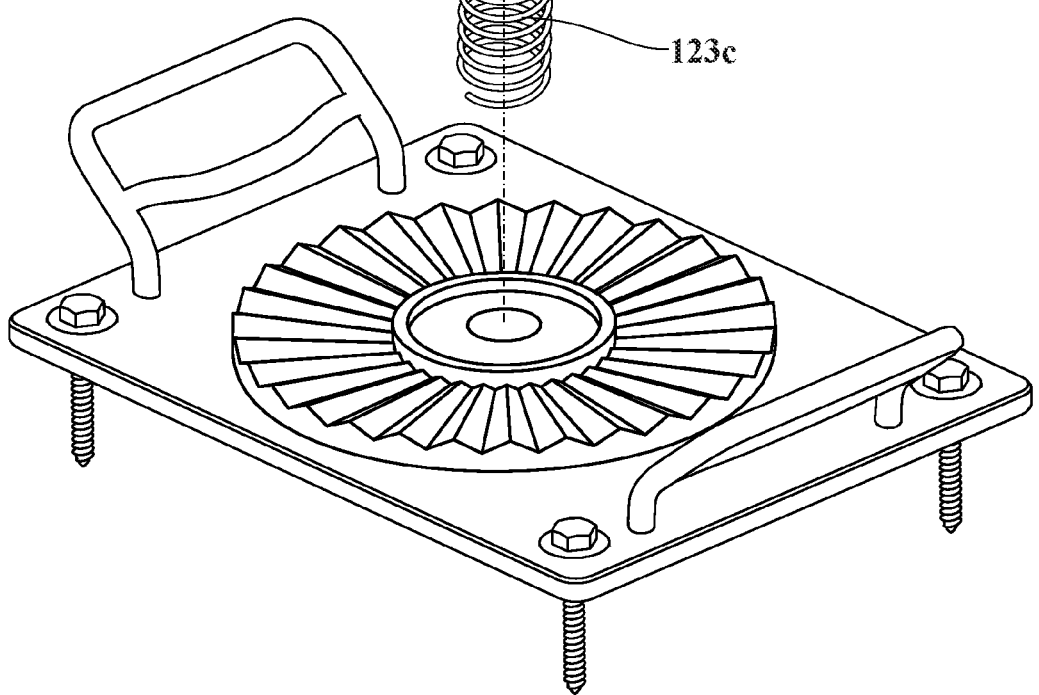
Figure 3:
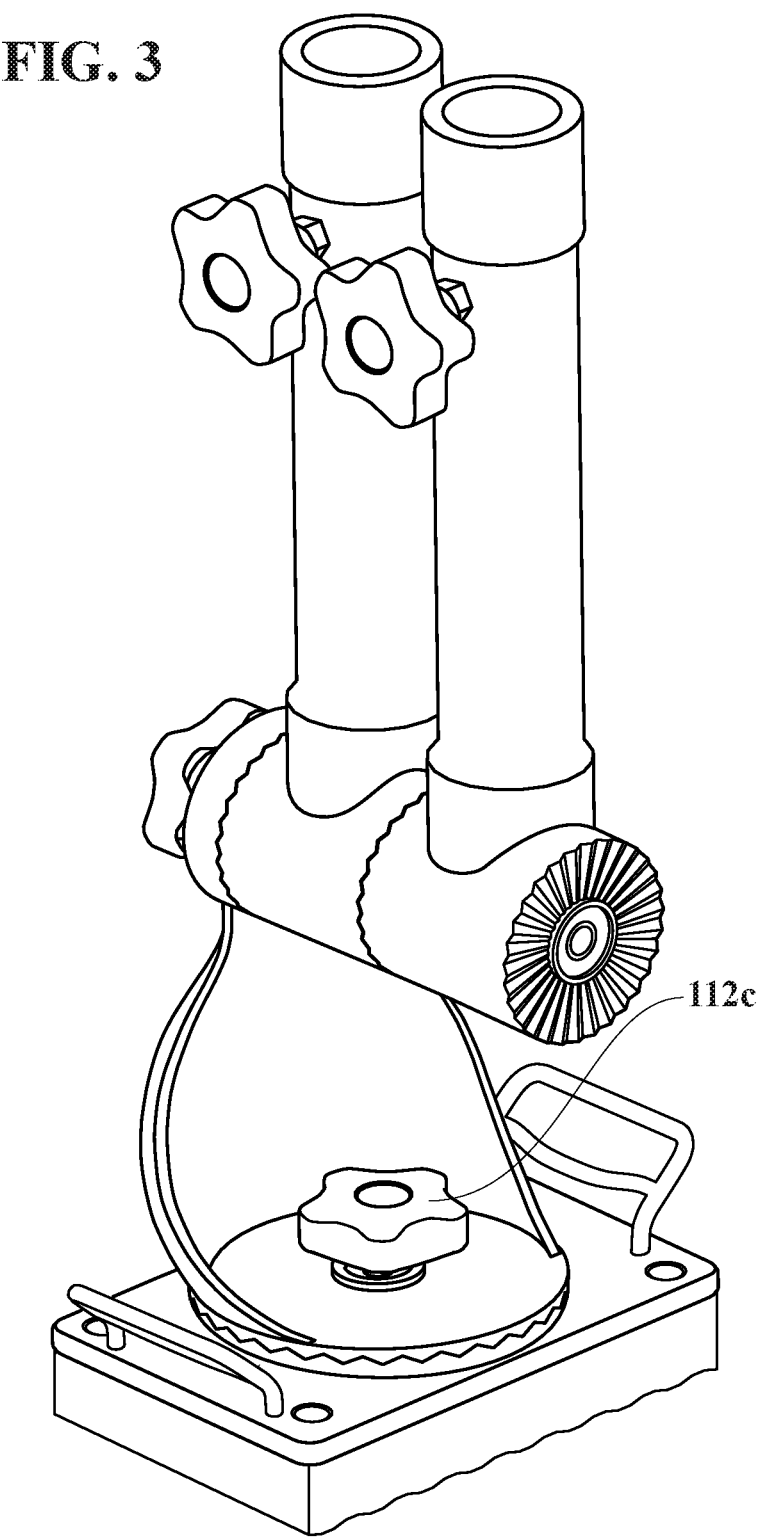
FIG. 3 illustrates a perspective view of a central adjustor-locking knob-screw, rotatably attaching the rotatable bulb-shaped pole-receiver-locking adjustor system to the multi-umbrella-pole base system.
Figure 4:
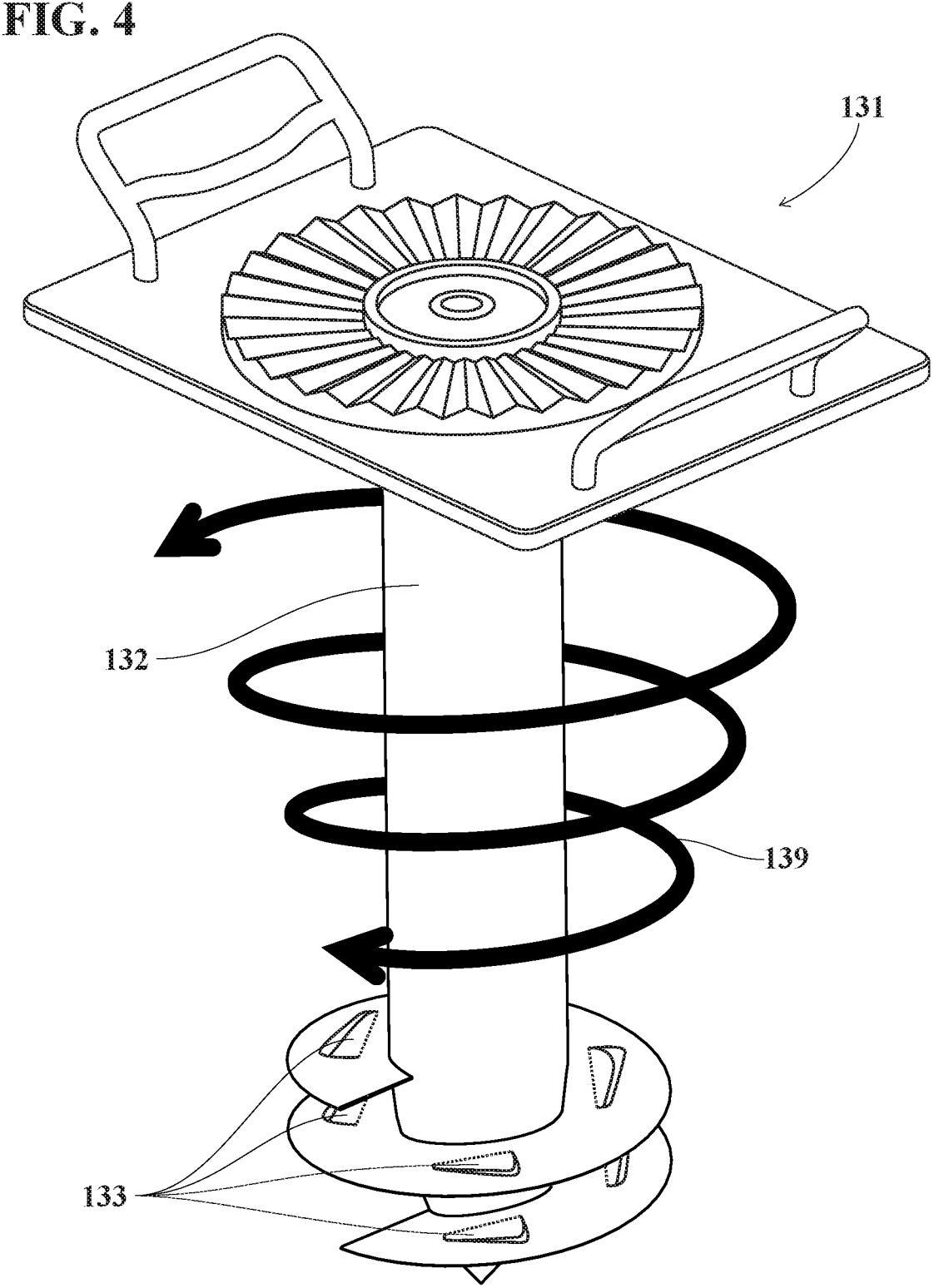
FIG. 4 illustrates a perspective view of how a spiral-shovel umbrella spike system is welded to the multi-umbrella-pole base system.
Figure 16A:
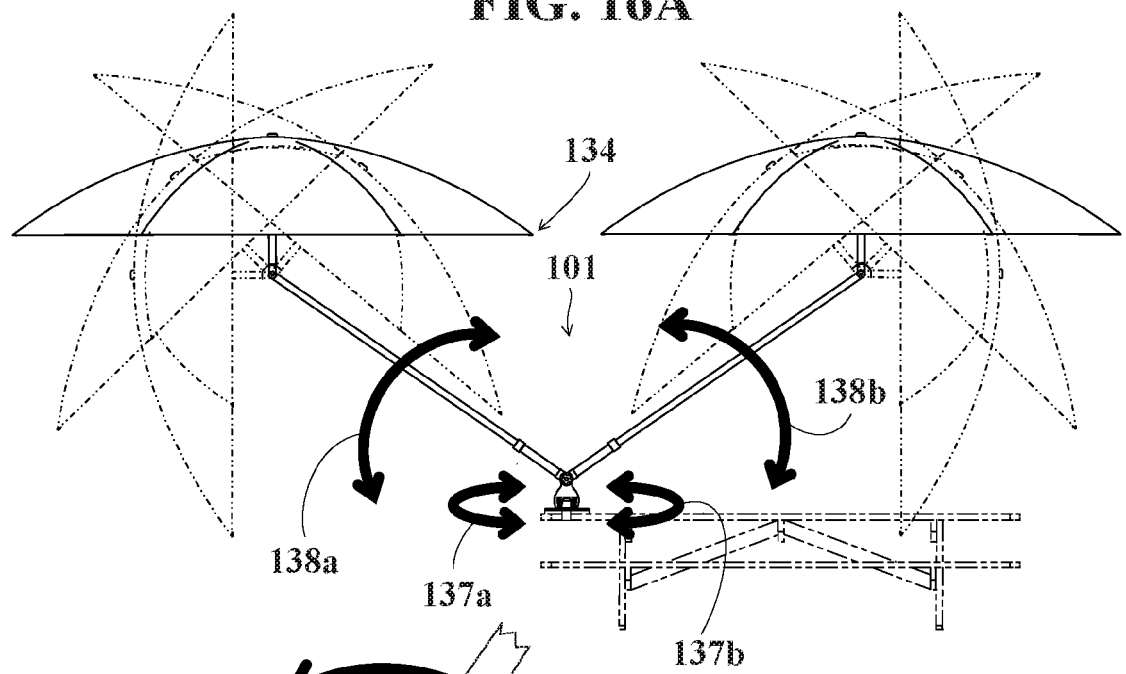
FIGS. 16A and 16B illustrate perspective views of how the multi-umbrella-pole base system and two telescopically and tiltably adjustable umbrella systems are attached to a table (e.g., a picnic table).
Figure 16B:
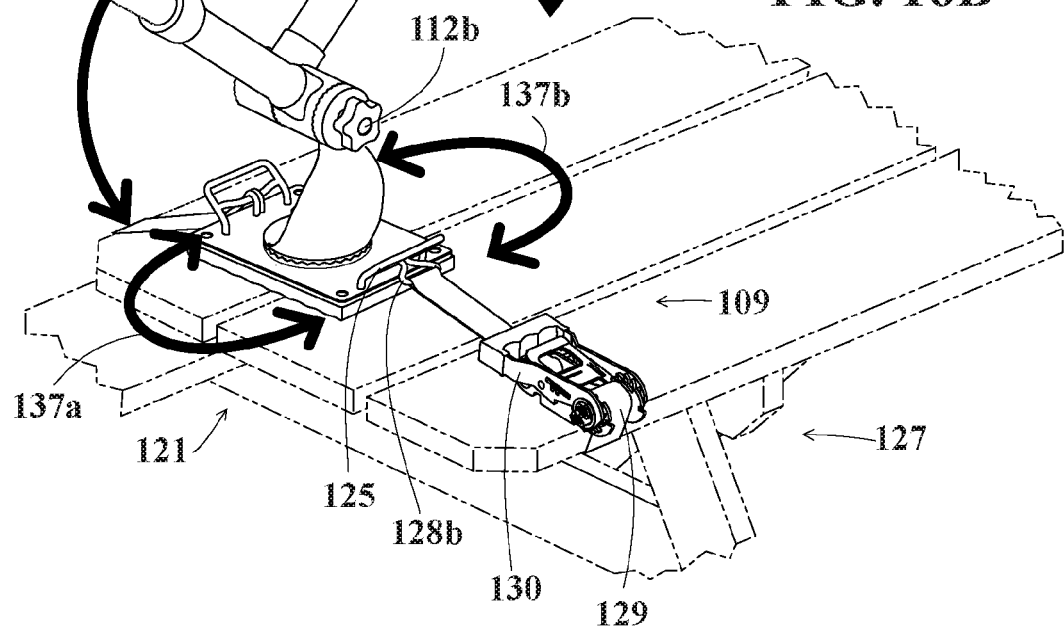

Therefore, the twelve-different-application umbrella system:

a) Can enable firm grip,
to easily install a spiral umbrella spike system into soil or sand without the use of tools
(FIGS. 2A, 2B, 19B and 19B);

b) Can attach to a dog leash or rope, as a method,
to tether a dog, in a park, at home, or the beach;

c) Can enable firm grip,
to easily uninstall a spiral umbrella spike system out of soil or sand without the use of tools
(FIGS. 2A, 2B, 19B and 19B); and d) Can allow easy installation of a spiral umbrella spike system,
to simply secure it to a bench using ratchet strap, cam-strap, bungee, rope, or other securing strap.
(FIGS. 16A and 16B).

8) It is still yet another object of the new invention to provide a twelve-different-application umbrella system, having a trailer-hitch-adaptor system.

Figure 13A:
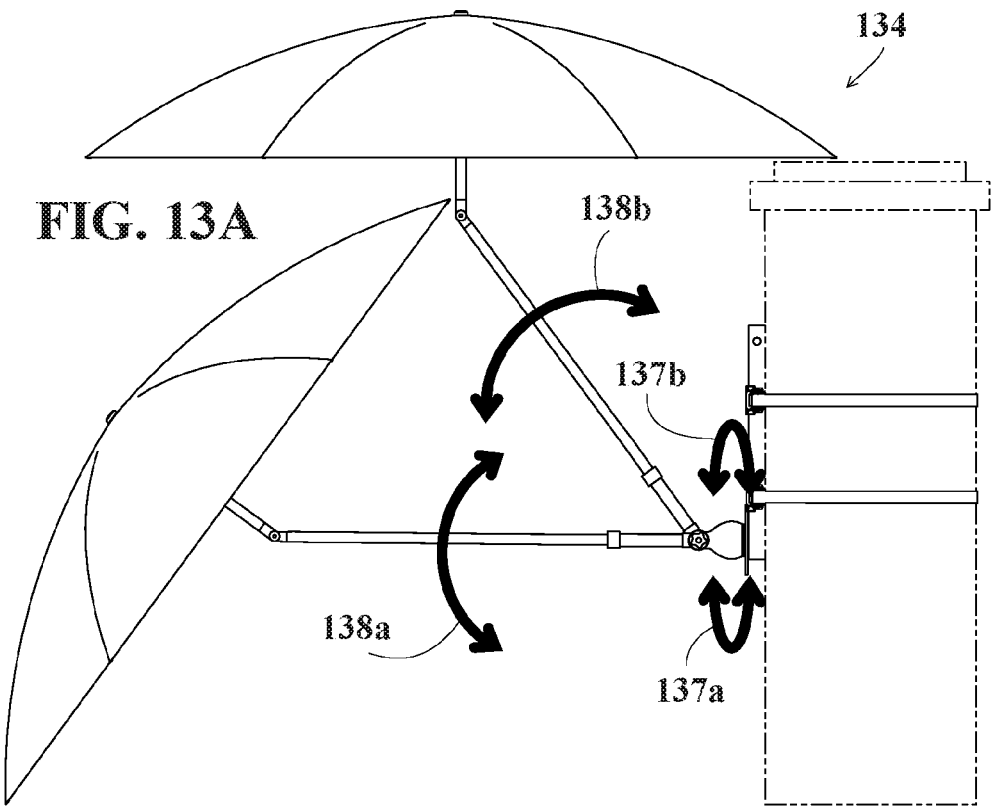
FIGS. 13A and 13B illustrate perspective views of how the trailer-hitch adaptor system and two telescopically and tiltably adjustable umbrella systems are attached to a column (e.g., a building column).
Figure 13B:
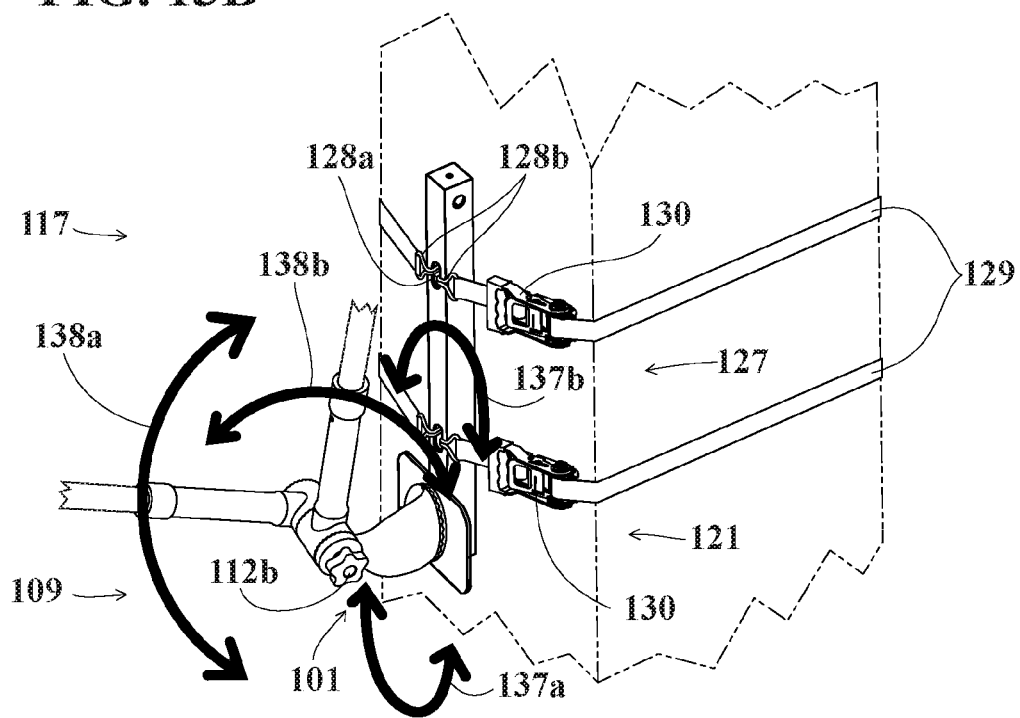

Therefore, the twelve-different-application umbrella system:
   a) Can provide adaptation for two pivotable umbrella-pole receiver systems,
      to easily, rotatably, and tiltably mount to the trailer hitch of a pick-up truck
      (FIGS. 8A and 8B);
   b) Can provide adaptation for two pivotable umbrella-pole receiver systems,
      to easily, rotatably, and tiltably mount to the bumper of a pick-up truck
      (FIGS. 9A and 9B);
   c) Can provide adaptation for two pivotable umbrella-pole receiver systems,
      to easily, rotatably, and tiltably mount to the tailgate of a pick-up truck
      (FIGS. 15A and 15B);
   d) Can provide adaptation for two pivotable umbrella-pole receiver systems,
      to easily, rotatably, and tiltably mount to the bumper of a recreational vehicle
      (FIGS. 9A and 9B);
   e) Can provide adaptation for two pivotable umbrella-pole receiver systems,
      to easily, rotatably, and tiltably mount to a picnic table
      (FIGS. 10A and 10B);
   f) Can provide adaptation for two pivotable umbrella-pole receiver systems,
      to easily, rotatably, and tiltably mount to a deck surface;
   g) Can provide adaptation for two pivotable umbrella-pole receiver systems,
      to easily, rotatably, and tiltably mount to a deck railing
      (FIGS. 11A and 11B);
   h) Can provide adaptation for two pivotable umbrella-pole receiver systems,
      to easily, rotatably, and tiltably mount to a fence post
      (FIGS. 12A and 12B); and
   i) Can provide adaptation for two pivotable umbrella-pole receiver systems,
      to easily, rotatably, and tiltably mount to a building column
      (FIGS. 13A and 13B).

9) It is still yet an even further object of the new invention to provide a twelve-different-application umbrella system, having two curved-surface adaptor system.

Therefore, the twelve-different-application umbrella system:
   a) Can provide adaptation in conjunction with s trailer-hitch-adaptor tube for two pivotable umbrella-pole receiver systems,
      to mount to a curved surface of a tree
      (FIGS. 14A and 14B);
   b) Can provide adaptation in conjunction with a trailer-hitch-adaptor tube for two pivotable umbrella-pole receiver systems,
      to mount to a curved surface of a pole;
   c) Can provide adaptation in conjunction with a trailer-hitch-adaptor tube for two pivotable umbrella-pole receiver systems,
      to mount to a curved surface of a post;
   d) Can provide adaptation in conjunction with a trailer-hitch-adaptor tube for two pivotable umbrella-pole receiver systems,
      to mount to a curved surface of a column; and
   e) Can provide adaptation in conjunction with a trailer-hitch-adaptor tube for two pivotable umbrella-pole receiver systems,
      to mount horizontally, vertically, or angledly to any curved surface.

10) It is still yet an even further object of the new invention to provide a twelve-different-application umbrella system, having a multi-umbrella-pole base system.

Figure 18A:
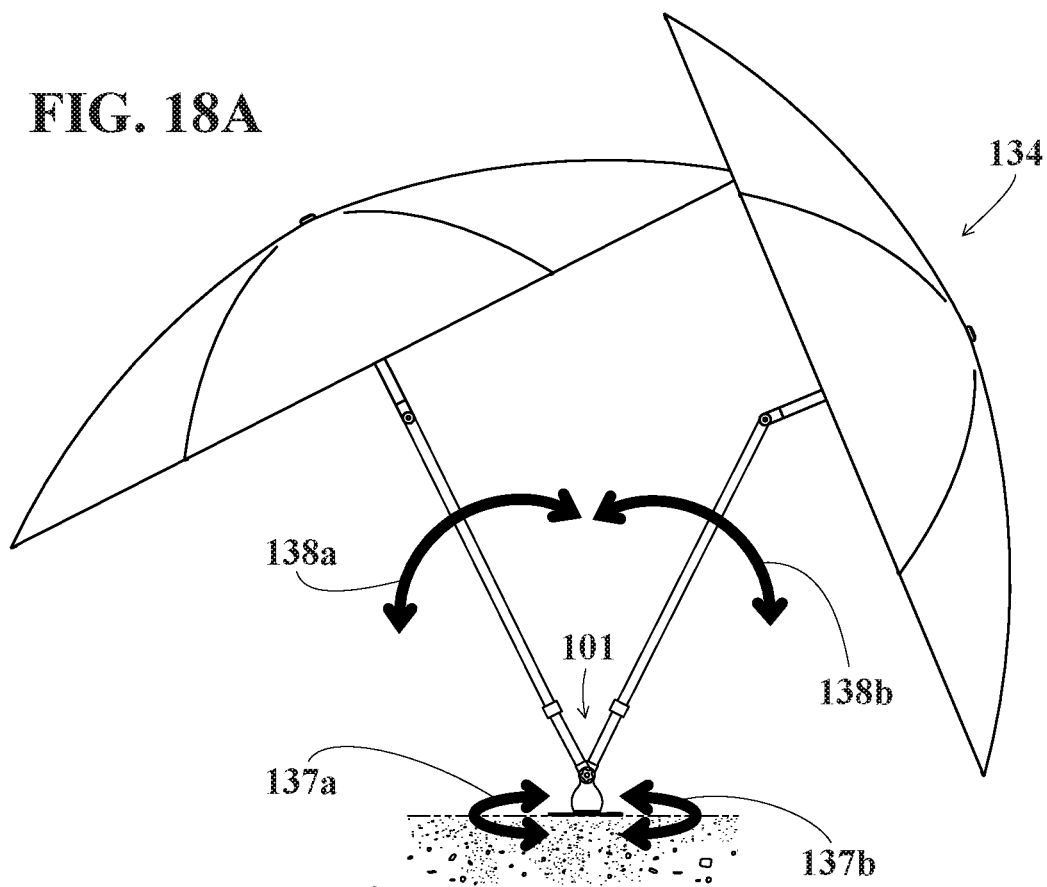
FIGS. 18A and 18B illustrate perspective views of how the multi-umbrella-pole base system and two telescopically and tiltably adjustable umbrella systems are attached to a cement floor (e.g., a cement floor next to a swimming pool), or are attached to a wooden floor (e.g., a wooden floor of a patio), respectively.

Therefore, the twelve-different-application umbrella system:
   a) Can enable the two pivotable umbrella-pole receiver systems,
      to be screw-mounted to a wooden deck surface
      (FIG. 18B);
   b) Can enable the two pivotable umbrella-pole receiver systems,
      to be screw-mounted to a composite material deck surface
      (FIG. 18B);
   c) Can enable the two pivotable umbrella-pole receiver systems,
      to be concrete-anchor-mounted to a concrete patio surface
      (FIG. 18A);
   d) Can enable the two pivotable umbrella-pole receiver systems,
      to be concrete-anchor-mounted to a concrete restaurant floor surface
      (FIG. 18A);
   e) Can enable the two pivotable umbrella-pole receiver systems,
      to be concrete-anchor-mounted to a concrete sidewalk surface
      (FIG. 18A);
   f) Can enable the two pivotable umbrella-pole receiver systems,
      to be lag-bolted to an interior restaurant wood floor surface
      (FIG. 18B); and
   g) Can enable the two pivotable umbrella-pole receiver systems,
      to be lag-bolted to an asphalt parking lot surface
      (FIG. 18A).

11) It is still yet an even further object of the new invention to provide a twelve-different-application umbrella system, having a surface-conforming-and-protecting adaptor.

Figure 17A:
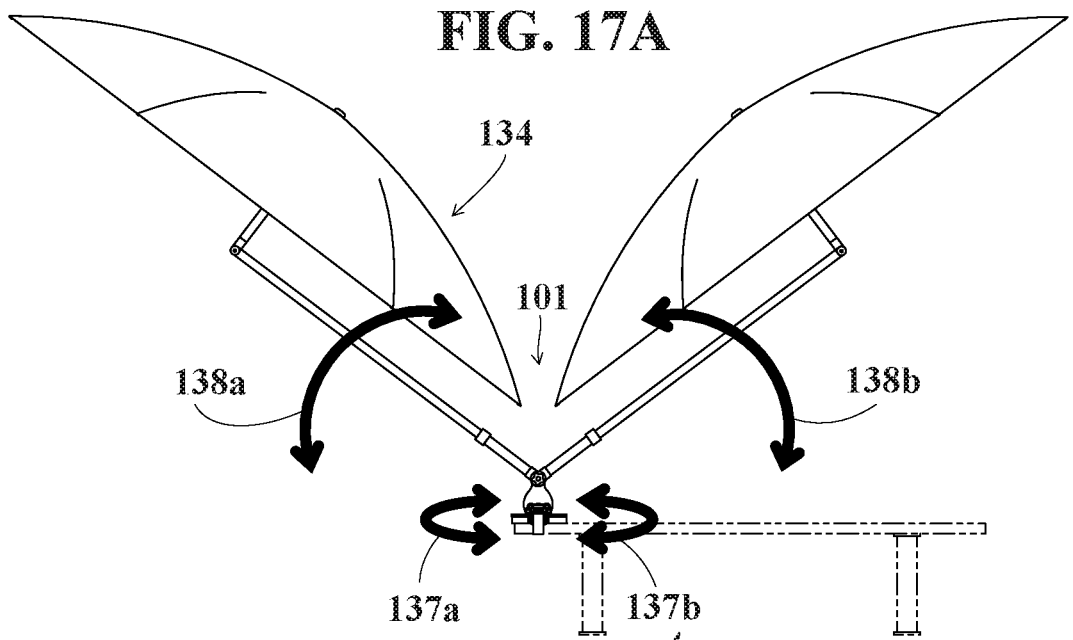
FIGS. 17A and 17B illustrate perspective views of how the multi-umbrella-pole base system and two telescopically and tiltably adjustable umbrella systems are attached to a bench or a bleacher.
Figure 17B:
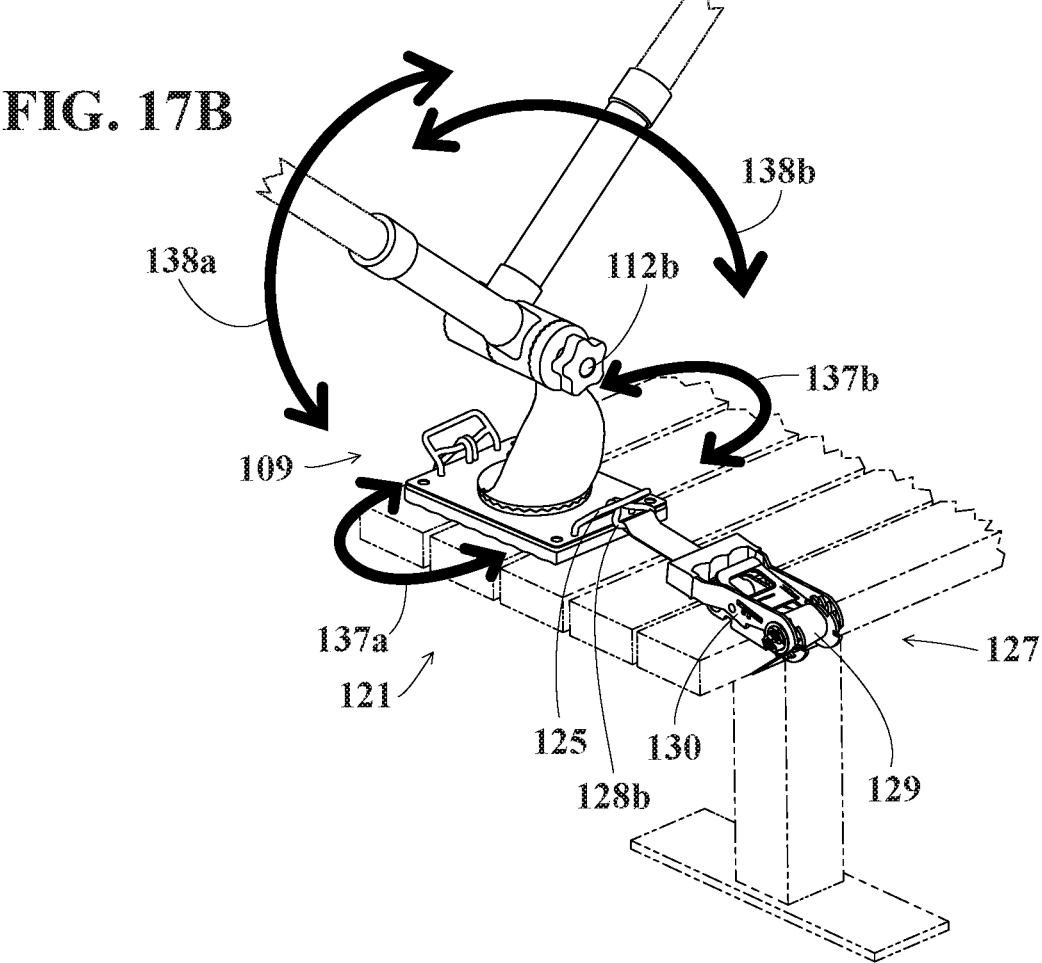
Figure 18B:
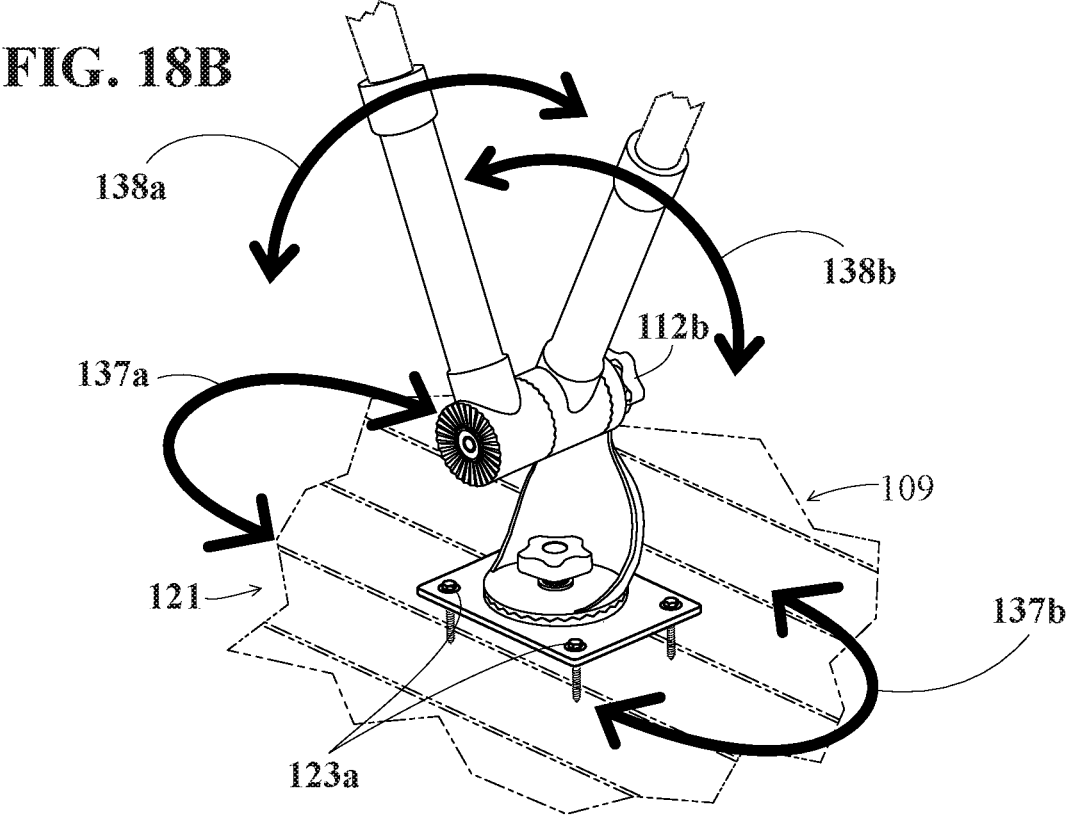

Therefore, the twelve-different-application umbrella system:
   a) Can allow the two pivotable umbrella-pole receiver systems,
      to be securely and adjustably attached to many uneven surfaces at the same time
      (FIGS. 2A, 20A, and 20B);
   b) Can allow the two pivotable umbrella-pole receiver systems,
      to be securely and adjustably attached to many rocky surfaces at the same time
      (FIG. 20B);
   c) Can allow the two pivotable umbrella-pole receiver systems,
      to be securely and adjustably attached to a pebbly surface;

d) Can allow the two pivotable umbrella-pole receiver systems,
to be securely and adjustably attached to a flat surface;
e) Can allow the two pivotable umbrella-pole receiver systems,
to be securely and adjustably attached to an angled surface
(FIGS. 2A, 20A, and 20B);
f) Can allow the two pivotable umbrella-pole receiver systems,
to be securely and adjustably attached to a rounded surface;
g) Can removably and interchangeably allow a spiral umbrella spike system, or a trailer-hitch-adaptor tube,
to be substituted for needed conditions and uses
(FIGS. 17A, 17B, 18A, 18B, 19A, and 19B); and
h) Can be made of soft, pliable, unabrasive material,
to protect material surfaces to which it may be mounted, such as finished wood, paint, polished metal, or polished stone
(FIGS. 16B, 17B, and 18B).

What is claimed is:

1. A multi-application rotatable and pivotable umbrella system comprising:
at least one pole-receiving system each comprising:
a pivotable pole receiver having a receiver end,
a pole-centering sleeve slid on said receiver end,
a pole-locking hole threadedly drilled through said pivotable pole receiver,
a pole-locking knob-screw screwed through said pole-locking hole, and
a plurality of receiver gears molded to said pivotable pole receiver for adjusting said pivotable pole receiver;
a receiver-adjusting system comprising:
a rotatable receiver adjustor having an adjustor bottom, said rotatable receiver adjustor pivotably screwed to said pivotable pole receiver,
a plurality of adjustor gears molded to said rotatable receiver adjustor for engaging to said receiver gears to lock said pivotable pole receiver,
a central adjustor hole drilled through said adjustor bottom,
an adjustor-locking knob-screw screwed through said central adjustor hole, and
a plurality of bottom gears molded to said adjustor bottom;
a trailer-hitch-adapting system comprising:
a trailer-hitch-adapting tube
a trailer-hitch-adapting bolt hole drilled through said trailer-hitch-adapting tube,
at least one trailer-hitch-adapting peg hole drilled in said trailer-hitch-adapting tube, and
at least one trailer-hitch-adapting hook hole drilled in said trailer-hitch-adapting tube;
at least one curved-surface-adapting systems each comprising:
a curved-surface-adapting plate,
a plate-locking peg molded to said curved-surface-adapting plate for being inserted into said at least one trailer-hitch-adapting peg hole, and
a plurality of plate-aligning pegs molded to said curved-surface-adapting plate for straddling said trailer-hitch-adapting tube;
an umbrella-base system comprising:
a base body having a base bottom, said base body welded to said trailer-hitch-adapting tube,
a central base hole drilled through said base body for said adjustor-locking knob-screw to be screwed therethrough,
a plurality of base gears molded to said base body for engaging to said bottom gears to lock said rotatable receiver adjustor,
two double-function wrenching-and-strapping handles welded to said base body for wrenching said base body and for strapping said base body, and
a surface-conforming-and-protecting adaptor attached to said base bottom; and
at least one umbrella each comprising:
an umbrella canopy, and
an umbrella pole attached to said umbrella canopy, said umbrella pole
for being inserted through said pole-centering sleeve to be centered therein and
for being inserted into said pivotable pole receiver to be pivotably, adjustably, and lockably attached to said pivotable pole receiver.

2. The multi-application rotatable and pivotable umbrella system of claim 1, further comprising at least one strapping system, wherein each of said at least one strapping system comprises:
a plurality of hooks
for hooking in said at least one trailer-hitch-adapting hook hole in said trailer-hitch-adapting tube or
for hooking on said two double-function wrenching-and-strapping handles on said base body,
a strap attached to said hooks, and
a ratchet attached to said strap
for ratcheting said strap.

3. The multi-application rotatable and pivotable umbrella system of claim 1, further comprising a separation-assisting spring disposed around said central base hole for assisting the separation of said base gears from said bottom gears.

4. The multi-application rotatable and pivotable umbrella system of claim 1, wherein said umbrella pole is telescopic.

5. The multi-application rotatable and pivotable umbrella system of claim 1, wherein said umbrella pole is tiltable.

6. The multi-application rotatable and pivotable umbrella system of claim 1, wherein said trailer-hitch-adapting tube has a square cross-section.

7. The multi-application rotatable and pivotable umbrella system of claim 1, wherein said trailer-hitch-adapting tube has a square-tube shape.

8. The multi-application rotatable and pivotable umbrella system of claim 1, wherein said surface-conforming-and-protecting adaptor is made of rubber.

9. The multi-application rotatable and pivotable umbrella system of claim 1, further comprising a plurality of screw holes drilled through said base body and a plurality of attaching screws for being screwed through said screw holes.

10. A multi-application rotatable and pivotable umbrella system comprising:
at least one pole-receiving system each comprising:
a pivotable pole receiver having a receiver end,
a pole-centering sleeve slid on said receiver end,
a pole-locking hole threadedly drilled through said pivotable pole receiver,
a pole-locking knob-screw screwed through said pole-locking hole, and a plurality of receiver gears molded to said pivotable pole receiver for adjusting said pivotable pole receiver;
a receiver-adjusting system comprising:
  a rotatable receiver adjustor having an adjustor bottom, said rotatable receiver adjustor pivotably screwed to said pivotable pole receiver,
  a plurality of adjustor gears molded to said rotatable receiver adjustor for engaging to said receiver gears to lock said pivotable pole receiver,
  a central adjustor hole drilled through said adjustor bottom,
  an adjustor-locking knob-screw screwed through said central adjustor hole, and
  a plurality of bottom gears molded to said adjustor bottom;
a spiral-shovel-spike system, comprising:
  a tube-shaped spike,
  a spiral blade welded to said tube-shaped spike, and
  a plurality of digging shovels formed on said spiral blade, for shoveling the ground in a plurality of spiral directions to compact the ground;
an umbrella-base system comprising:
  a base body having a base bottom, said base body welded to said tube-shaped spike,
  a central base hole drilled through said base body for said adjustor-locking knob-screw to be screwed therethrough,
  a plurality of base gears molded to said base body for engaging to said bottom gears to lock said rotatable receiver adjustor, and
  two double-function wrenching-and-strapping handles welded to said base body for wrenching said base body and for strapping said base body; and
at least one umbrella each comprising:
  an umbrella canopy, and
  an umbrella pole attached to said umbrella canopy, said umbrella pole
    for being inserted through said pole-centering sleeve to be centered therein and
    for being inserted into said pivotable pole receiver to be pivotably, adjustably, and lockably attached to said pivotable pole receive.

11. The multi-application rotatable and pivotable umbrella system of claim 10, further comprising a separation-assisting spring disposed around said central base hole for assisting the separation of said base gears from said bottom gears.

12. The multi-application rotatable and pivotable umbrella system of claim 10, wherein said umbrella pole is telescopic.

13. The multi-application rotatable and pivotable umbrella system of claim 10, wherein said umbrella pole is tiltable.

14. The multi-application rotatable and pivotable umbrella system of claim 10, wherein said tube-shaped spike has a spiral-tube shape.

15. The multi-application rotatable and pivotable umbrella system of claim 10, wherein said base body has a rectangular shape.

16. The multi-application rotatable and pivotable umbrella system of claim 10, wherein said tube-shaped spike is made of metallic material.

17. The multi-application rotatable and pivotable umbrella system of claim 10, further comprising a plurality of screw holes drilled through said base body and a plurality of attaching screws for being screwed through said screw holes.

* * * * *